US008431177B2

(12) United States Patent
Narine et al.

(10) Patent No.: US 8,431,177 B2
(45) Date of Patent: Apr. 30, 2013

(54) SHORTENINGS AND METHODS OF MAKING AND USING THEREOF

(75) Inventors: Suresh S. Narine, Edmonton (CA); Kerry Lyn Humphrey, Edmonton (CA); Frank R. Kincs, Bourbonnais, IL (US)

(73) Assignees: Bunge Oils, Inc., St. Louis, MO (US); The Governors of the University of Alberta c/o Tec Edmonton, Edmonton (CA)

( * ) Notice: Subject to any disclaimer, the term of this patent is extended or adjusted under 35 U.S.C. 154(b) by 559 days.

(21) Appl. No.: 12/185,739

(22) Filed: Aug. 4, 2008

(65) Prior Publication Data

US 2009/0123619 A1 May 14, 2009

Related U.S. Application Data

(60) Provisional application No. 60/953,609, filed on Aug. 2, 2007.

(51) Int. Cl.
*A23D 9/00* (2006.01)
(52) U.S. Cl.
USPC .......................................... 426/606; 426/607
(58) Field of Classification Search ........... 426/606–608
See application file for complete search history.

(56) References Cited

U.S. PATENT DOCUMENTS

| 3,597,230 | A | * | 8/1971 | Colby et al. | 426/607 |
|---|---|---|---|---|---|
| 3,706,578 | A | * | 12/1972 | Bence | 426/607 |
| 4,205,006 | A | * | 5/1980 | Luddy et al. | 554/223 |
| 4,996,074 | A | * | 2/1991 | Seiden et al. | 426/601 |
| 5,215,779 | A | * | 6/1993 | Dake et al. | 426/601 |
| 5,407,695 | A | | 4/1995 | Wheeler et al. | |
| 5,470,598 | A | | 11/1995 | Scavone | |
| 5,871,799 | A | * | 2/1999 | Aoe et al. | 426/601 |
| 6,033,703 | A | | 3/2000 | Roberts et al. | |
| 7,169,430 | B2 | | 1/2007 | Higgins | |
| 7,223,435 | B2 | * | 5/2007 | Besselink et al. | 426/607 |
| 7,524,524 | B2 | * | 4/2009 | Floeter | 426/607 |
| 2004/0071857 | A1 | * | 4/2004 | Besselink et al. | 426/607 |
| 2005/0220968 | A1 | | 10/2005 | Chaimi et al. | |
| 2005/0276900 | A1 | | 12/2005 | Ullanoormadam | |

FOREIGN PATENT DOCUMENTS

| CZ | 263926 | 5/1989 |
|---|---|---|
| IN | 2002DE00940 | 1/2005 |
| JP | 2006320275 | 11/2006 |
| WO | WO 95/25433 | 9/1995 |
| WO | WO 98/19556 | 5/1998 |

OTHER PUBLICATIONS

Swern, D. 1979. Baileys Industrial Oil and Fat Products, vol. 1, 4$^{th}$ edition. John Wiley & Sons, New York, p. 416-417.*
Hui, Y. H. 1996. Baileys Industrial Oil and Fat Products, vol. 2, 5$^{th}$ edition. John Wiley & Sons, New York. p. 4-6 & 33.*
Humphrey, K. L. 2004. Food Research International 37:11-27.*
Swern, D. 1979. Baileys Industrial Oil and Fat Products, vol. 1, 4$^{th}$ edition. John Wiley & Sons, New York. p. 365, 383.*
Avrami. Journal of Chemical Physics. 8: 212-224 (1940).
Bell et al., Food Chemistry. 101: 799-805 (2007).
Berger et al., Jaocs. 82: 775-782 (2005).
Bouzidi, L., et al., *Thermochimica Acta*, 439: 94-102 (2005).
Cho et al., Journal Of Food Lipids. 1: 53-68 (1993).
Deman et al., Food Research international. 25: 471-476 (1992).
Deman et al., Low Trans Fats: Proceedings of the 21$^{st}$ World Congress of the International Society for Fat Research (ISF), 561-563 (1995).
Dewettinck et al., Crystal Growth & Design. 4: 1295-1302 (2004).
Farmani et al., Eur J Lipid Sci. Technol. 108: 626-643 (2006).
Humphrey et al., Food Research International. 37: 11-27 (2004).
Humphrey et al., JAOCS. 80: 1175-1182 (2003).
Hunter et al., Am J Clin Nutr. 54: 363-369 (1991).
Inoue et al., Chemistry And Physics. 63: 243-250 (1992).
Narine et al., JAOCS. 81: 101-102 (2004).
Jeyarani et al., JAOCS. 80: 1107-1113 (2003).
Khatoon et al., Eur J Lipid Sci. Technol. 107: 786-791 (2005).
Kloek et al., JAOCS. 77: 389-398 (2000).
Kok et al., JAOCS. 76: 1175-1181 (1999).
List et al., Lebensm,-Wiss U,-Technol. 32: 416-424 (1999).
Malssen et al., JAOCS 76: 669-676 (1999).
Mayamol et al., JAOCS. 81: 407-413 (2004).
Mensink ct al., Prog Lipid Rcs. 32: 111-122 (1993).
Mensink et al., Trans Fatty Acids And Lipoprotein Levels. 323: 439-445 (1990).
Narine et al., Food Research International. 37: 28-38 (2004).
O'Brien R.D., Bailey's Industrial Oil And Fat Products. 6th Edition, vol. 4, pp. 125-157 (2005).
O'Brien R.D., Introduction to Fats and Oils Technology, second edition, Shortening Technology, pp. 421-451 (2000).
Pachanich, Trans-Fat Transitions, printed from http://www.foodprocessing.com/articles/2005/459.html.
Rossell, J.B., Interactions of Triglycerides and of Fats Containing Them, Journal: Chem. and Industry, 1973 (17) 832-835.
Sharples et al., Introductions to Polymer Crystalization, Overall Kinetics of Crystallization, 44-59(1966).
Timms R.E., Prog Lipid Res. 23: 1-38 (1984).
Willett et al., Lancet. vol. 341, issue 8845, p. 581 (1993).
Widlak Neil, Proceedings Of The World Conference On Oilseed Processing Utilization, 2000, p. 39-43.

\* cited by examiner

*Primary Examiner* — Carolyn Paden
(74) *Attorney, Agent, or Firm* — Jones Day

(57) ABSTRACT

Described herein are shortenings with improved properties such as increased hardness, minimal trans fat, and reduced saturated fats. Methods for preparing the shortenings involve the use of one or more structural enhancers in a vegetable oil followed by processing and tempering the admixture. The shortenings can be used to produce food products with reduced saturated fats and increased hardness as well as minimal trans fats.

41 Claims, 34 Drawing Sheets

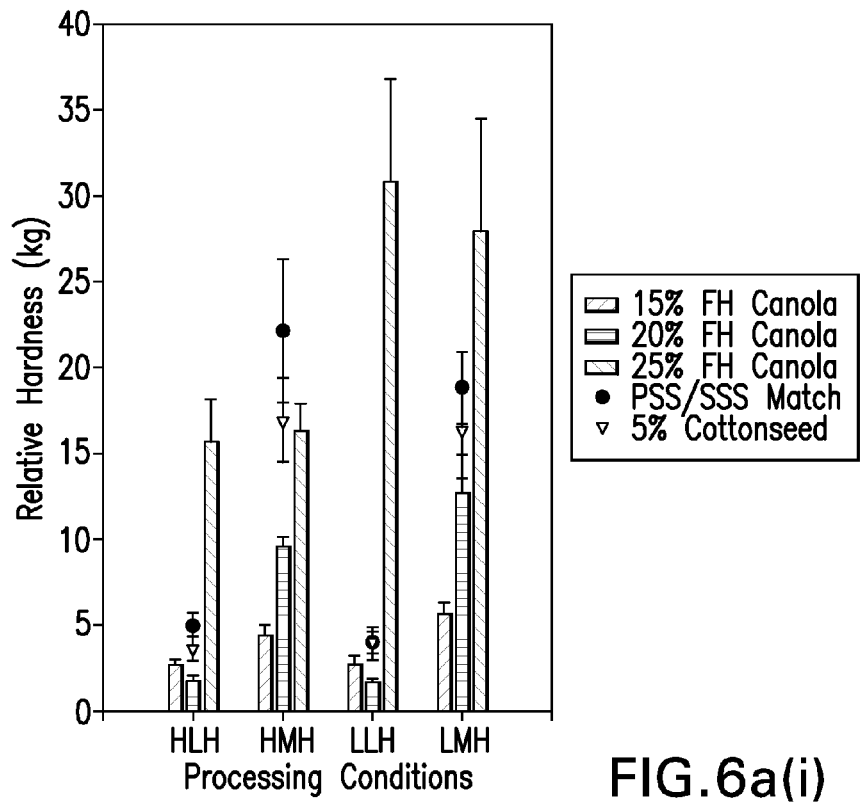
FIG.6a(i)
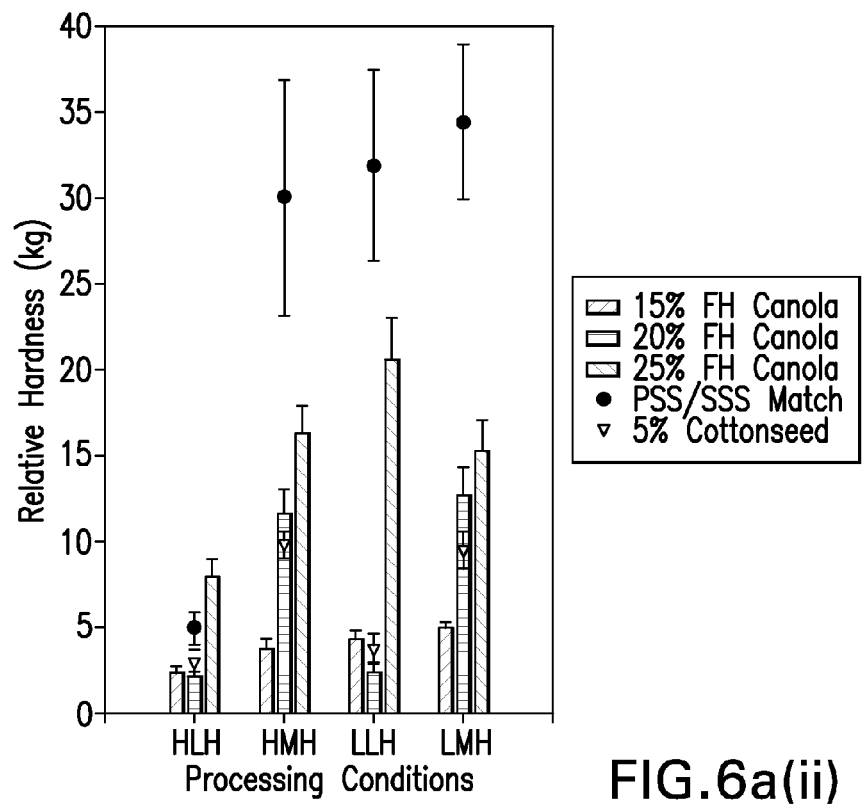
FIG.6a(ii)

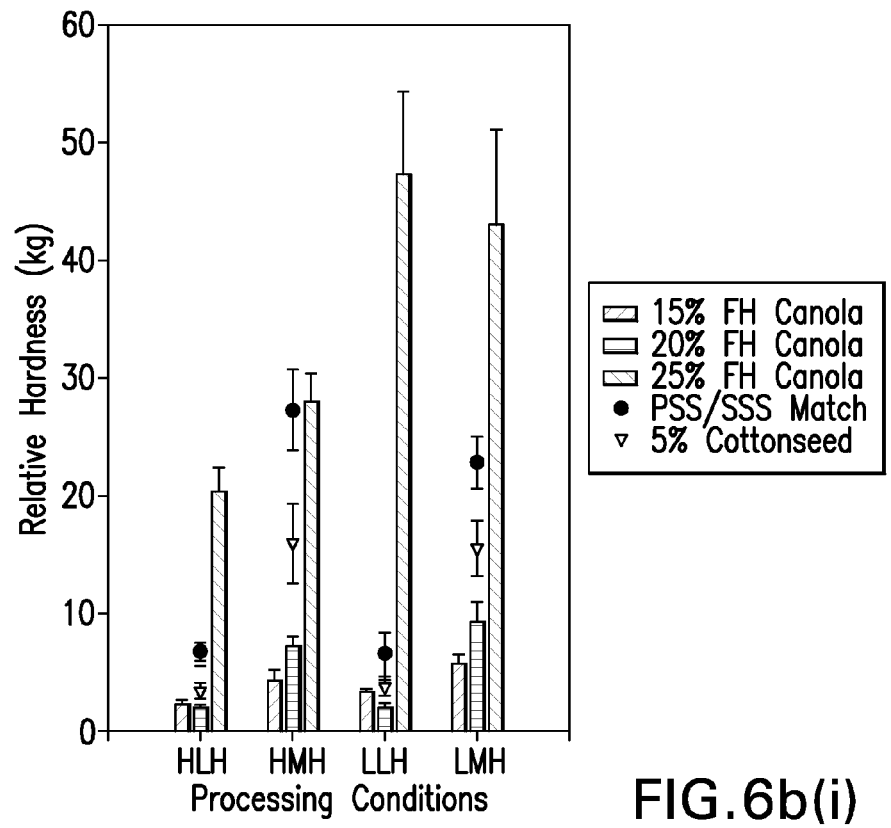
FIG. 6b(i)
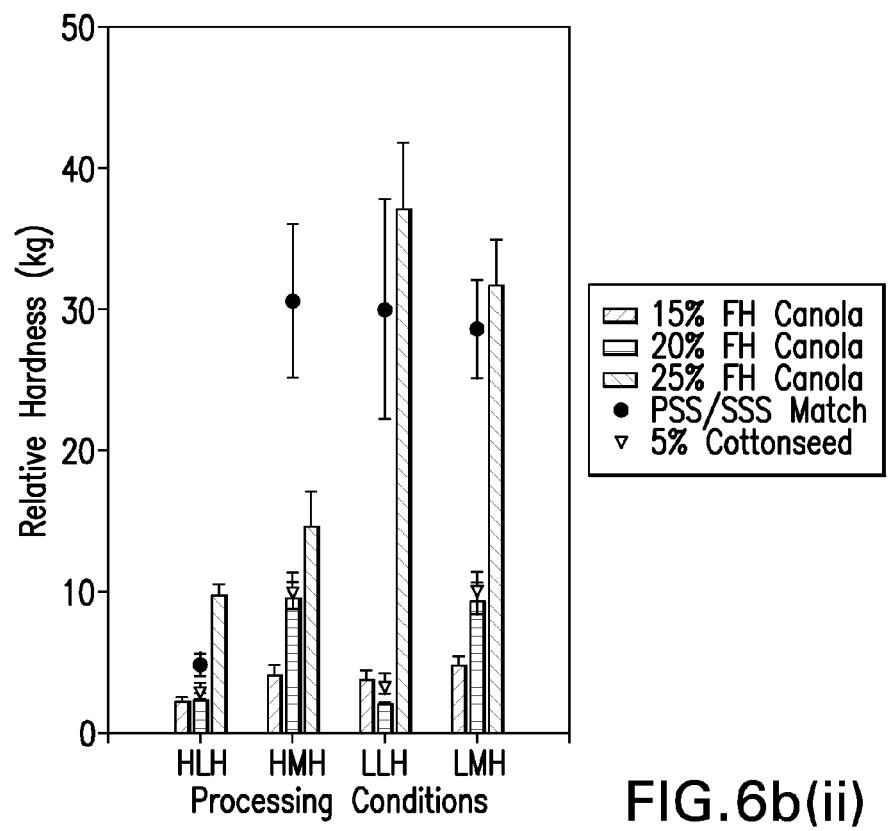
FIG. 6b(ii)

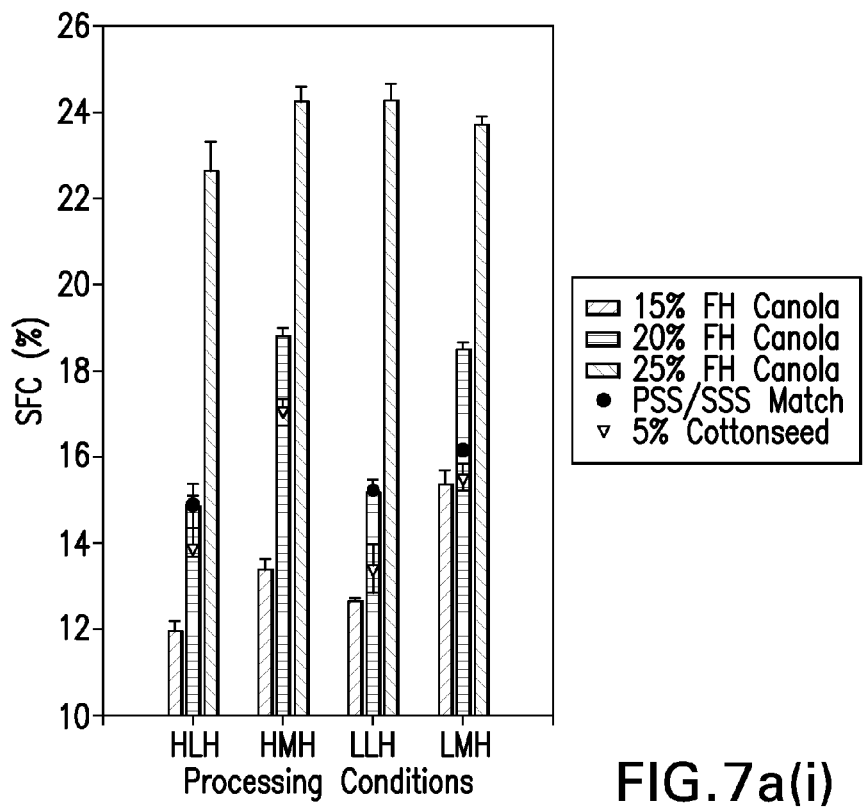
FIG.7a(i)
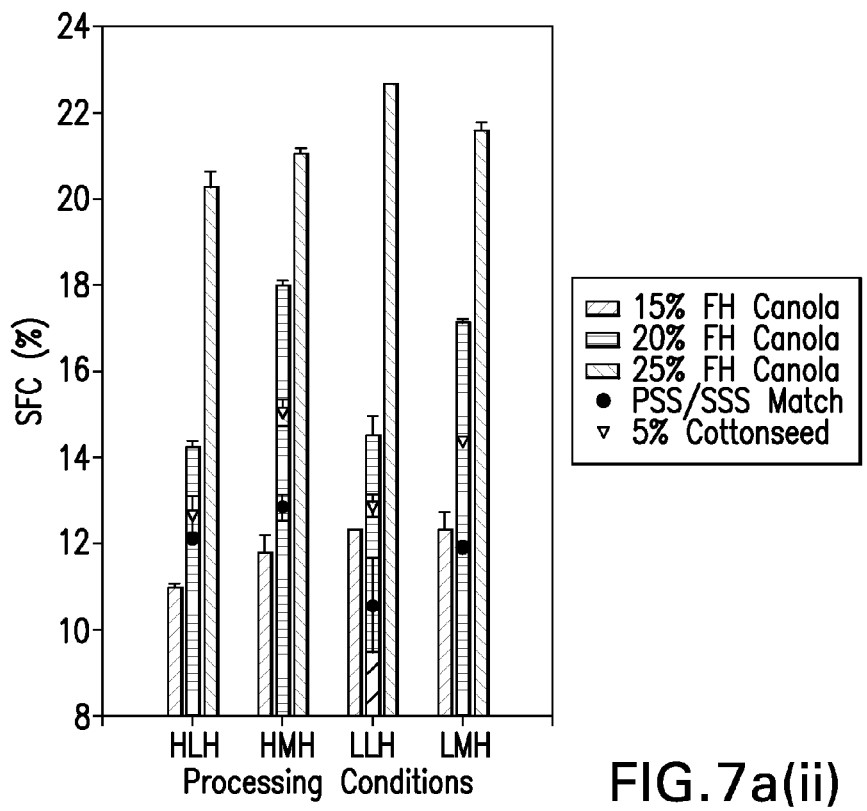
FIG.7a(ii)

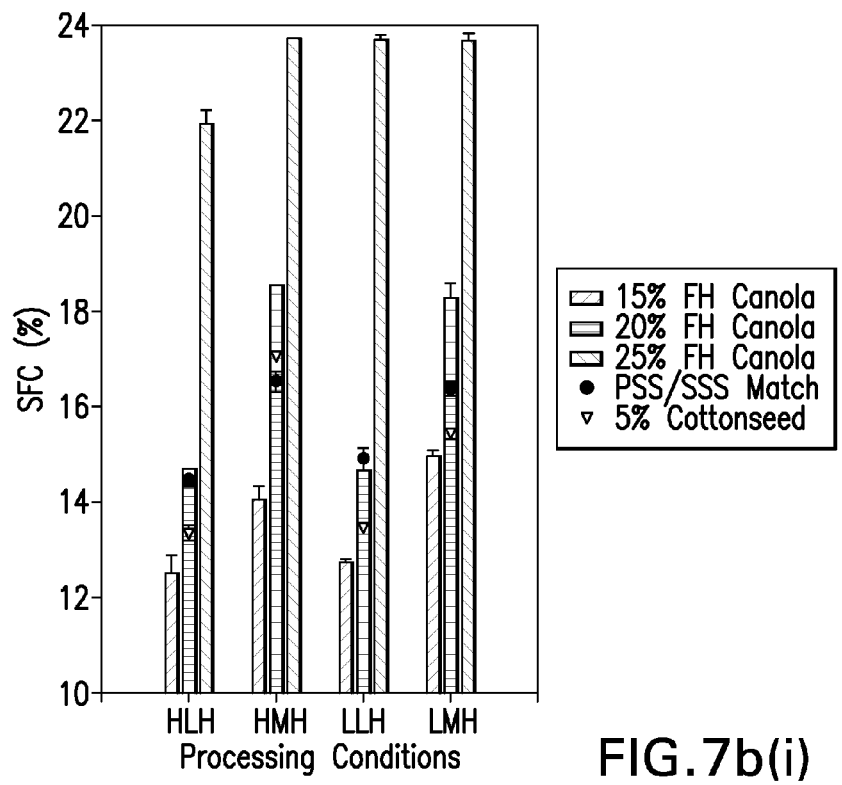
FIG.7b(i)
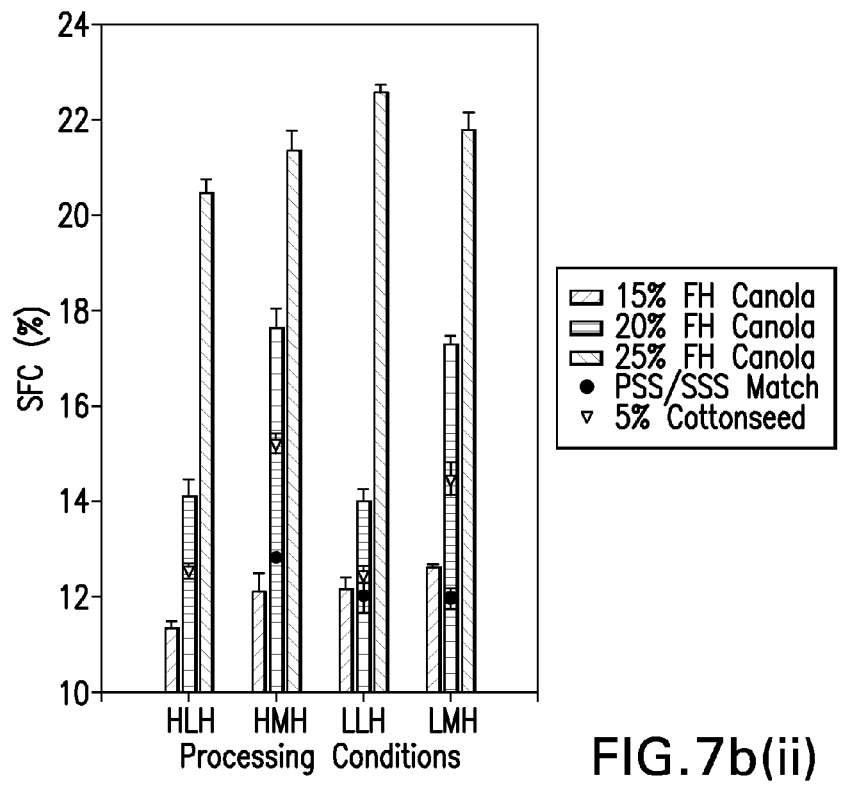
FIG.7b(ii)

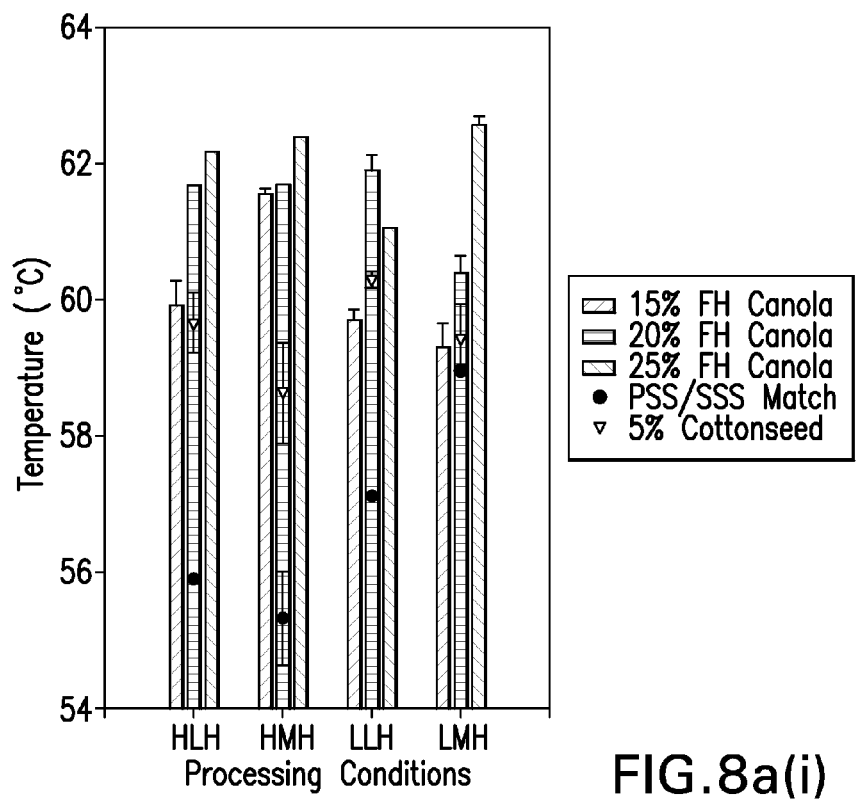
FIG.8a(i)
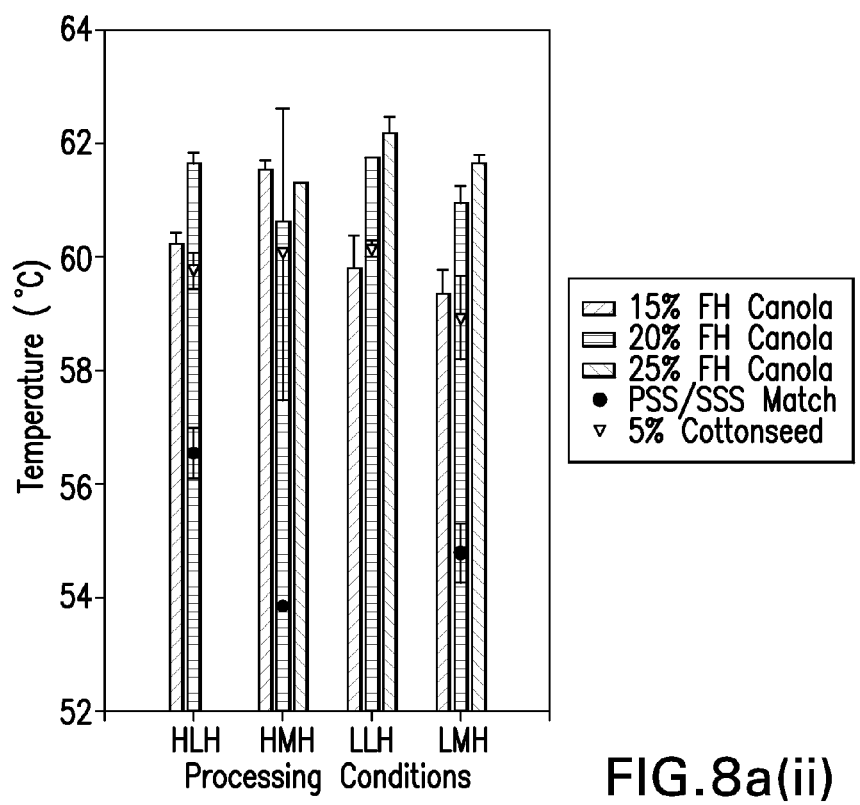
FIG.8a(ii)

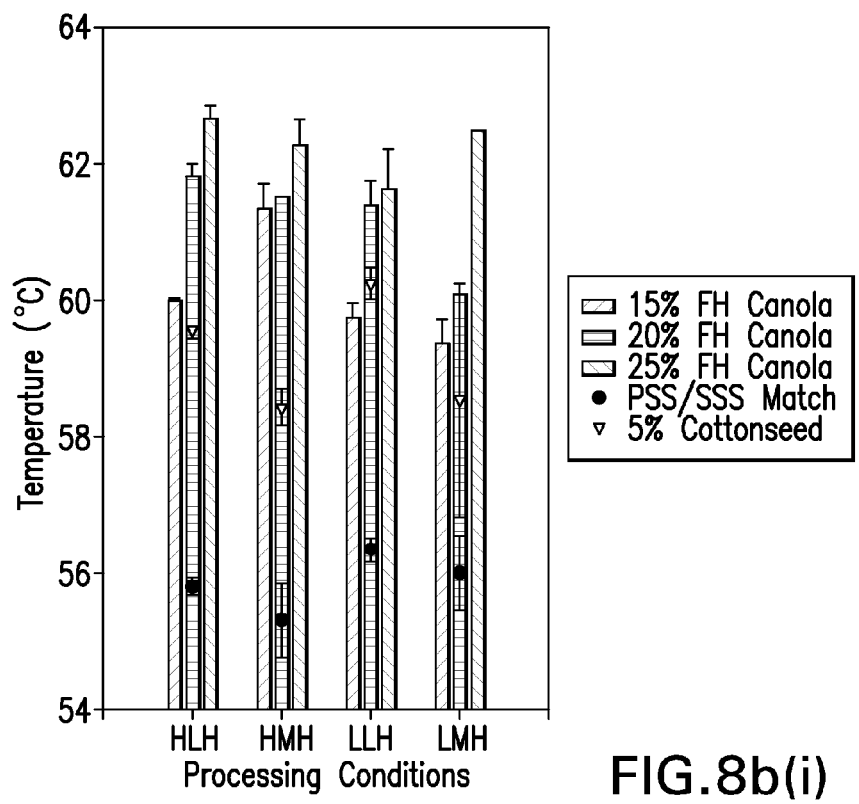
FIG.8b(i)
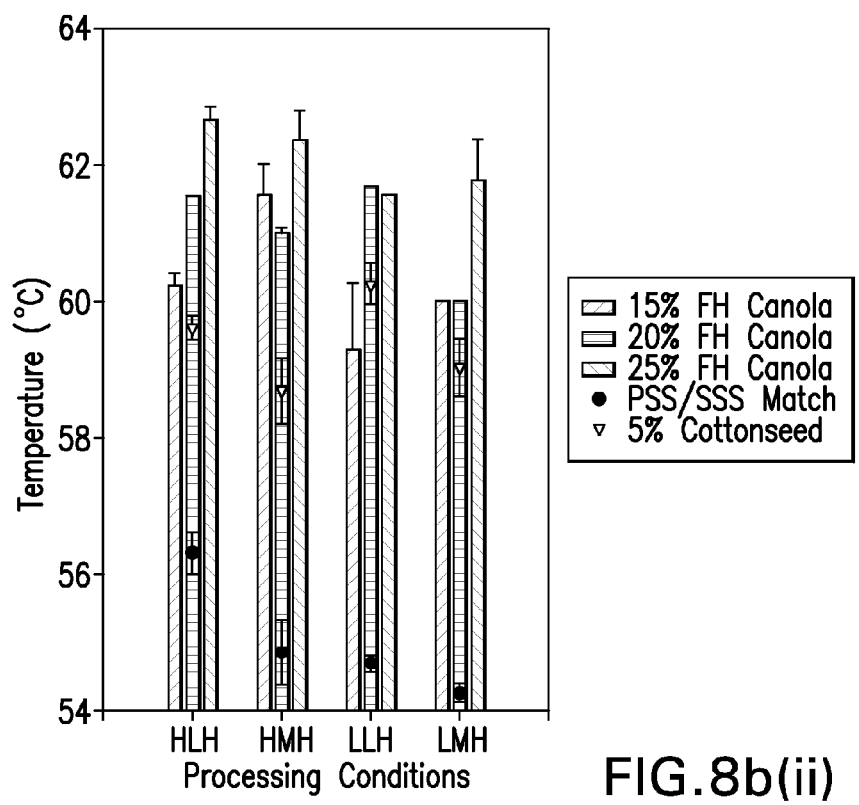
FIG.8b(ii)

SHORTENINGS AND METHODS OF MAKING AND USING THEREOF

RELATED APPLICATIONS

This application claims priority to U.S. Provisional Application No. 60/953,609, filed Aug. 2, 2007 entitled "SHORTENINGS AND METHODS OF MAKING AND USING THEREOF" to Narine et al. The disclosure of the above referenced application is incorporated by reference herein.

BACKGROUND

Shortenings can be composed of a mixture of a hard fat fraction and a soft fat fraction, with or without selected emulsifiers. The hard fat fraction is typically composed of, but not limited to, fully and/or partially hydrogenated canola, cottonseed, palm, or soybean oil, or a combination of such oils. The soft fat fraction typically comprises unhydrogenated oils or partially hydrogenated oils, or any combination thereof. The relative proportions of the hard fat fraction and the soft fat fraction will play a role in determining the properties of the shortening product.

It has been suggested in the literature that the consumption of trans fatty acids and saturated fatty acids can increase the amount of LDL cholesterol in the body, and that consumption of trans fatty acids also can reduce HDL cholesterol levels. Therefore, it may be desirable to reduce both saturated fats content and trans fats content in certain prepared food products. The removal of trans fats from a shortening product can pose difficulties for the food producer. Trans fat free products tend to have a lower viscosity or a softer solid nature and a lower melting point than those containing trans fat. If the melting point of the fat is too low, the product may run, bleed, or melt at typical handling temperatures.

Hydrogenation was initially introduced into shortening manufacture in an effort to provide the shortening with more desirable physical properties, particularly hardness, at a variety of handling temperatures. Complete hydrogenation increases the level of saturated fatty acids. Partial hydrogenation will provide lower levels of saturated fats than complete hydrogenation, but can increase the level of trans fatty acids.

U.S. Pat. No. 5,470,598 discloses a β-prime stable plastic shortening stated to exhibit superior baking and frying performance and containing reduced levels of saturates and trans fatty acids. The shortening is stated to be useful in confectionery, baking, and frying applications. The disclosed shortening comprises from about 6% to about 25% by volume of an inert gas and from about 75% to about 94% by volume of a fat phase comprising: a) from about 74% to about 90% by weight of a base oil having less than 10% by weight of trans fatty acids, less than 16% $C_4$-$C_{26}$ fatty acids, b) from about 10% to about 20% by weight of a β-prime stable crystalline hardstock consisting essentially of at least 65% of PSP and PSS, wherein the ratio of PSP:PSS is at least 0.8 to 1.0 and from 0 to 30% other triglycerides or synthetic fats and from 0 to 5% monoglycerides or diglycerides.

U.S. Pat. No. 7,169,430, assigned to the present assignee herein and incorporated herein by reference in its entirety, discloses shortening systems which are prepared to include hydrogenated edible oils that are hydrogenated in a manner to minimize the formation of trans-stereoisomers. A conditioned catalyst is used which disfavors trans-stereoisomer formation without significantly negatively impacting the length of time required to form solids for a useful shortening base stock through hydrogenation. In one embodiment, the conditioning agents are organic acid phosphates and phosphoric acid. In another embodiment, a confectionary shortening is provided which incorporates a polyglycerol ester emulsifier.

Other research on the topic of shortening products is disclosed in "A comparison of lipid shortening functionality as a function of molecular ensemble and shear: Crystallization and Melting", Humphrey, K. L., Narine, S. S., *Food Research International* 37 (2004) 11-27; "A comparison of lipid shortening functionality as a function of molecular ensemble and shear: microstructure, polymorphism, solid fat content and texture", Humphrey, K. L., Narine, S. S., *Food Research International* 37 (2004) 28-38; and "Extending the capability of pulsed NMR instruments to measure solid fat content as a function of both time and temperature," Narine, S. S. and Humphrey, K. L., *JAOCS* 81, 101-102 (January 2004); each of which is incorporated herein by reference in their entireties.

There is a need for shortenings having reduced levels of saturated fats and trans fats, and acceptable physical properties for handling and food preparation.

SUMMARY

In certain embodiments, provided herein are shortenings having reduced levels of saturated fats and trans fats, and acceptable physical properties for handling and food preparation. In another embodiment, the shortening product provided herein has the trans fat content less than about 4%. In yet another embodiment, the shortening product has saturated fat content less than about 30%. In one embodiment, the shortening product comprises at least about 70% unhydrogenated fat.

In certain embodiments, the shortenings provided herein have improved properties such as increased hardness and reduced saturated fats and minimal trans fats. In one embodiment, provided herein is a shortening composition comprising a hard fat fraction, a soft fat fraction, and structural enhancers, the structural enhancers comprising one or more triacylglycerides, each triacylglyceride (TAG) molecule having one or more stearic groups and one or more palmitic groups, the structural enhancers being present in a proportion sufficient to impart acceptable functionality, and particularly hardness, to the shortening products at desired handling temperatures. In one aspect, the structural enhancers, which are themselves saturated fats, can be present natively in at least one of the fractions, particularly the hard fat fraction. In another aspect, structural enhancers can be added to the composition. In yet another aspect, structural enhancers can be both present in at least one of the fractions and added to the composition.

In another embodiment, provided herein are methods for preparing the shortenings described herein. In one embodiment the method comprises the step of providing a composition comprising the hard fat fraction, the soft fat fraction, and the structural enhancer, the structural enhancer being either present natively in one of the fractions, added to the composition, or both, and mixing the composition to provide a shortening product. During mixing, the composition is brought to a molten state to obtain a homogenized mixture in which all previous crystal memory has been destroyed. In one embodiment, the admixture is rapidly cooled, for example, with agitation, to provide a crystal structure that imparts the desired physical properties to the shortening. A heat exchanger, in one embodiment, a scraped surface heat exchanger, can provide the desired cooling with agitation. In another embodiment, the shortening composition is tempered by being maintained at a predetermined temperature for a predetermined length of time. In certain embodiments, the shortenings so produced will have lower levels of saturated fats and trans fats than the shortenings known in the art, but will have desired hardness properties over a range of handling temperatures.

The advantages provided herein will be set forth in part in the description which follows, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

FIG. 6 shows the relative hardness of the shortening samples after (a) 7 and (b) 14 days, the samples being (i) tempered at 70° F. and (ii) tempered at 85° F. for two days and then at 70° F.

FIG. 7 shows SFC of the shortening samples after (a) 7 and (b) 14 days, the samples being (i) tempered at 70° F. and (ii) tempered at 85° F. for two days and then at 70° F.

FIG. 8 shows the peak maximum of DSC Melting Curves after (a) 7 days and (b) 14 days, the samples being (i) tempered at 70° F. and (ii) tempered at 85° F. for two days and then at 70° F.

DETAILED DESCRIPTION

Figure 1:
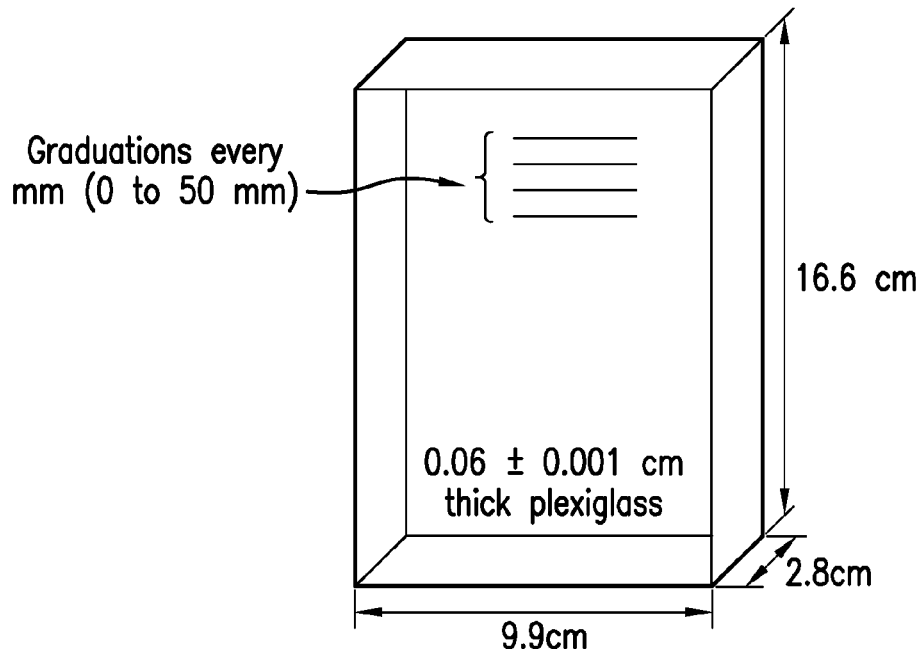
FIG. 1 shows the design and dimensions of the "slump slide" instrument used to perform tests of structural integrity as a function of time of icing products made from shortenings.
Figure 1:
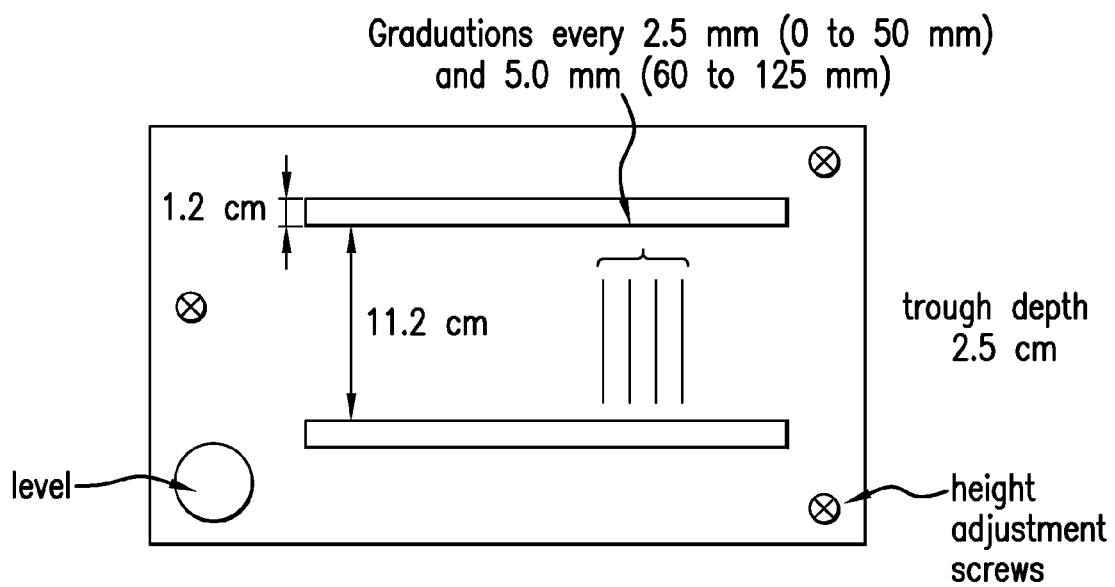

Before the present compounds, compositions, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a vegetable oil" includes mixtures of two or more such vegetable oils, and the like. In one embodiment, reference to "a vegetable oil" includes interesterified and/or genetically modified oils.

All percent values are given as weight percent unless expressly stated otherwise.

The term "structural enhancer" as used herein means one or more triacylglycerides (TAG) derived from palmitic acid in combination with stearic acid, such that each TAG molecule contains at least one palmitic group and at least one stearic group. In one embodiment, the structural enhancers for use herein include PSS, PSP, PPS, SPS or PPP. In another embodiment, the structural enhancers useful herein include PSS, PSP, PPS or SPS, where P and S in each enhancer is palmitic and stearic, respectively, and the order they appear in the SN-1, SN-2 and SN-3 positions on the glycerol backbone. For example, PSS is 1 palmitoyl, 2,3-distearoyl-sn-glycerol.

In one embodiment, provided herein is a shortening composition that comprises a hard fat fraction, a soft fat fraction, and structural enhancers, the structural enhancers comprising one or more triacylglycerides, each triacylglyceride (TAG) molecule having one or more stearic groups and one or more palmitic groups, the structural enhancers being present in a proportion sufficient to impart acceptable functionality, and particularly hardness, to the shortening products at desired handling temperatures. Without wishing to be bound by any theory, it is presently believed that the structural enhancer interacts with the tristearin (SSS) saturated fat present in the composition. Depending on the particular lipid products used for the different fractions, in certain embodiments, the soft fat fraction will comprise at least about 70%, at least about 80%, or at least about 85% by weight of the shortening composition.

The soft fat fraction can comprise one or more vegetable oils that are substantially liquid at ambient temperature. In one embodiment, the oils of the soft fat fraction comprise unhydrogenated oils, and little or no partially hydrogenated oils, such that the soft fat fraction has a low level of trans fatty acids, in one embodiment, less than about 2%. Oils in their unhydrogenated forms suitable for use in the soft fat fraction include without limitation corn oil, cottonseed oil, canola oil, olive oil, palm oil, palm kernel oil, coconut oil, peanut oil, safflower oil, sesame oil, soybean oil, sunflower oil, rapeseed oil, or any combination thereof. In one embodiment, the oils are selected from soybean oil, canola oil, and mixtures thereof having low levels of trans fatty acids. Other oils suitable for use as the liquid fraction will be recognized by those skilled in the art.

The hard fat fraction can comprise one or more lipid products that are solid at the desired handling temperatures. Typically, such lipid products comprise one or more fully hydrogenated vegetable oils, a mixture of one or more vegetable oils comprising stearic acid and palmitic acid, or any combination thereof. Animal products such as lard and tallow also can be used. While partially hydrogenated lipids also can be used with the structural enhancers provided herein, they will increase the level of trans fats in the shortening product and are therefore less desirable.

The hard fat fraction is at least about 15% of the shortening product, and it can be at least about 20% or at least about 25% of the shortening product. It is desirable to keep the hard fat fraction as low as possible consistent with obtaining a shortening product with the desired functional qualities.

In one aspect, the shortening compositions contain a sufficient quantity of structural enhancer to provide the desired handling properties of the shortening product, while at the same time the shortening product has lower levels of trans fats and saturated fats than shortening products known in the art having equivalent handling properties. In particular it has been found that a desirable shortening product can be obtained if the level of structural enhancer is selected such that the structural enhancer is at least about 30 percent of the amount of total added saturated fat, and if the ratio of amount of structural enhancer to the amount of tristearin is at least about 0.5. For the purposes of this application the term "total added saturated fat" shall mean the amount of saturated fat contributed to the shortening composition from the hard fat fraction and the structural enhancers, it being assumed for this application that the soft fraction will have little or no saturated fat.

Some quantities of structural enhancer may be present natively in either the soft fraction or the hard fraction of the shortening composition, more typically in the hard fraction. Generally, the amount of structural enhancer found natively in presently available lipid products will be insufficient to impart the desired handling properties to the finished shortening product, and it will be desirable to add additional structural enhancers to the shortening composition. There are many different ways in which this can be done. In one method, a quantity of a lipid product naturally rich in the structural enhancer can be added to the composition. In another method, a lipid sample can be interesterified with palmitic acid and stearic acid to provide a lipid product enriched in the structural enhancer, and this enriched lipid product can be added to the composition. In another method, the structural enhancer can be chemically synthesized, or isolated and purified from natural sources, and added to the composition. In yet another method, a lipid product can be hydrogenated to become enriched in the structural enhancer, and this hydrogenated product can be added to the composition. In still another method, an oil-producing plant can be genetically modified so that the oil derived therefrom is enriched in structural enhancer, and this oil can be included in the composition. In another embodiment, a fractionation process can be used toward optimizing the structural enhancer and enrich its composition. In any of the foregoing methods, the lipid product containing the structural enhancer can be added to the soft and hard fractions, or can be used as all or part of the soft fraction or hard fraction, depending on the proportions of all ingredients required for a particular shortening product.

With regard to interesterification, native oils can be interesterified to be rich in one or more of the structural enhancers. Alternatively, fully hydrogenated oils can be interesterified with other fully hydrogenated oils or native oils rich in one or more of the structural enhancers. Methods for producing interesterified oils are known in the art. For example, the interesterification methods disclosed in U.S. Published Application No. 2005/0220968, which is incorporated by reference, can be used herein to produce interesterified oils.

The proportion of the structural enhancer in the shortening composition can be expressed in two different ways. The structural enhancer is itself a saturated fat. Thus, a first way of expressing the proportion of structural enhancer is as a percentage of the total amount of saturated fat present in the shortening composition. Since it is a goal for the amount of structural enhancers to reach the same level as the other saturated fats in the composition, in theory this would ideally approach 50%. In practice, it has been found that the minimum range of structural enhancers which are required to be present for beneficial effects described above to be accrued in a shortening product is about 30% of total added saturates, and it is desirable that the structural enhancers be present in an amount as high as about 45% of total added saturates, or even higher. Alternatively, the proportion of structural enhancer can be expressed as the ratio of the amount of structural enhancer to the amount of tristearin ("SSS") present in the composition. In one embodiment, this ratio is greater than 0.5. In another embodiment, this ratio is 1. In certain embodiments, the level of structural enhancers matches the levels of tristearin saturated fats. In one embodiment the ratio is at least about 0.7, and in another embodiment the ratio is at least about 0.8.

The amount of structural enhancer used in a composition in combination with the process steps described below results in the formation of shortenings with superior properties, including preferred melting properties, preferred crystal structure and type, preferred solid content, reduced saturates, negligible trans fats, and hardness commensurate with shortening products containing much higher levels of saturate or trans fats. The beneficial effects incurred due to the presence of the structural enhancer described above can be further optimized by the amount of structural enhancer being present within a specific ratio to the amount of tristearin present, as described above.

In another embodiment, provided herein is a method for producing shortenings with superior properties as set forth above. In its most fundamental form the method comprises the step of providing a composition comprising a hard fat fraction, a soft fat fraction, and a structural enhancer, the structural enhancer being either present natively in one of the fractions, added to the composition, or both, and mixing the composition to provide a shortening product. During mixing, the composition is brought to a molten state such that admixture becomes homogenized and all crystal memory is destroyed. The order of adding the ingredients and heating the ingredients can be changed as required by a particular process, as long as a homogenized mixture is achieved with no crystal memory. In one embodiment, the process does not require homogenization of the mixture. The ingredients can be added at ambient temperature, or at a higher temperature, depending on the particular system used, and it is intended that the claims appended hereto shall not be limited by the order of the heating and mixing steps. The molten homogeneous composition then is cooled, in one embodiment, with agitation, to promote a crystal structure that imparts the desired physical properties to the shortening. A heat exchanger, and in particular a scraped surface heat exchanger, can provide the desired cooling with agitation. In one embodiment, the shortening composition be tempered by being maintained at a predetermined temperature for a predetermined length of time.

In one embodiment, the method comprises the steps of
a) admixing a hard fat fraction and a soft fat fraction with at least one structural enhancer, wherein the structural enhancer comprises one or more of PSS, PSP, PPS, SPS, PPP or any combination thereof, the structural enhancer being present in an amount sufficient to impart the desired properties to the finished shortening product,
b) homogenizing the admixture,
c) processing the admixture by rapid cooling with agitation in a scraped-surface heat exchanger, and
d) tempering the admixture.

In another embodiment, the method comprises the steps of
a) admixing a hard fat fraction and a soft fat fraction with at least one structural enhancer, wherein the structural enhancer comprises one or more of PSS, PSP, PPS, SPS, PPP or any combination thereof, the structural enhancer being present in an amount sufficient to impart the desired properties to the finished shortening product,
b) processing the admixture by rapid cooling with agitation in a scraped-surface heat exchanger, and
c) tempering the admixture.

In one embodiment, the method comprises the steps of
a) admixing a hard fat fraction and a soft fat fraction with at least one structural enhancer, wherein the structural enhancer comprises one or more of PSS, PSP, PPS, SPS, or any combination thereof, the structural enhancer being present in an amount sufficient to impart the desired properties to the finished shortening product,
b) homogenizing the admixture,
c) processing the admixture by rapid cooling with agitation in a scraped-surface heat exchanger, and
d) tempering the admixture.

The methods described herein take into account several parameters for producing shortenings with improved physical properties. The parameters can include the amount of structural enhancer, the relative proportions of the hard and soft fractions, the optimization of processing conditions within the scraped surface heat exchanger, and optimization of tempering conditions to further enhance the shortening. With respect to the amount of structural enhancer, the amount is generally a minimum amount with respect to the total added saturated fats, generally at least about 30%, or as a specified ratio of structural enhancer to the total amount of tristearin present in the shortening, generally at least about 0.5.

The admixing of the structural enhancer, the hard fat fraction and the soft fat fraction can be accomplished using techniques known in the art. The admixture is mixed and heated for a sufficient time and at a temperature to ensure that a homogenous mixture is produced and to remove all crystal memory prior to commencing the cooling and agitation steps. The heating step can be performed while the structural enhancer is added to the hard fat fraction and the soft fat fraction or, in the alternative, after the complete addition of the structural enhancer to the solid and the liquid fractions. In one embodiment, the admixture is pre-heated to a temperature ranging from about from 55° C. to about 90° C. In one embodiment, the admixture is held at 90 for 2 to 30, 5 to 30 or 7 to 30 minutes. In another embodiment, the admixture is maintained at that temperature for a period of about 10 to 30 minutes. In another embodiment, the admixture is maintained at that temperature for a period of about 2 to 7 minutes.

The pre-heated admixture can be then subjected to controlled cooling, in certain embodiments, with agitation, in another embodiment, by means of a scraped-surface heat exchanger, such as are known in the art of shortening manufacture. In addition to the relative amount of structural enhancer that is used, processing conditions within the scraped-surface heat exchanger can be adjusted to further promote the desired shortening properties. The scraper blades prevent any build-up on the cylinder of crystals and other large particulates that can reduce thermal exchange and run time. A number of different operating parameters in the scraped-surface heat exchanger can be modified in order to optimize the one or more properties of the shortening (e.g., hardness, melting). For example, the speed of the scraping blades, the pumping speed through the scraped surface heat exchanger, and the exit temperature from the heat exchanger can be modified to optimize the hardness of the shortening, which is shown in the working examples below.

After the admixture has been processed in the scraped surface heat exchanger in a manner which further enhances hardness, whilst maintaining preferable melting, crystal type and crystal habit, the properties of the shortening can be further enhanced by tempering it at a specific temperature for a sufficient time. The effect is that the shortening is further improved with respect to the desired crystal habit (size, shape, polymorphism), hardness, melting, consistency, specific gravity and stability (i.e. indicators of physical functionality such as hardness, melting, specific gravity and consistency are constant after the tempering period). The temperature and duration of tempering can vary depending upon the desired hardness, melting, specific gravity and other indicators of physical functionality of the shortening. In one aspect, the tempering step comprises storing the crystallized admixture at a temperature from about 65-85° F. or about 85° F., in certain embodiments, less than about 90° F. depending on the particular composition and the properties desired. Tempering can continue from a period of about two days up to about two weeks; it can be desirable to have the initial tempering occur at about 85° F. for about two days and then have tempering continue at about ambient temperature.

The shortenings produced by the methods described herein possess hardness values commensurate with shortenings containing significantly higher levels of saturated and/or trans fatty acids. As discussed above, it is desirable to produce shortenings with a targeted hardness yet not increase the total saturated fat content of the shortening. As known in the art, one approach to maintain the desired hardness of a shortening is to increase the amount of saturated fats, which is not desirable. Thus, the use of a structural enhancer produces shortenings that maintain the hardness yet have decreased total saturated fat content. For example, the shortenings produced by the methods described herein have a total added saturated fat content of less than about 30%, less than about 25%, or less than about 20%. This is significantly lower than current shortenings produced without the deliberate addition of structural enhancer, which have average total saturated fat content from 40 to 45%. Additionally, the shortenings produced herein can be designed to have minimal trans fat content, in certain embodiments, no more than about 2% by weight, which is another desirable feature of a shortening.

The shortenings produced herein can be used to produce a variety of foods including, but not limited to, baked goods, an icing, biscuits, bread, a pie crust, a danish, a croissant, or a pastry puff. The use of the shortenings produced herein result in the production of foods with better consistency and texture, which is due in part to the increased hardness of the shortening. For example, icing produced with the shortenings described herein resists deformation under gravity when placed on a vertical substrate. Additionally, with the reduction in total saturated fat content, food products produced with the shortenings described herein can provide numerous health benefits. In some applications, the shortening provided herein could be used for cooking or frying.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of the claimed subject matter. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Examples 1-20

In Examples 1-20, PSS was evaluated as a structural enhancer. Twenty laboratory scale shortening samples were prepared in which soybean oil was used as the liquid fraction and the solid fraction comprised fully hydrogenated canola oil taken either alone or in combination with either a pure PSS or fully hydrogenated cottonseed oil. Soybean oil has negligible quantities of saturated fat. Fully hydrogenated canola oil has about 16% PSS, about 80% SSS, and about 4% other saturated fats. Fully hydrogenated cottonseed oil has about 43% PSS, about 39% SSS, and about 18% other saturated fats. The soybean oil, fully hydrogenated canola oil, and fully hydrogenated cottonseed oil used in these samples were all supplied by Bunge Oils (Bradley Ill., USA). The pure PSS (i.e., greater than 98% as determined by GC-MS) was synthesized by the Alberta Lipid Utilization Program at the University of Alberta, Edmonton, Alberta.

The compositions of these Examples 1-20 are set forth in Table 1. It may be seen that four different types of samples were created. For each type there were five samples having different levels of total added saturated fat. These four types are (1) control samples comprising fully hydrogenated (FH) canola mixed with soybean oil for Examples 1-5, with no added PSS (2) 5% pure PSS and FH canola mixed with soybean oil, for Examples 6-10, (3) 5% FH cottonseed and FH canola mixed with soybean oil (also control), for Examples 11-15, and (4) for Examples 16-20, a blend of FH cottonseed and FH canola oil mixed with soybean oil, in which the amount of cottonseed oil was held constant at 14% and the proportion of FH canola was adjusted so that the percentage of PSS and SSS in these samples as a percentage of the total shortening product matched the levels found in the corresponding 5% PSS samples of Examples 6-10. These Examples 16-20 were prepared to demonstrate that the shortening properties achieved with the addition of pure PSS also could be realized by the carefully controlled addition of a more readily available product, namely, fully hydrogenated cottonseed oil. The total added saturated fat in these Examples 16-20 was approximately 2% higher than for the corresponding Examples 6-10. Table 1 also sets forth the percentage of SSS and PSS of each sample based on the total sample, the weight ratio of PSS to SSS, and the percentage of SSS and PSS based on the total amount of added saturated fat.

TABLE 1

| | Sample Type | Total Added Saturated Fat (%) | Soybean Oil (%) | Fully Hydrogenated Canola (%) | Fully Hydrogenated Cottonseed (%) | Fully Hydrogenated Palm (%) | Pure PSS (%) | As a Percentage of the Total Sample | | $X = \dfrac{\% \text{ Enhancer}}{\% \text{ SSS}}$ | As a Percentage of the Total Added Saturated Fat | |
|---|---|---|---|---|---|---|---|---|---|---|---|---|
| | | | | | | | | SSS (%) | PSS (%) | | SSS (%) | Structural Enhancer (%) |
| 1 | No | 15.0 | 85.0 | 15.0 | | | | 12.0 | 2.4 | 0.20 | 80 | 16 |
| 2 | Added | 17.5 | 82.5 | 17.5 | | | | 14.0 | 2.8 | 0.20 | 80 | 16 |
| 3 | Structural | 20.0 | 80.0 | 20.0 | | | | 16.0 | 3.2 | 0.20 | 80 | 16 |
| 4 | Enhancer | 22.5 | 77.5 | 22.5 | | | | 18.0 | 3.6 | 0.20 | 80 | 16 |
| 5 | (Control) | 25.0 | 75.0 | 25.0 | | | | 20.0 | 4.0 | 0.20 | 80 | 16 |
| 6 | 5% PSS | 15.0 | 85.0 | 10.0 | | | 5.0 | 8.0 | 6.6 | 0.83 | 53 | 44 |
| 7 | | 17.5 | 82.5 | 12.5 | | | 5.0 | 10.0 | 7.0 | 0.70 | 57 | 40 |
| 8 | | 20.0 | 80.0 | 15.0 | | | 5.0 | 12.0 | 7.4 | 0.62 | 60 | 37 |
| 9 | | 22.5 | 77.5 | 17.5 | | | 5.0 | 14.0 | 7.8 | 0.56 | 62 | 35 |
| 10 | | 25.0 | 75.0 | 20.0 | | | 5.0 | 16.0 | 8.2 | 0.51 | 64 | 33 |
| 11 | 5% | 15.0 | 85.0 | 10.0 | 5.0 | | | 10.0 | 3.8 | 0.38 | 66 | 25 |
| 12 | Cotton | 17.5 | 82.5 | 12.5 | 5.0 | | | 12.0 | 4.2 | 0.35 | 68 | 24 |
| 13 | seed | 20.0 | 80.0 | 15.0 | 5.0 | | | 14.0 | 4.6 | 0.33 | 70 | 23 |
| 14 | | 22.5 | 77.5 | 17.5 | 5.0 | | | 16.0 | 5.0 | 0.31 | 71 | 22 |
| 15 | | 25.0 | 75.0 | 20.0 | 5.0 | | | 18.0 | 5.4 | 0.30 | 72 | 22 |
| 16 | PSS/ | 17.1 | 82.9 | 3.1 | 14.0 | | | 8.0 | 6.6 | 0.83 | 47 | 39 |
| 17 | SSS | 19.6 | 80.4 | 5.6 | 14.0 | | | 10.0 | 7.0 | 0.70 | 51 | 36 |
| 18 | Match | 22.1 | 77.9 | 8.1 | 14.0 | | | 12.0 | 7.4 | 0.62 | 54 | 34 |
| 19 | | 24.6 | 75.4 | 10.6 | 14.0 | | | 14.0 | 7.8 | 0.56 | 57 | 32 |
| 20 | | 27.1 | 72.9 | 13.1 | 14.0 | | | 16.0 | 8.2 | 0.52 | 59 | 30 |

By increasing the amount of structural enhancer one can reduce the total added saturated fat content of the shortening and still achieve shortening products with desired handling properties. Although the structural enhancers themselves are saturated fats, each incremental increase in structural enhancer allows a much larger decrease in other saturated fats, resulting in an overall lowering of the total saturated fat content, which is a desirable feature. Thus in Example 20, the wt % ratio of PSS/SSS is 0.51, and the shortening has a total saturated fat content of 27.1%. In Example 16, the wt % ratio of PSS/SSS is increased to 0.83 (i.e., more structural enhancer PSS is used), and the total saturated fat content is 17.1%.

Sample Preparation

Samples were prepared in 50 gram quantities by combining the ingredients in an appropriate vessel, heating the contents to 90° C., and stirring with a mechanical stirrer for 2 minutes to ensure homogeneity and to destroy crystal memory. Quantities of each molten sample to be analyzed were then transferred to appropriate containers depending on the particular analysis to be undertaken (i.e., aluminum pans for differential scanning calorimetry (DSC) and hardness, appropriate tubes for nuclear magnetic resonance (NMR) and x-ray diffraction (XRD)).

Sample cooling and heating rates of 10° C./min and 5° C./min respectively were used and are reported to a certainty of ±0.1° C./min. The hardness, final solid fat content (SFC), XRD, and microscope measurements were performed at a stage temperature of 20.0±0.5° C. The samples were stored in a cooled chamber at 20.0±0.5° C. All measurements were performed in triplicate (n=3) and the mean values are reported with their subsequent standard deviations Relative Hardness Measurements The molten samples were transferred into round flat bottomed aluminum DSC pans. The samples were cooled at controlled rates in the pans using a "Linkam LTS 350" temperature controlled stage (Linkam Scientific Instruments, Tadworth, Surrey, United Kingdom). Specifically, the samples were heated to 90° C., held there for five minutes, and then cooled at a rate of 10° C. per minute to 20° C. After thermal processing, the samples were stored for 2, 4, 6, 8, 10, and 13 days at 20° C. A TA.XT.plus Texture Analyzer (Stable Microsystems, Surrey U.K.) fitted with a 1.0 kg load cell was used to obtain hardness measurements. During testing, the stage temperature was maintained by an Autotune CAL 9300 (CAL Controls Ltd., Herts U.K.) temperature controlled chamber fitted to the texture analyzer. Sample penetration and data acquisition were controlled by the Texture Exponent 32 (Version 2.0.0.7, www.SaxSoft.com) software. The texture analyzer was fitted with a stainless steel ball probe with diameter 3.175±0.001 mm (provided by Texture Technologies Corp., probe number TA 8A) and a penetration depth of 1.5±0.1 mm and speed of 0.5±0.1 mm/s. The maximum force of the force displacement graph obtained was used as the measure of relative hardness.

Figure 2A:
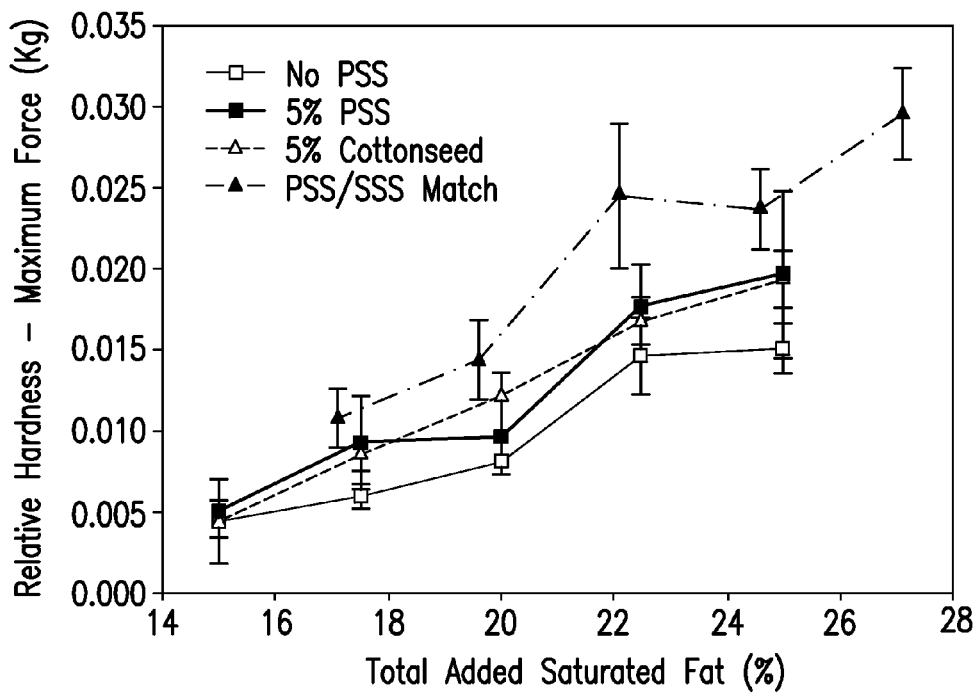
FIG. 2a is a graph illustrating the relative hardness of shortening samples having different levels of saturated fats after 13 days of storage.

FIG. 2 (a) shows the relative hardness as a function of total added saturated fat for each Example 1-20, after being stored for 13 days. It may be seen that as the amount of total added saturated fat increases the relative hardness of the shortening increases, as is to be normally expected. It also may be seen that generally Examples 6-10 having 5% PSS and Examples 16-20 which were formulated to be the PSS/SSS Match of Examples 6-10, these examples being illustrative, had greater relative hardness than the corresponding control samples 1-5 (no added PSS) and 10-15 (5% cottonseed), respectively. For example, Example 17 having a PSS/SSS match (a ratio of 7:10 of PSS to SSS) and a total of 19.6% saturated fat, demonstrated the same level of hardness as control Example 5 which had 25% saturated fat and no PSS added. This indicates that hardness can be maintained whilst reducing the level of saturated fat by 5.4%, when the PSS is used as a structural enhancer with targeted levels referenced to the level of SSS in the sample.

Figure 2B:
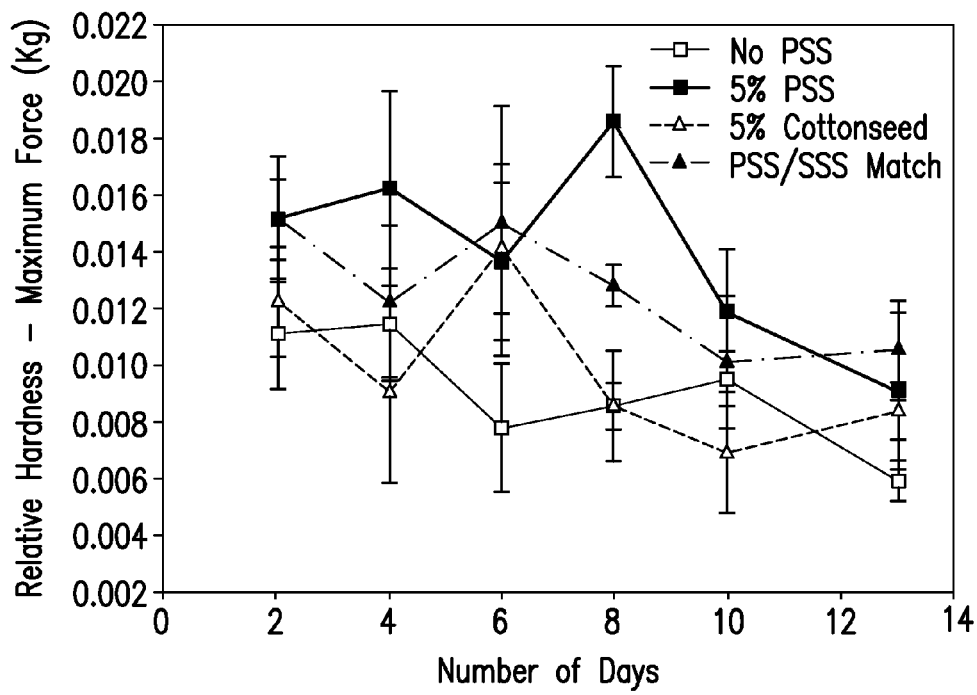
FIG. 2b is a graph illustrating the change in relative hardness of selected samples having about the same level of saturated fat over time.

FIG. 2(b) shows the evolution of hardness as a function of time for Examples 2, 7, 12, and 16. These examples were selected for hardness evaluation as being the samples in each type with the lowest added saturated fat, all at about 17%, and therefore the most desirable of the various shortenings products tested in this group. The hardness for all samples tends to decrease slightly as the storage time increases. In both Figures, it may be seen that the relative hardness of the 5% PSS samples and the PSS/SSS Match samples was generally greater than that of the two sets of control samples. Further, the relative hardness values of all these Examples 1-20 was generally on the order of the hardness of commercial shortening products.

Evaluation of Polymorphism by XRD

A "Bruker's AXS X-ray diffractometer" equipped with a filtered Cu—Kα radiation source (λ=0.1542 nm) was used for XRD analysis. The procedure was automated and commanded by Bruker AXS' "General Area Detector Diffraction System" (GADDs V 4.1.08) software. The XRD samples were prepared by filling glass capillary tubes with the molten sample. The tubes were tempered at 10° C./min to the final holding temperature of 20° C. in a "Linkam LTS 350" temperature controlled stage described above. The sample was held isothermally in the Linkam for 30 minutes at this final temperature. The sample tube was then fitted with the brass holder and then quickly transferred for analysis to the XRD stage where the temperature was maintained at 20° C.±0.5° C. via the "Air Jet" cooling system (Kinetics-Thermal Systems, New York, USA). The XRD frames, obtained after 450 seconds exposure to a monochromatic Cu—Kα X-ray beam, were processed using GADDS software and the resulting spectra were analyzed using Bruker AXS's "Topas V 2.1" software.

Figure 3A:
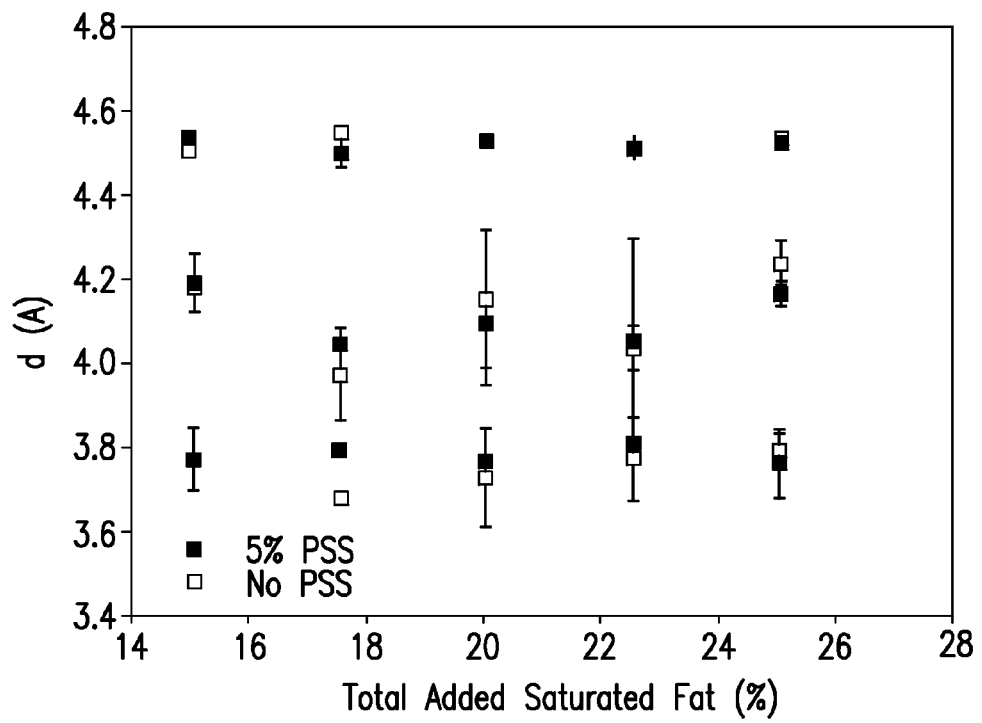
FIGS. 3(a)-(c) are graphs of data taken from x-ray diffraction spectra showing the polymorphism of shortening samples after 2 days, each graph showing data from a No Added PSS sample compared with samples having (a) 5% added PSS, (b) 5% Cottonseed, and (c) PSS/SSS Match, respectively.
Figure 3B:
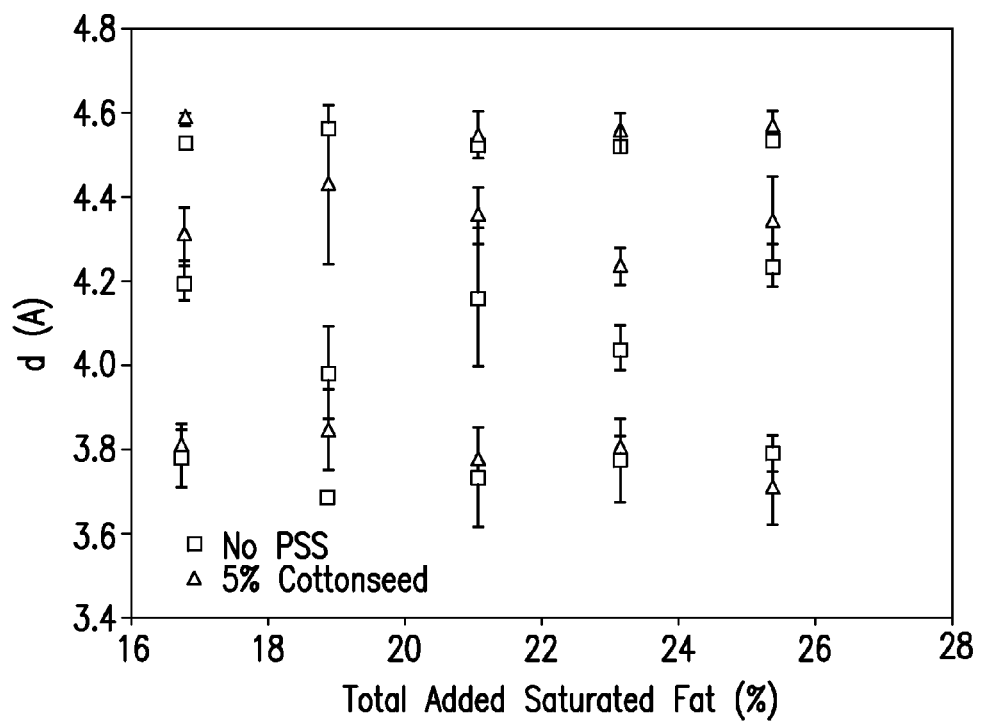
Figure 3C:
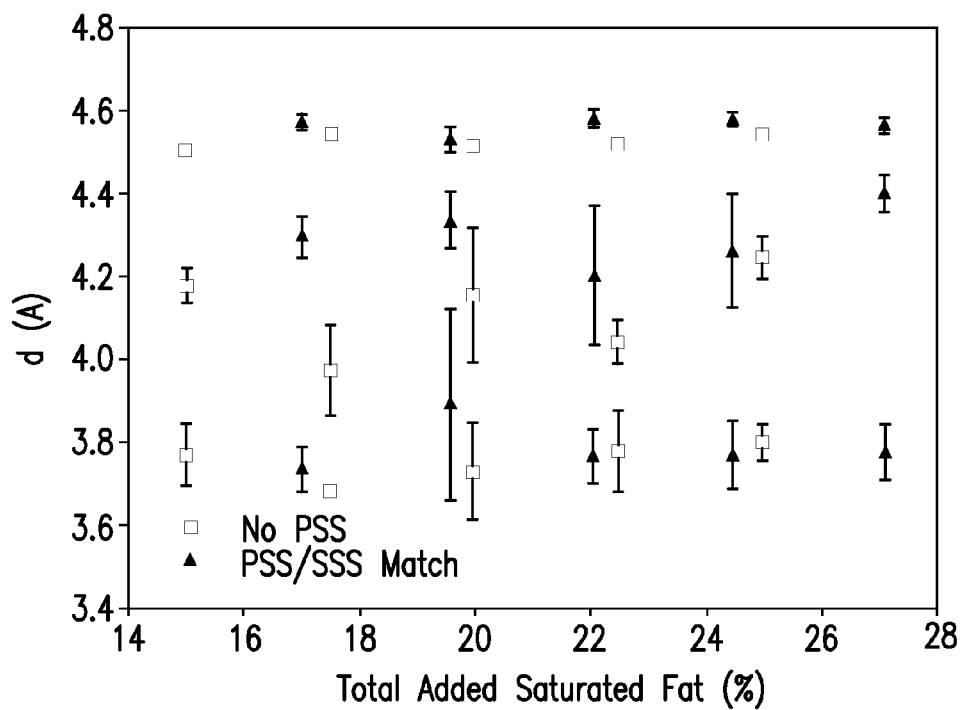

FIGS. 3(a)-(c) show the d-spacings in Angstroms as a function of the total added saturated fat for each of the Examples 1-20 after being tempered for two days. Specifically, FIG. 3(a) compares Examples 1-5 with Examples 6-10; FIG. 3(b) compares Examples 1-5 with Examples 11-15; and FIG. 3(c) compares Examples 1-5 with Examples 16-20. The short d-spacings after 2 days are shown in FIG. 3 with three peaks in the XRD spectra for each sample within the short spacing range. The XRD outputs a spectrum of angle of deflection (x-axis) versus number of incidents at this angle (y-axis). The angle of deflection is then converted into the distance between the diffracting planes of particles, or d-spacing. The XRD spectrum is divided into two regions, short and long spacings. The long spacings represent the diffraction between multiple layers (i.e., the distance between layers 2 and 4 instead of 2 and 3). The short region is the one that the crystalline form definition applies (typically less than 6 angstroms). The location of each peak in the short region corresponds to a d value, which is shown in FIG. 3. Three d-spacings are evident for the four sample types: 3.8±0.3 Å, 4.2±0.2 Å and 4.5±0.2 Å. The first two short spacings are suggestive of the beta prime polymorph, while the third short spacing persists just below the 4.6 Å beta spacing. This has been seen before, but has yet to be well explained. Thus all the shortening samples are a mixture of beta and beta prime polymorphs, which is typical and preferred for a shortening product.

Figure 3D:
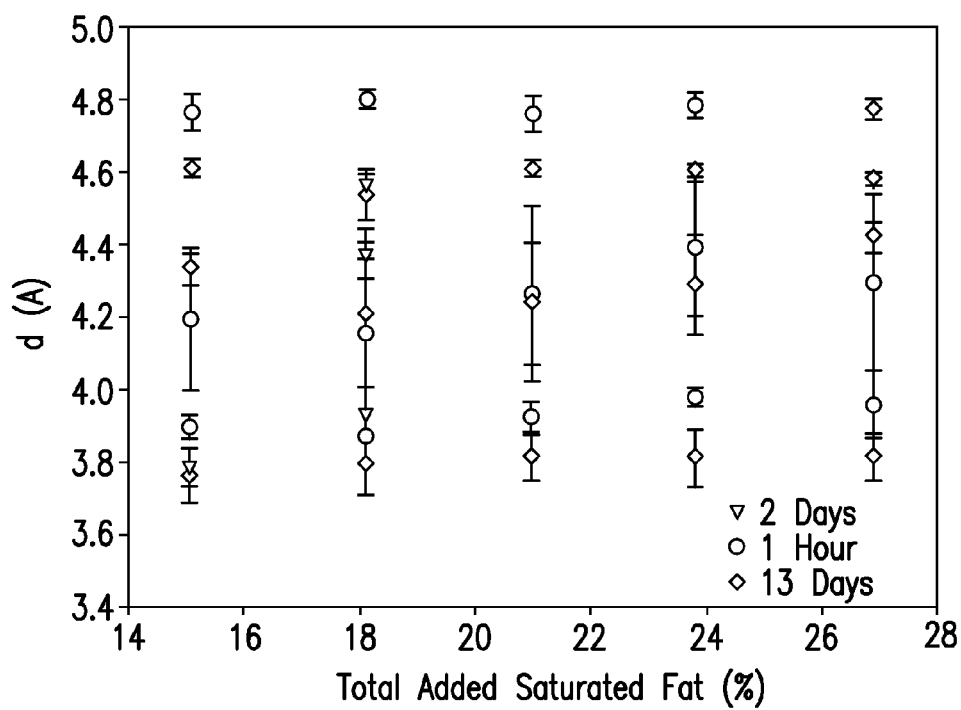
FIG. 3(d) is a graph of data taken from x-ray diffraction spectra showing the effect of storage for one hour, two days, and 13 days on the polymorphism of a PSS/SSS Match sample.

The d-spacings for the No PSS, 5% PSS, and 5% Cottonseed samples, like the angle of tilt, θ, do not change over time. FIG. 3(d) illustrates the changes in the short d-spacings for the PSS/SSS Match samples of Examples 16-20 over time. It may be seen that the spacings change after 1 hour, and then remain the same for 2 and 13 days. In the short spacing region, the alpha polymorph is characterized by a reflection at 4.2 Å and the beta by strong reflections at 4.6 Å and 3.8 Å. The beta prime polymorph exhibits either two spacings at 3.8 Å and 4.2 Å or three spacings at 4.3 Å, 4.0 Å and 3.7 Å.

SFC Determination by NMR

SFC (solid fat content) data was acquired using the pulse magnetic resonance spectrometer "Minispec mq SFC Analyzer" (Bruker Instruments, Milton, Ontario, Canada), equipped with a temperature controlled measurement chamber. The data sampling procedure was fully automated, and the SFC was calculated and displayed by the "Minispec v2.20 Rev.01/NT" software.

The NMR tubes were filled with molten fat to a height of 3.5±0.1 cm. To achieve the cooling rate of 10° C./min, the samples were first heated to 90° C. and held there for 5 minutes before being transferred through a series of water baths, separate from the NMR, at prescribed times. The samples were then held isothermally at 20° C. The SFC was measured after 1 hour, 2 days and 13 days. The reported SFC values are the average of the SFC values provided by the NMR software for each of the 3 NMR tubes filled with the sample.

Figure 4A:
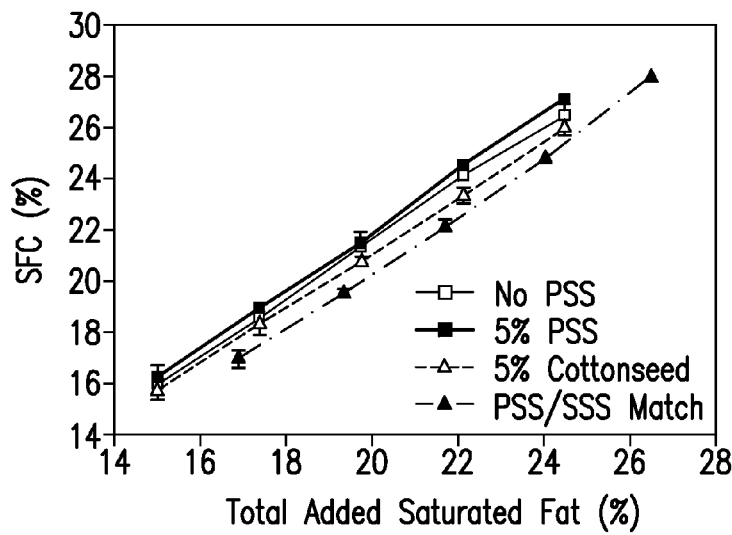
FIGS. 4(a)-(c) show the final SFC (solid fat content) of the shortening samples as a function of total added saturated fat after 1 hour, 2 days, and 13 days, respectively.
Figure 4B:
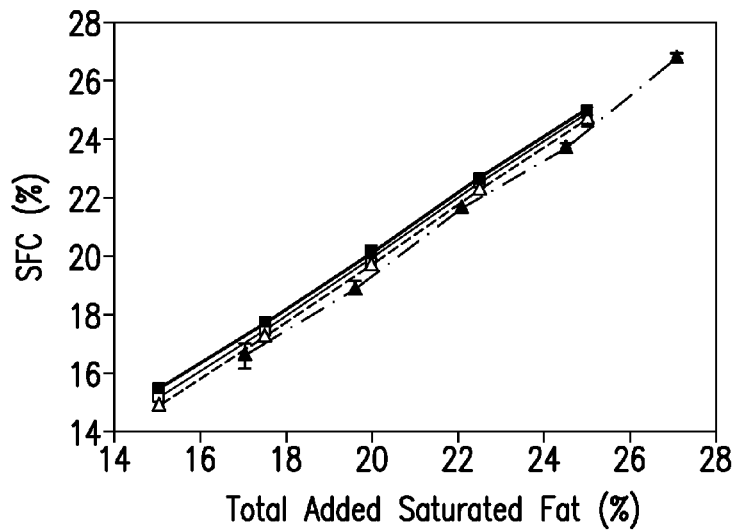
Figure 4C:
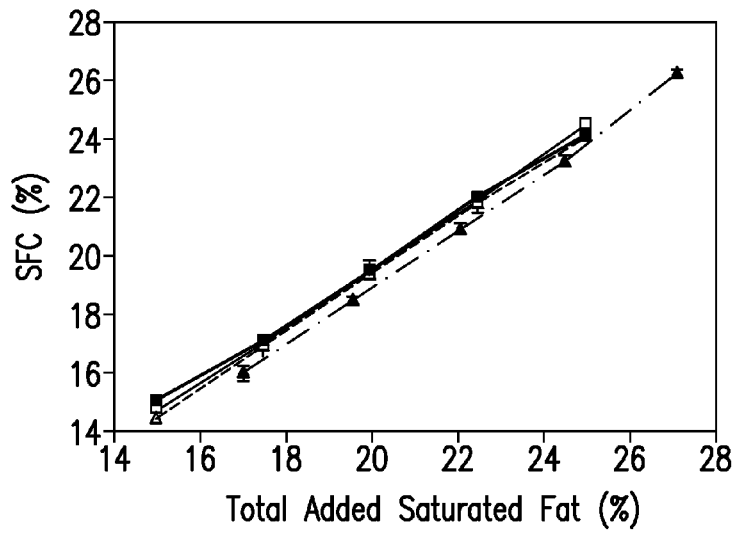

The SFC of all the shortening samples of examples 1-20 measured after (a) 1 hour, (b) 2 days, and (c) 13 days is shown in FIGS. 4(a)-(c), respectively. SFC increased linearly as a function of the amount of saturated fat for all samples, as is shown in all of the figures. The PSS/SSS Match samples had a lower SFC for the same amount of total added saturates than the corresponding samples for No Added PSS, 5% PSS, and 5% Cottonseed. As the storage time increased, the percent SFC for all samples decreased, as does the difference between the SFC of the PSS/SSS Match sample and the other sample types investigated. However, even after 13 days of storage, the SFC of the PSS/SSS Match samples was lower at all levels of added saturated fat, as shown in FIG. 4(c). At the same time, these samples were harder, which reveals that the effect of the structural enhancer in the appropriate proportions to SSS results in the development of a unique network structure which is harder with less actual solids.

DSC Measurements, Thermal Behaviour

A "DSC 2920 Modulated DSC" by TA Instruments was used in the non-modulated DSC mode for thermal measurements. Each sample was pipetted in consistent amounts (10 to 15 mg each) into three aluminum DSC pans, which were then hermetically sealed. An empty aluminum pan was used as a reference. The samples were held isothermally at 90° C. for 5 minutes and then cooled at 10° C./min down to 20° C. where they were equilibrated for 45 minutes to allow crystallization to complete. The sample was then immediately heated to 90° C. at a constant rate of 5° C./min to obtain the zero hour melting curve. Each sample was then recrystallized using the same conditions and stored to obtain the 48 hour melting curve and the 13 day melting curve.

The data sampling and temperature control procedures were fully automated and controlled by the "TA Instrument Control" software program. The data was analyzed using the "TA Universal Analysis" software (Bouzidi, L., M. Boodhoo, K. Humphrey, and S. Narine, Use of first and second derivatives to accurately determine key parameters of DSC thermographs in lipid crystallization studies, *Thermochimica Acta*, 439: 94-102 (2005)). All curves were normalized to a uniform sample mass of 15 milligrams.

Figure 5:
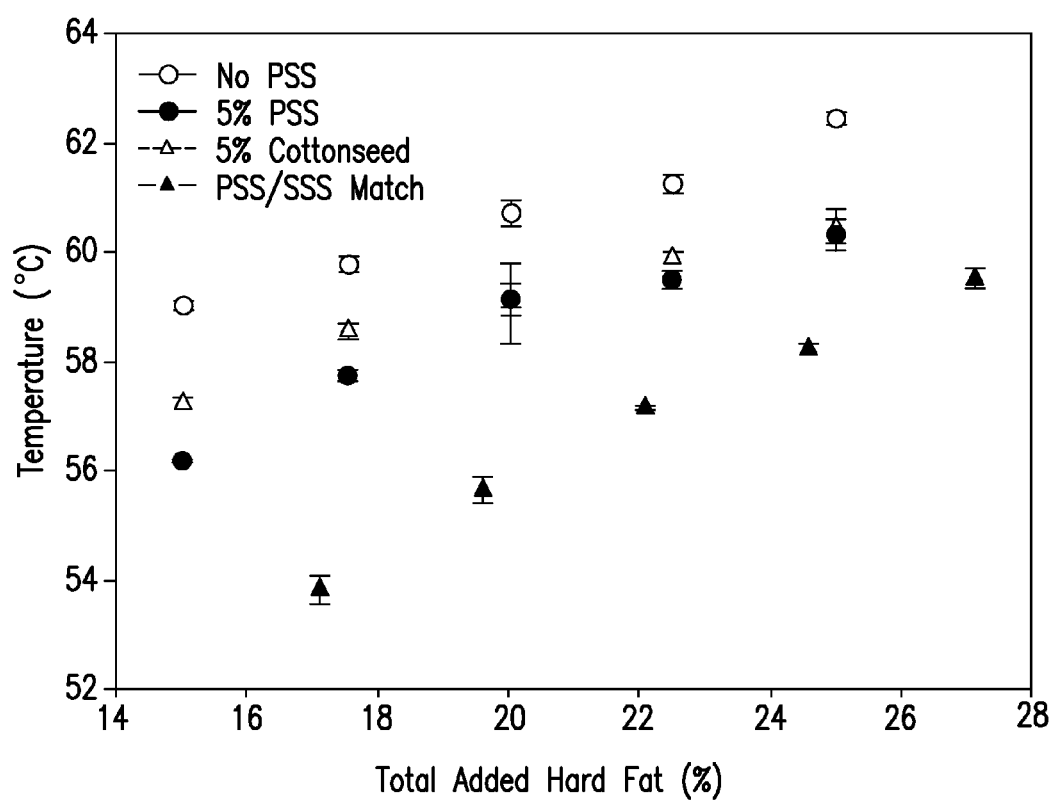
FIG. 5 shows the peak maximum of the melt curve as a function of the total added saturated fat after 48 hours by DSC.

The peak maximum of the enthalpy of melt curve as a function of the total added saturated fat after 48 hours for each of Examples 1-20 is shown in FIG. 5. As the amount of saturated fat in the sample increased, the melting peak maximum also increased. The control samples of Examples 1-5 (No Added PSS) had the highest melting peak maxima at all levels of total added saturated fat (59.0±0.1° C. to 62.4±0.1° C.). Thus, there is a preponderance of high melting compounds formed in this sample (No PSS) as compared to the PSS/SSS Match samples of examples 16-20 where the melting peak maxima are at much lower temperatures (53.8±0.2° C. to 59.5±0.2° C.). Since the melting peak maxima of the 5% PSS sample (56.1±0.0° C. to 60.3±0.3° C.) is lower than that of the control, the inclusion of PSS into the shortening blend aids in the formation of higher concentrations of lower melting compounds. However, this does not mean that the PSS/SSS Match sample does not contain higher melting compounds; rather it suggests that the bulk of the compounds formed during the crystallization process of Examples 16-20 tend to melt at lower temperatures than the bulk of the compounds formed during the crystallization of the No PSS samples of Examples 1-5. The melting peak maxima of the 5% Cottonseed samples of Examples 6-10 (57.2±0.1° C. to 60.4±0.3° C.) are somewhat lower than those of the No PSS samples, yet not as low as the 5% PSS or the PSS/SSS Match samples. The melting peak maxima of the 5% PSS samples are not as low as those of the PSS/SSS Match samples potentially due to the lower levels of the higher melting TAG SSS in the 5% PSS sample type (53 to 64% versus 47 to 59% in the PSS/SSS Match sample).

(B) Examples 21-25

Five pilot plant scale shortening samples were prepared in which soybean oil was used as the liquid fraction and the solid fraction comprised fully hydrogenated canola oil taken either alone or in combination with fully hydrogenated cottonseed oil. The fully hydrogenated canola and cottonseed hard fats, and soybean oil were all supplied by Bunge Oils (Bradley Ill., USA). The compositions of these Examples 21-25 are set forth in Table 2.

TABLE 2

| Exm. No. | Sample Type | Total Added Saturated Fat (%) | Soybean Oil (%) | Fully Hydrogenated Canola (%) | Fully Hydrogenated Cottonseed (%) |
| --- | --- | --- | --- | --- | --- |
| 21 | No PSS | 15.0 | 85.0 | 15.0 | |
| 22 | (control) | 20.0 | 82.5 | 20.0 | |
| 23 | | 25.0 | 75.0 | 25.0 | |
| 24 | 5% Cottonseed | 17.5 | 82.5 | 12.5 | 5.0 |
| 25 | PSS/SSS Match | 17.1 | 82.9 | 3.1 | 14.0 |

The pilot plant scale Examples 21-25 have composition corresponding to laboratory scale Examples 1, 3, 5, 12, and 16, respectively. Example 25 was formulated so that its percent total added saturated fat and ratio of PSS/SSS matched Example 6.

Sample Preparation

The molten samples were processed in a Gerstenburg Pilot Plant Votator 3×57 scraped surface heat exchanger. Three parameters that can be varied on this equipment are (1) the temperature at which the shortening exits the scraped surface heat exchanger, known as the "fill" temperature, either 50° F. (low) or 67° F. (high), (2) perfecter revolutions per minute (RPM) (in this study all done at high speed) and (3) pump speed capacity of 50% (low) or 70% (high). The crystallized samples were poured from the votator into 3 lb plastic tubs, 8" in diameter and sealed with plastic lids. A fourth processing parameter that could be varied was the temperature at which the packaged samples were tempered. Half of the samples were stored at 85° F. for 2 days before being stored at 70° F., and duplicate samples were immediately stored at 70° F. Designations for the samples setting forth each of these four processing parameters are set forth in Table 3.

TABLE 3

| Sample ID | Pump Speed (% Capacity) | Fill Temperature (° F.) | Perfector RPM | Tempering (° F.) |
| --- | --- | --- | --- | --- |
| LMH 70 | Low (50%) | Medium (67) | High (100) | 70 |
| LMH 85 | Low (50%) | Medium (67) | High (100) | 85 |
| LLH 70 | Low (50%) | Low (50) | High (100) | 70 |
| LLH 85 | Low (50%) | Low (50) | High (100) | 85 |
| HMH 70 | High (70%) | Medium (67) | High (100) | 70 |
| HMH 85 | High (70%) | Medium (67) | High (100) | 85 |
| HLH 70 | High (70%) | Low (50) | High (100) | 70 |
| HLH 85 | High (70%) | Low (50) | High (100) | 85 |

Each of the five Examples in Table 2 was processed in each of the eight protocols shown in Table 3, for a total of 40 samples, and two tubs were filled of each of these to allow for replicates.

Relative Hardness Measurements

Hardness was measured by a procedure identical to that used for Examples 1-20, except that a Texture Technologies TA-XT2—Texture Analyzer was used. Each tub was penetrated with a spherical ball probe with diameter ⅛ inch. The depth of penetration was 1.5 mm and the speed of penetration was 0.5 mm/s. The maximum force of penetration was taken as the relative hardness of the sample. Each tub was penetrated four times proceeding radially inward at ½ inch steps starting ½ inch from the exterior of the tub. Given that there were two tubs for each sample at each processing and tempering condition, this resulted in 8 penetrations for each sample. Measurements were reported as an average and standard deviation of the 8 penetrations. Measurements were taken 7 and 14 days after processing.

The hardness of the shortening samples after 7 days is shown in FIGS. 6(a)(i) and (ii) for all samples that had been tempered at (i) 70° F. and (ii) for two days at 85° F. and then at 70° F. The PSS/SSS Match sample was consistently as hard as or harder than the 5% cottonseed sample. Tempering the samples at 85° F. increased the hardness of the PSS/SSS Match sample of Example 25 and decreased the hardness of the 25% fully hydrogenated canola oil shortening of Example 23. For the HMH, LLH, and LMH processing schemes, the PSS/SSS Match sample that had been tempered at 85° F. for two days and then continuing at 70° F. was harder than all the other shortening blends tested, highlighting an increase in hardness with an 8% reduction in total added saturates.

The hardness of the shortening samples after 14 days is shown in FIG. 6(b)(i) and (ii) for all samples that had been tempered at (i) 70° F. and (ii) for two days at 85° F. and then at 70° F. After 14 days, the PSS/SSS Match samples are consistently harder than the 5% Cottonseed samples. Again, tempering at 85° F. causes the PSS/SSS Match samples to be much harder than those tempered only at 70° F. while decreasing the hardness of the 25% fully hydrogenated canola shortening samples. As with the shortening samples tested 7 days after processing, in those samples tested 14 days after processing, the PSS/SSS Match sample tempered at 85° F. and processed with the regimes HMH, LLH, and LMH were harder than those tempered at 70° F. and those processed with HLH. For the processing regime HMH with tempering at 85° F., the PSS/SSS Match sample was harder than the 25% fully hydrogenated canola sample after 14 days, even with an 8% decrease in total added saturates in the PSS/SSS Match shortening sample.

NMR Measurements, SFC Determination

SFC data was acquired using a Bruker NMS120 pulse magnetic resonance spectrometer NMR Solid Fat Content Analyzer equipped with a temperature controlled measurement chamber. The data sampling procedure was fully automated, and the SFC was calculated and automatically printed out by the NMR.

NMR tubes were filled with the solid sample from each plastic tub at the time of measurement after 1 and 2 weeks. The sample was either spooned into the top of the NMR tube (very soft sample) or a plug of solid sample (very firm samples) was inserted into the tube. The bottom of the tube was then tapped on the table until the sample rested at the bottom of the tube. The sample tubes were filled with the processed shortenings to a height of 3.5 cm±0.1 cm. The tube was then inserted in to the NMR and a measurement was taken immediately. Three tubes were filled for each sample. The SFC is reported as the average and standard deviation of the three SFC's recorded.

The SFC of the shortening samples after 7 days is shown in FIGS. 7(a)(i) and (ii) for all samples that had been tempered at 70° F. (i) and for two days at 85° F. and then at 70° F. (ii). For Examples 21, 22, and 23 having 15, 20 and 25% fully hydrogenated canola, respectively, it was found that as the amount of added saturated fat increased, the percent SFC also increased, regardless of the other processing conditions. The blended samples each containing 17.1% (PSS/SSS Match) and 17.5% (5% Cottonseed) total added saturated fat have a lower SFC than the 20% total added saturated fat sample. The samples other than the PSS/SSS Match sample (corresponding to Example 16) have low saturated fat contents, but do not have a ratio of PSS/SSS within the range provided herein, and do not have percentages of structural enhancer as a percentage of total added saturates that fall within the scope of the compositions provided. While there is little effect on SFC after 7 days with changing the processing protocols and tempering conditions of the shortening, the data show that tempering at 85° F. for two days lowered the SFC of the PSS/SSS Match samples of Example 25 at all processing conditions tested. Without wishing to be bound by theory, it is believed that during the time the shortening was held at a higher temperature, the molecules within the PSS/SSS Match sample built a crystal network structure that led to a harder shortening (FIG. 6(a)(ii)) while not increasing the SFC of the shortening (FIG. 7(a)(ii)).

FIGS. 7(b)(i) and (ii) show the SFC data after 14 days for the samples that had been tempered at 70° F. (i) and for two days at 85° F. and then at 70° F. (ii). As with the SFC after 7 days (FIGS. 7(a)(i) and (ii)), for Examples 21, 22, and 23, i.e., the binary blends of fully hydrogenated canola in soybean oil, the SFC increased as the amount of total added saturates increased, regardless of the processing protocol used. With the exception of LLH sample tempered at 70° F., for Examples 24 and 25 with fully hydrogenated cottonseed included (17.5% and 17.1% total added saturates in 5% Cottonseed and PSS/SSS Match samples, respectively) all of the shortening samples had a lower SFC than the 20% Canola sample. This data suggests that the entrapped oil had not been crystallized after a holding time of 14 days.

After 14 days all samples that had been tempered for two days at 85° F. had a lower SFC than those that had been tempered only at 70° F. This suggests that holding the shortening samples at a higher temperature provides sufficient energy to the crystallizing system to build a crystal structure, so that the shortening product will have a lower SFC while still having desirable hardness (FIG. 7b).

DSC Measurements, Thermal Behaviour

DSC evaluations were conducted for the samples of Examples 21-25 using the same equipment and procedures as were used for Examples 1-20. FIGS. 8(a) and (b) illustrate the melting peak maxima by DSC after 7 (a) and 14 (b) days for samples that had been tempered at 70° F. (i) and for two days at 85° F. and then at 70° F. (ii). For Examples 21-23 composed of fully hydrogenated canola in soybean oil, it was found that increasing the amount of added saturated fat in the samples resulted in an increase in the melting peak maximum. The PSS/SSS Match samples peak maxima of Example 25 were all lower than those of the 5% Cottonseed shortening samples of Example 24, as well as those of any of the soybean/FH canola binary mixtures of Examples 21-23. Lower peak melting maxima suggest that the bulk of the crystallized shortening was melted at lower temperatures than those of samples with higher peak maxima. This in turn suggests either that there were more lower melting TAGs in the starting lipid, or that more lower melting compounds were formed during the crystallization of the shortening.

Altering the processing conditions of a set of shortening samples influenced the hardness, SFC and melting characteristics of the samples. It was found that the hardness of the 5% Cottonseed and PSS/SSS Match samples, Examples 24 and 25, respectively, was maximized if the samples were crystallized in the votator with both a high pump speed and medium fill temperature, or with a low pump speed, and if the samples were tempered for two days at 85° F. Conversely the less ideal processing parameters are higher pump speeds and lower fill temperatures.

The shortening samples of Examples 21-25 were made into cream icings using the Cream Icing Test Method outlined below. For these five examples, 5.5% (w/w) of each test shortening was replaced an all purpose emulsifier that includes mono- and di-glycerides, and supplied by Bunge Oils under the trademark Vrest. Three commercially available shortenings sold under the registered trademarks Vreamay®, Vreamay Right®, and Vreamay® NT by Bunge Oils were also made into icings, without additional emulsifier.

Each icing preparation included XXX sugar (1362.00 g), test shortening (397.25 g), non-fat milk solids (85.10 g), salt (7.08 g), bourbon type vanilla (7.08 g), and water (227.00 g). The icing ingredients were placed into a 10 quart bowl and mixed at low speed with a Hobart mixer model C-100 for 30 seconds. After mixing, the bowl and beater were scraped down. The icing was then creamed at the low mixer speed for 15 minutes, scraping again after 3 minutes.

Trench Score

The ability of each shortening product to maintain its structural integrity and shape was quantified by determining its trench score according to the directions in Cream Icing Test Method as follows. Immediately after mixing, a trench 4 inches deep almost to the bottom of the mixing bowl was cut into the finished icing with a 1 inch wide metal spatula. A score was assigned relating to the length of time for the trench to close due to the plastic deformation due to the weight of the icing. Digital pictures of each sample trench were taken 2 minutes after creating the trench. The trench score scale was as follows:

| Seconds to closing | Points |
| --- | --- |
| 0-5 | 0 |
| 6-15 | 1 |
| 16-30 | 2 |
| 31-60 | 3 |
| >61 | 4 |

The trench scores for the test icings are shown in Table 4. Two of the three control icings (Vreamay® NH and Vreamay Right®) had trench scores of 4 while the third control icing (Vreamay®) had a trench score of 0.

TABLE 4

Average Trench (n = 2)

| Processing | Temper | PSS/SSS Match | 5% Cottonseed | 15% Hard Fat | 20% Hard Fat | 25% Hard Fat |
| --- | --- | --- | --- | --- | --- | --- |
| HLH | 70 | 0 | 0 | 0 | 0 | 0 |
| HLH | 85 | 0 | 0 | 0 | 0 | 0 |
| HMH | 70 | 0 | 0 | 0 | 0 | 0 |
| HMH | 85 | 0.5 | 0.5 | 0 | 0 | 0 |
| LLH | 70 | 0 | 0 | 0 | 0 | 0 |
| LLH | 85 | 0 | 0 | 0 | 0 | 0 |
| LMH | 70 | 0 | 0 | 0 | 0 | 0 |
| LMH | 85 | 2 | 0 | 0 | 0 | 0 |

Controls
Vreamay 0
Vreamay NH 4
Vreamay Right 4

All the test icings based on the shortenings of Examples 21-25 had a trench score of zero, except that the test icings of Example 24 containing 5% Cottonseed and Example 25 containing the PSS/SSS match, and processed with HMH and tempered at 85° F., had an average (n=2) trench score of 0.5, This suggests that the test icings were not very stable, and thus would not be very useful for creating stable icing based elements (such as roses on cakes, or filling in a sandwich type cookie). In certain embodiments, emulsifiers are added to the shortening to improve its icing performance. Suitable emulsifiers for use are known to one of skill in the art.

Specific Gravity

The specific gravity of each prepared icing was measured directly after the Trench Score and photos of the trench were taken. The specific gravity of the icings was measured at 15 minutes by the following procedure: An aluminum moisture cup 2.25 inches in diameter and 2.25 inches tall with exactly 200.00 gram of water capacity was filled with the prepared icing. The mass of the contents (in grams) of the cup was divided by 200.0 g.

Typically a low specific gravity is desired in an icing. Each of the control icings had a specific gravity ranging from 0.75±0.02 (for the icing made with Vreamay Right®) to 0.79±0.01 (Vreamay®) as shown in Table 5.

TABLE 5

| Control Sample | Specific Gravity | Slide | Slump |
| --- | --- | --- | --- |
| Vreamay | 0.79 ± 0.01 | 16 ± 3 | 0.79 ± 0.0 |
| Vreamay Right | 0.75 ± 0.02 | 8, 42 | 5.0, 27.5 |
| Vreamay NH | 0.76 ± 0.00 | 19, >51 | 10.0, 30.0 |

The specific gravities of each of the test icings are shown in FIG. 11 for the processing conditions (a) HMH, (b) LMH, (c) HLH, and (d) LLH as a function of the tempering. Tempering at 85° F. typically reduced the specific gravities of the icings made from the 5% cottonseed and PSS/SSS Match shortenings processed with each of the four regimes. The PSS/SSS Match shortening of Example 25 produced icings with specific gravities ranging from 0.79 (LMH 85° F.) to 1.02 (HLH 75° F.). The PSS/SSS Match samples had the most lowest specific gravities when used in cream icings, and those samples that had been tempered at 85° F. had the lowest specific gravities. The specific gravity of the PSS/SSS Match sample processed with LMH and tempered at 85° F. (0.79) was very similar to that of the control icing made with Vreamay® (0.79±0.01).

Slump-Slide Tests

Immediately following the specific gravity measurement, a slump test was performed to measure the plasticity of the shortening. A Slump-Slide test box as shown in FIG. 1 was placed on a stable and solid table to avoid vibration. The table was leveled by adjusting the set-screw legs. The Slump-Slide test box was dry at room temperature (70° to 76° F.). The Slump-Slide test box was completely filled with prepared icing using a rubber spatula, while the box was in a horizontal position. The icing temperature was between about 60° F. and about 72° F. The excess icing was scraped off with the spatula so the box was level and full. The excess icing was scraped from the bottom to the top of the box. Next, a small paring knife was run between the top of the box and the icing. The box was promptly stood on end and the edge of the box was placed even with the "0" line on the base. The box was allowed to stand for 10 minutes, such that icing could slump out of the box. After ten minutes, the slump (horizontal displacement over onto the base) and slide (vertical displacement down the back of the box) of the icing were measured in millimeters.

Figure 9A:
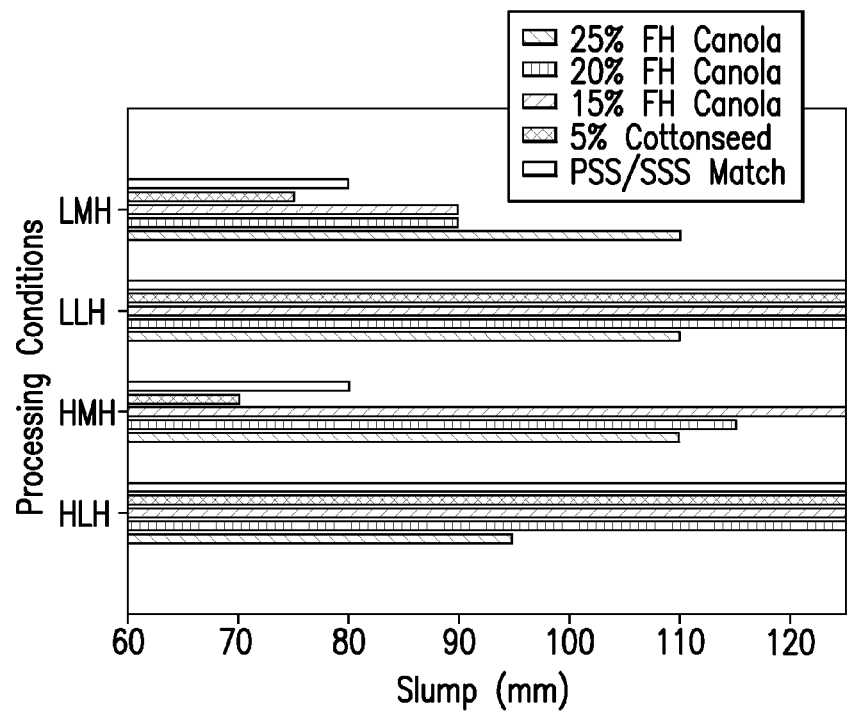
FIG. 9 shows the "slump slide" slump scores of each of the test icings made from shortening samples, the shortening samples being (i) tempered at 70° F. and (ii) tempered at 85° F. for two days and then at 70° F.
Figure 9B:
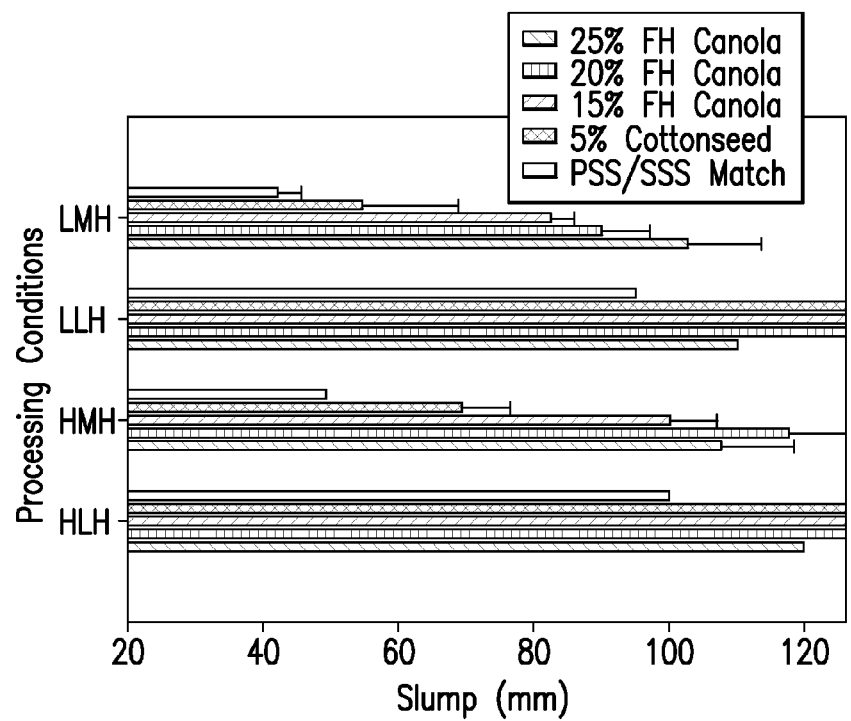

The slump-slide tests were performed on the icing samples to predict how the icings would stand up in vertical applications (such as on the side of a cake). Typically a slump of less than 30 mm is desired for these applications. FIG. 9 shows the "slump slide" slump scores of each of the test icings made from shortening samples, the shortening samples being (i) tempered at 70° F. and (ii) tempered at 85° F. for two days and then at 70° F. The slump and slide values for the control samples are shown in Table 5; the two measurements for each of the Vrearnay Right and Vreamay NH samples are reported separately. For the icings made from shortenings tempered at 85° F., the slump values ranged from 42.5 mm (PSS/SSS Match LMH) to >125 mm (5% Cottonseed, 15 and 20% fully hydrogenated canola each processed at HLH and LLH). This indicates the HMH and LMH processing regimes were more beneficial to reducing the slump in the cream icing.

It was also observed that the PSS/SSS Match samples also tended to slide within the Slump-Slide test box in the same manner as the control samples. The icing pulled away from the Slump-Slide test box and held a rectangular shape at the top while it was sliding while the 5% Cottonseed and the three binary blends tended to coat the Slump-Slide test box while sliding even though their slump and slide scores were much higher than the control. All of the icings had exhibited slide past the scale markings on the device; and therefore slide values are not reported.

Each icing sample was stored in sealed 3 lb plastic containers at room temperature for one week. At this time the homogeneity and airiness of each icing sample was recorded for the sample at the top and bottom of each container. These observations are summarized in Table 6.

TABLE 6

| Sample | Processing Condition | Top Homogenous | Top Airy | Bottom Homogenous | Bottom Airy |
|---|---|---|---|---|---|
| PSS/SSS Match | HLH 70 | X | | | |
| | HLH 85 | | X | | |
| | HMH 70 | | X | X | X |
| | HMH 85 | X | | X | X |
| | LLH 70 | | | | |
| | LLH 85 | | X | | X |
| | LMH 70 | | X | | X |
| | LMH 85 | X | X | X | X |
| 5% CottonSeed | HLH 70 | | | | |
| | HLH 85 | | | | |
| | HMH 70 | | | | |
| | HMH 85 | | | | |
| | LLH 70 | | | | |
| | LLH 85 | | | | |
| | LMH 70 | | | | |
| | LMH 85 | | X | X | |
| 15% FH Canola | HLH 70 | | | | |
| | HLH 85 | | | | |
| | HMH 70 | | | | |
| | HMH 85 | | | | X |
| | LLH 70 | | X | | |
| | LLH 85 | | X | | X |
| | LMH 70 | | X | | X |
| | LMH 85 | X | | | X |
| 20% FH Canola | HLH 70 | | | | |
| | HLH 85 | | | | |
| | HMH 70 | | X | | X |
| | HMH 85 | | X | | X |
| | LLH 70 | | | | |
| | LLH 85 | | | | |
| | LMH 70 | | X | | X |
| | LMH 85 | | X | | X |
| 25% FH Canola | HLH 70 | | X | | X |
| | HLH 85 | | X | | X |
| | HMH 70 | | X | | X |
| | HMH 85 | | X | X | X |
| | LLH 70 | | X | X | X |
| | LLH 85 | | X | X | X |
| | LMH 70 | | X | X | X |
| | LMH 85 | | X | X | X |
| Vreamay | | X | X | X | X |
| Vreamay Right | | X | X | X | X |
| Vreamay NH | | X | X | X | X |

While the control samples maintained their homogeneity and airiness on the top and bottom of the icing container, very few test samples did the same. The 25% fully hydrogenated canola sample tended to separate into oil and water phases at the top of the container whilst maintaining an airy consistency. Many of the PSS/SSS Match samples provided herein maintained good airiness at both the top and the bottom of the container, and some of them had good homogeneity at the top and the bottom of the container. The PSS/SSS Match sample processed at LMH with tempering at 85° F. maintained an airy consistency throughout and did not separate at either the top or the bottom of the container.

Examples 26-43

Shortening samples were prepared using soybean oil as the soft fraction and with different TAG's as the structural enhancers. The compositions of these samples are set forth in Table 7.

TABLE 7

| Ex. | Sample Type | Total Added Saturated Fat (%) | Soybean Oil (%) | Fully Hydrogenated Canola (%) | Fully Hydrogenated Cottonseed (%) | Fully Hydrogenated Palm (%) | Pure PSS (%) | Pure PSP (%) | Pure PPS (%) |
|---|---|---|---|---|---|---|---|---|---|
| a | | 7.5 | 92.5 | 2.5 | | | 5.0 | | |
| b | | 10.0 | 90.0 | 5.0 | | | 5.0 | | |
| c | | 12.5 | 87.5 | 7.5 | | | 5.0 | | |
| 21 | %5 PSS | 15.0 | 85.0 | 10.0 | | | 5.0 | | |
| 22 | | 17.5 | 82.5 | 12.5 | | | 5.0 | | |
| 23 | | 20.0 | 80.0 | 15.0 | | | 5.0 | | |
| 24 | | 22.5 | 77.5 | 17.5 | | | 5.0 | | |
| 25 | | 25.0 | 75.0 | 20.0 | | | 5.0 | | |
| 26 | | 14.0 | 86.0 | 1.0 | | 13.0 | | | |
| 27 | PSP/SSS | 16.5 | 83.5 | 3.5 | | 13.0 | | | |
| 28 | Match | 19.0 | 81.0 | 6.0 | | 13.0 | | | |
| 29 | | 21.5 | 78.5 | 8.5 | | 13.0 | | | |
| 30 | | 24.0 | 76.0 | 11.0 | | 13.0 | | | |
| 31 | | 15.0 | 85.0 | 10.0 | | | | | 5.0 |
| 32 | | 17.5 | 82.5 | 12.5 | | | | | 5.0 |
| 33 | 5% PSS | 20.0 | 80.0 | 15.0 | | | | | 5.0 |
| 34 | | 22.5 | 77.5 | 17.5 | | | | | 5.0 |
| 35 | | 25.0 | 75.0 | 20.0 | | | | | 5.0 |

TABLE 7-continued

| | As a Percentage of the Total Sample | | | | | Structural | | As a Percentage of the Total Added Saturated Fat Structural |
|---|---|---|---|---|---|---|---|---|
| Ex. | SSS (%) | PSS (%) | PSP (%) | PPS (%) | X = % | Enhancer % SSS | SSS (%) | Enhancer (%) |
| a | 2.0 | | 5.0 | | | 2.51 | 27 | 67 |
| b | 4.0 | | 5.0 | | | 1.26 | 40 | 50 |
| c | 6.0 | | 5.0 | | | 0.84 | 48 | 40 |
| 21 | 8.0 | | 5.1 | | | 0.63 | 53 | 34 |
| 22 | 10.0 | | 5.1 | | | 0.51 | 57 | 29 |
| 23 | 12.0 | | 5.1 | | | 0.42 | 60 | 25 |
| 24 | 14.0 | | 5.1 | | | 0.36 | 62 | 23 |
| 25 | 16.0 | | 5.1 | | | 0.32 | 64 | 20 |
| 26 | 2.0 | | 5.0 | | | 2.51 | 14 | 36 |
| 27 | 4.0 | | 5.0 | | | 1.26 | 24 | 30 |
| 28 | 6.0 | | 5.0 | | | 0.84 | 32 | 27 |
| 29 | 8.0 | | 5.1 | | | 0.63 | 37 | 23 |
| 30 | 10.0 | | 5.1 | | | 0.51 | 42 | 21 |
| 31 | 8.0 | | | 5.1 | | 0.63 | 53 | 34 |
| 32 | 10.0 | | | 5.1 | | 0.51 | 57 | 29 |
| 33 | 12.0 | | | 5.1 | | 0.42 | 60 | 25 |
| 34 | 14.0 | | | 5.1 | | 0.36 | 62 | 23 |
| 35 | 16.0 | | | 5.1 | | 0.32 | 64 | 20 |

Figure 10:
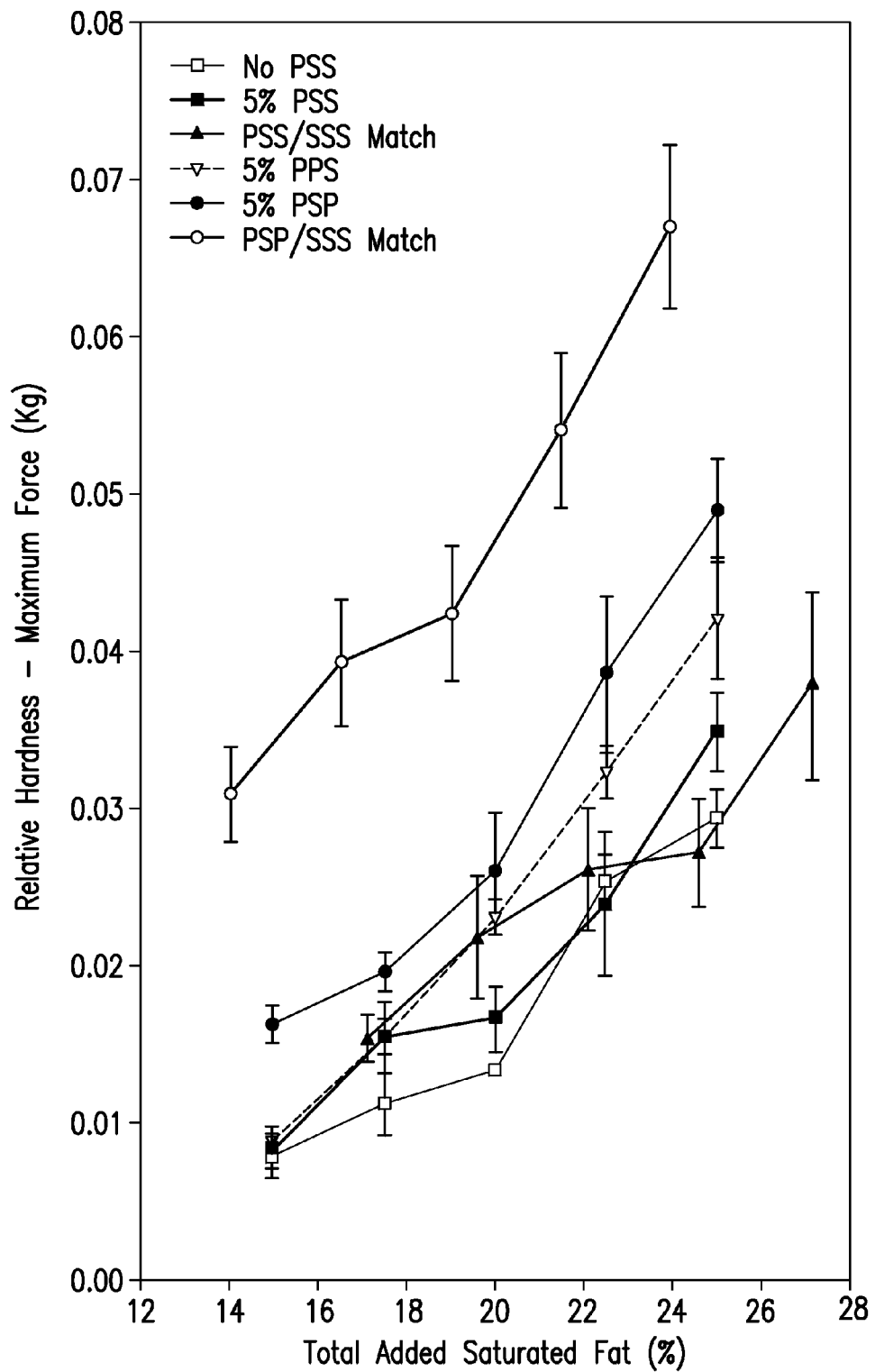
FIG. 10 shows the relative hardness as a function of total added saturated fat for samples enriched with 5% PSS, 5% PPS, 5% PSP and the PSS/SSS and PSP/SSS Match samples after 2 days.
Figure 11A:
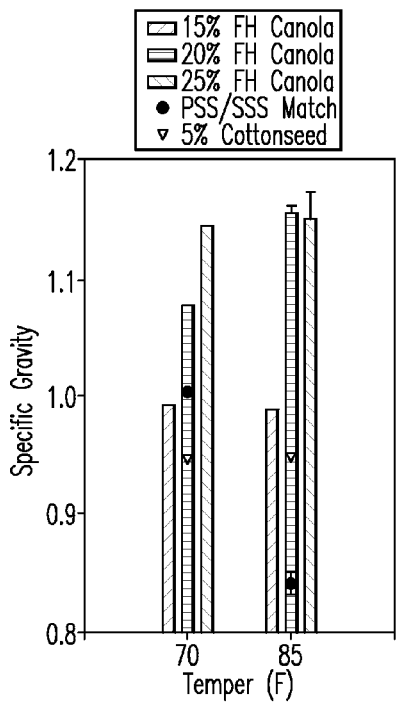
FIGS. 11(a)-(d) show the specific gravities of icings made with various test shortenings prepared under different processing conditions.
Figure 11B:
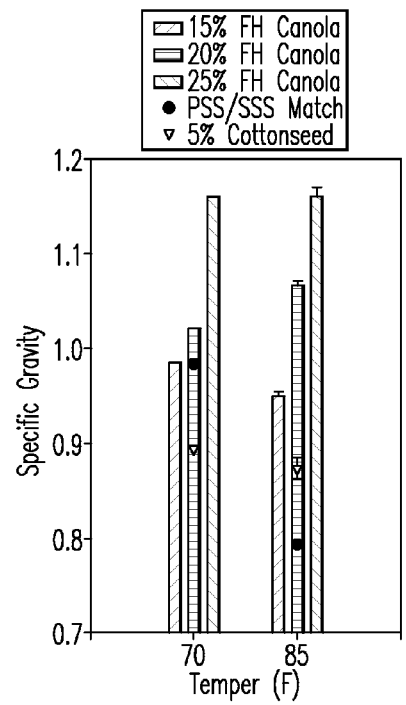
Figure 11C:
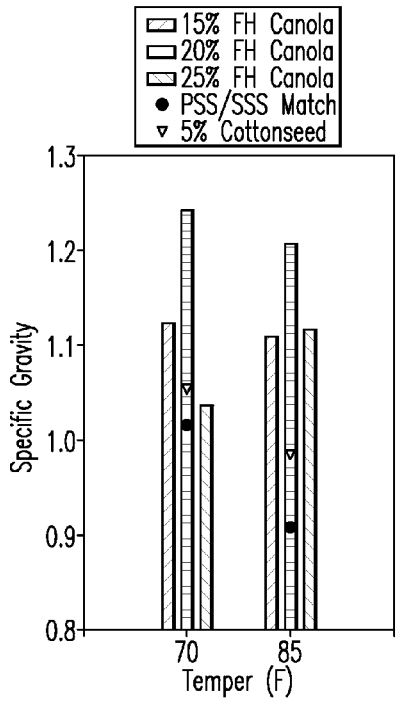
Figure 11D:
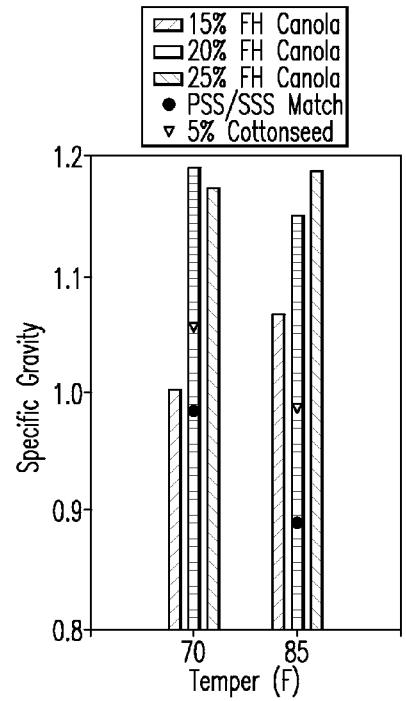

Examples 26-33 were made with 5% pure PSP and varying amounts of soybean oil and FH canola. Examples 34-38 were made with 13% palm oil as the source of PSP, and the quantities of FH canola were adjusted so that these samples had PSP percentages and values of percent structural enhance to percent SSS that matched Examples 26-30. In this regard, it is to be noted that palm oil contains 40% PSS, 1% PPS, 38.5% PSP, 9.5% SSS, and 5.4% PPP. Examples 39-43 were made with 5% PPS and with varying amounts of soybean oil and FH canola. Each of these samples was made with the same procedure used to make Examples 1-20. After two days, the relative hardness of these samples was evaluated in accordance with the procedures described above with respect to examples 1-20. The results are illustrated in FIG. 10; data from Examples 1-20 for the No PSS, 5% PSS, and PSS/SS Match samples is included for ease of comparison. The PSS/SSS Match and PSP/SSS Match samples were harder than the No PSS sample as well as their corresponding pure enriched samples (5% PSS and 5% PSP respectively) at the same levels of total added saturates. The 5% PSP sample was harder than the 5% PPS, which was harder than the 5% PSS sample. Therefore the 5% PSP sample was the hardest pure sample studied thus far and the PSP/SSS Match sample was the hardest sample (>0.03 force kg at 14% total added saturates) studied thus far, being significantly harder at all levels of total added saturates than all other samples (<0.02 force kg for 15% total added saturates).

Examples 44

In this study, the effect of structural enhancers PPS, PSP, SPS, and PPP was studied. The shortening samples used in this study were composed of fully hydrogenated canola hard fat and soybean oil, all supplied by Bunge Oils (Bradley Ill., USA) as well as TAGs synthesized by the Alberta Lipid Utilization Program at the University of Alberta, Edmonton, Alberta, with the exception of pure PPP which was purchased from Fisher Scientific.

A commercial shortening sample ("No name all vegetable shortening", purchased at a local supermarket in Edmonton, Alberta), with 26% total added saturates, was used as a standard for hardness for this study. In addition, 5 binary shortenings containing 15, 17.5, 20, 22.5 and 25% fully hydrogenated canola oil respectively in soybean oil, were also used as reference shortenings in this study.

Samples were heated to 90° C. and stirred with a mechanical stirrer for 2 minutes to ensure homogeneity and to destroy crystal memory and then transferred to aluminum pans for hardness measurements, to glass NMR tubes for SFC measurements, and hermetically sealed aluminum pans for DSC measurements. Samples were cooled at 10.0° C./min and all temperatures are reported to a certainty of ±0.1° C./min unless otherwise noted. The hardness measurements were performed at a stage temperature of 20.0±0.5° C. The hardness was measured after 2 and 13 days of storage at 20.0° C.

A summary of the experimental methods utilized to study the effect of each of the potential structural enhancers (PSS, PPS, PSP, SPS, and PPP) is shown in Table 8. Each of the experimental methods mentioned in Table 8 are summarized below.

TABLE 8

| | | | | Experiment | | | | |
|---|---|---|---|---|---|---|---|---|
| TAG | Purity of TAG (%) | TAG Synthesized in ALUP Laboratory | 5% Supplementation (Hardness) | Solid Fat Content Measurement | Melting Behavior | Blending (Fully Hydrogenated "natural" fats) | Threshold Hardness (vary level of Tag enrichment) | Threshold Blending (Fully Hydrogenated "natural" fats) |
| PSS | 97 | x | x | X | x | X | x | x |
| PSP | 97 | x | x | X | x | x | x | x |
| PPS | 97 | x | x | X | x | | x | |

TABLE 8-continued

| TAG | Purity of TAG (%) | TAG Synthesized in ALUP Laboratory | 5% Supplementation (Hardness) | Solid Fat Content Measurement | Melting Behavior | Blending (Fully Hydrogenated "natural" fats) | Threshold Hardness (vary level of Tag enrichment) | Threshold Blending (Fully Hydrogenated "natural" fats) |
|---|---|---|---|---|---|---|---|---|
| SPS | 97 | x | x | | | | x | |
| PPP | 99 | | | | | | x | |

5% Supplementation Hardness

Four sample sets were created to study the effectiveness of supplementing a shortening system with the structural enhancer. The first sample set was composed of samples with 10, 12.5, 15, 17.5 and 20% fully hydrogenated canola oil in refined soybean oil each with 5% pure TAG added (for total added saturates of 15, 17.5, 20, 22.5 and 25%).

The hardness samples were processed in the pans using a "Linkam LTS 350" temperature controlled stage (Linkam Scientific Instruments, Tadworth, Surrey, United Kingdom). After thermal processing, the samples were stored for 2, and 13 days at 20° C. A TA.XT.plus Texture Analyzer (Stable Microsystems, Surrey U.K.) fitted with a 1.0 kg load cell was used to obtain hardness measurements in this study. Sample preparation and instrument used in this study is described above in Examples 1-20.

The hardness of the six standard shortenings was measured in the same manner as the sample shortenings, with the exception of the commercial shortening which was not melted and recrystallized prior to the hardness measurements.

Blending of Fully Hydrogenated Natural Fats

The ratio of each structural enhancer to SSS in the 5% Supplementation Hardness samples sets was mimicked via careful blending for the structural enhancer. Due to the percentages of each TAG in the available fully hydrogenated fats, only PSS (See, Examples 26-43) and PSP samples can be created via careful blending. The sample profiles of the blended samples are shown in Table 9.

TABLE 9

| | Enrichment via Natural Fat Blending | | | |
|---|---|---|---|---|
| x | Total Hard Fat | Palm | Canola | Soybean Oil |
| 2.51 | 14.0 | 13.0 | 1.0 | 86.0 |
| 1.25 | 16.5 | 13.0 | 3.5 | 83.5 |
| 0.83 | 19.0 | 13.0 | 6.0 | 81.0 |

TABLE 9-continued

| | Enrichment via Natural Fat Blending | | | |
|---|---|---|---|---|
| x | Total Hard Fat | Palm | Canola | Soybean Oil |
| 0.64 | 21.6 | 13.1 | 8.5 | 78.4 |
| 0.51 | 24.0 | 13.1 | 10.9 | 76.0 |

Solid Fat Content Determination

SFC data was acquired using the pulse magnetic resonance spectrometer "Minispec mq SFC Analyzer" (Bruker Instruments, Milton, Ontario, Canada), equipped with a temperature controlled measurement chamber. The data sampling procedure was fully automated, and the SFC was calculated and displayed by the "Minispec v2.20 Rev.01/NT" software.

The NMR tubes were filled with molten fat to a height of 3.5±0.1 cm. To achieve the cooling rate of 10° C./min, the samples were first heated to 90° C. and held there for 5 minutes before being transferred through a series of water baths, separate from the NMR, at prescribed times. The sample was then held isothermally 20° C. The SFC was measured after 1 hour, 2 days and 13 days. The reported SFC value is the average of the SFC values provided by the NMR software for each of the 3 NMR tubes filled with the sample.

Investigation into Melting Behavior

A "DSC 2920 Modulated DSC" by TA Instruments was used in the non-modulated DSC mode for thermal measurements. The sample preparation and instrument details are described above in Examples 1-20.

Threshold Hardness Measurements

Seven samples for each structural enhancer were created and studied in this study. Each sample had 15% total added saturates and the sample compositions are shown in Tables 10, 11, 12, 13, and 14. The hardness of each of these samples is investigated utilizing the hardness method outlined above.

TABLE 10

| x | FH Canola Substituted with Pure PSS (%) | FH Canola (%) | SSS (%) | PSS (%) | PPS (%) | PSP (%) | SPS (%) | PPP (%) |
|---|---|---|---|---|---|---|---|---|
| 0.20 | 0 | 15.0 | 12.0 | 2.4 | 0.1 | 0.1 | 0.0 | 0.0 |
| 0.24 | 0.5 | 14.5 | 11.6 | 2.8 | 0.1 | 0.1 | 0.0 | 0.0 |
| 0.30 | 1 | 14.0 | 11.2 | 3.3 | 0.1 | 0.1 | 0.0 | 0.0 |
| 0.40 | 2 | 13.0 | 10.4 | 4.1 | 0.1 | 0.1 | 0.0 | 0.0 |
| 0.51 | 3 | 12.0 | 9.6 | 4.9 | 0.1 | 0.1 | 0.0 | 0.0 |
| 0.65 | 4 | 11.0 | 8.8 | 5.8 | 0.1 | 0.1 | 0.0 | 0.0 |
| 0.83 | 5 | 10.0 | 8.0 | 6.6 | 0.1 | 0.1 | 0.0 | 0.0 |

TABLE 11

| x | FH Canola Substituted with Pure PSP (%) | FH Canola (%) | SSS (%) | PSS (%) | PPS (%) | PSP (%) | SPS (%) | PPP (%) |
|---|---|---|---|---|---|---|---|---|
| 0.01 | 0 | 15.0 | 12.0 | 2.4 | 0.1 | 0.1 | 0.0 | 0.0 |
| 0.05 | 0.5 | 14.5 | 11.6 | 2.3 | 0.1 | 0.6 | 0.0 | 0.0 |
| 0.10 | 1 | 14.0 | 11.2 | 2.3 | 0.1 | 1.1 | 0.0 | 0.0 |
| 0.20 | 2 | 13.0 | 10.4 | 2.1 | 0.1 | 2.1 | 0.0 | 0.0 |
| 0.32 | 3 | 12.0 | 9.6 | 1.9 | 0.1 | 3.1 | 0.0 | 0.0 |
| 0.46 | 4 | 11.0 | 8.8 | 1.8 | 0.1 | 4.1 | 0.0 | 0.0 |
| 0.63 | 5 | 10.0 | 8.0 | 1.6 | 0.1 | 5.1 | 0.0 | 0.0 |

TABLE 12

| x | FH Canola Substituted with Pure PPS (%) | FH Canola (%) | SSS (%) | PSS (%) | PPS (%) | PSP (%) | SPS (%) | PPP (%) |
|---|---|---|---|---|---|---|---|---|
| 0.01 | 0 | 15.0 | 12.0 | 2.4 | 0.1 | 0.1 | 0.0 | 0.0 |
| 0.05 | 0.5 | 14.5 | 11.6 | 2.3 | 0.6 | 0.1 | 0.0 | 0.0 |
| 0.10 | 1 | 14.0 | 11.2 | 2.3 | 1.1 | 0.1 | 0.0 | 0.0 |
| 0.20 | 2 | 13.0 | 10.4 | 2.1 | 2.1 | 0.1 | 0.0 | 0.0 |
| 0.32 | 3 | 12.0 | 9.6 | 1.9 | 3.1 | 0.1 | 0.0 | 0.0 |
| 0.46 | 4 | 11.0 | 8.8 | 1.8 | 4.1 | 0.1 | 0.0 | 0.0 |
| 0.63 | 5 | 10.0 | 8.0 | 1.6 | 5.1 | 0.1 | 0.0 | 0.0 |

TABLE 13

| x | FH Canola Substituted with Pure SPS (%) | FH Canola (%) | SSS (%) | PSS (%) | PPS (%) | PSP (%) | SPS (%) | PPP (%) |
|---|---|---|---|---|---|---|---|---|
| 0.01 | 0 | 15.0 | 12.0 | 2.4 | 0.1 | 0.1 | 0.0 | 0.0 |
| 0.05 | 0.5 | 14.5 | 11.6 | 2.3 | 0.1 | 0.1 | 0.5 | 0.0 |
| 0.09 | 1 | 14.0 | 11.2 | 2.3 | 0.1 | 0.1 | 1.0 | 0.0 |
| 0.19 | 2 | 13.0 | 10.4 | 2.1 | 0.1 | 0.1 | 2.0 | 0.0 |
| 0.32 | 3 | 12.0 | 9.6 | 1.9 | 0.1 | 0.1 | 3.0 | 0.0 |
| 0.46 | 4 | 11.0 | 8.8 | 1.8 | 0.1 | 0.1 | 4.0 | 0.0 |
| 0.63 | 5 | 10.0 | 8.0 | 1.6 | 0.1 | 0.1 | 5.0 | 0.0 |

TABLE 14

| x | FH Canola Substituted with Pure PPP (%) | FH Canola (%) | SSS (%) | PSS (%) | PPS (%) | PSP (%) | SPS (%) | PPP (%) |
|---|---|---|---|---|---|---|---|---|
| 0.00 | 0 | 15.0 | 12.0 | 2.4 | 0.1 | 0.1 | 0.0 | 0.0 |
| 0.04 | 0.5 | 14.5 | 11.6 | 2.3 | 0.1 | 0.1 | 0.0 | 0.5 |
| 0.09 | 1 | 14.0 | 11.2 | 2.3 | 0.1 | 0.1 | 0.0 | 1.0 |
| 0.19 | 2 | 13.0 | 10.4 | 2.1 | 0.1 | 0.1 | 0.0 | 2.0 |
| 0.31 | 3 | 12.0 | 9.6 | 1.9 | 0.1 | 0.1 | 0.0 | 3.0 |
| 0.45 | 4 | 11.0 | 8.8 | 1.8 | 0.1 | 0.1 | 0.0 | 4.0 |
| 0.63 | 5 | 10.0 | 8.0 | 1.6 | 0.1 | 0.1 | 0.0 | 5.0 |

Threshold Blending Hardness Measurements

The ratios of PSS and PSP to SSS for the threshold hardness measurement samples are also matched via careful blending as outlined in Tables 15 and 16 for total added saturated fat contents of 5, 10, and 15% for each ratio. The hardness of each of these samples is investigated utilizing the hardness method outlined above.

TABLE 15

| x | FH Canola Substituted with Pure PSS (%) | FH Canola (%) | SSS (%) | PSS (%) | PPS (%) | PSP (%) | SPS (%) | PPP (%) |
|---|---|---|---|---|---|---|---|---|
| 0.20 | 0 | 15.0 | 12.0 | 2.4 | 0.1 | 0.1 | 0.0 | 0.0 |
| 0.24 | 0.5 | 14.5 | 11.6 | 2.8 | 0.1 | 0.1 | 0.0 | 0.0 |
| 0.30 | 1 | 14.0 | 11.2 | 3.3 | 0.1 | 0.1 | 0.0 | 0.0 |
| 0.40 | 2 | 13.0 | 10.4 | 4.1 | 0.1 | 0.1 | 0.0 | 0.0 |
| 0.51 | 3 | 12.0 | 9.6 | 4.9 | 0.1 | 0.1 | 0.0 | 0.0 |
| 0.65 | 4 | 11.0 | 8.8 | 5.8 | 0.1 | 0.1 | 0.0 | 0.0 |
| 0.83 | 5 | 10.0 | 8.0 | 6.6 | 0.1 | 0.1 | 0.0 | 0.0 |

TABLE 16

| x (PSP to SSS) | FH Canola (%) | FH Palm (%) | Total Added Hard Fat (%) |
|---|---|---|---|
| 0.41 | 2.6 | 2.4 | 5.0 |
|  | 5.2 | 4.8 | 10.0 |
|  | 7.8 | 7.2 | 15.0 |
|  | 8.1 | 7.6 | 15.7 |
| 0.82 | 1.6 | 3.4 | 5.0 |
|  | 3.2 | 6.8 | 10.0 |
|  | 4.8 | 10.2 | 15.0 |
| 2.46 | 0.4 | 4.6 | 5.0 |
|  | 0.7 | 9.3 | 10.0 |
|  | 1.0 | 13.0 | 14.0 |
|  | 1.1 | 13.9 | 15.0 |

Results

Utilizing PSS as a Structural Enhancer

Figure 12A:
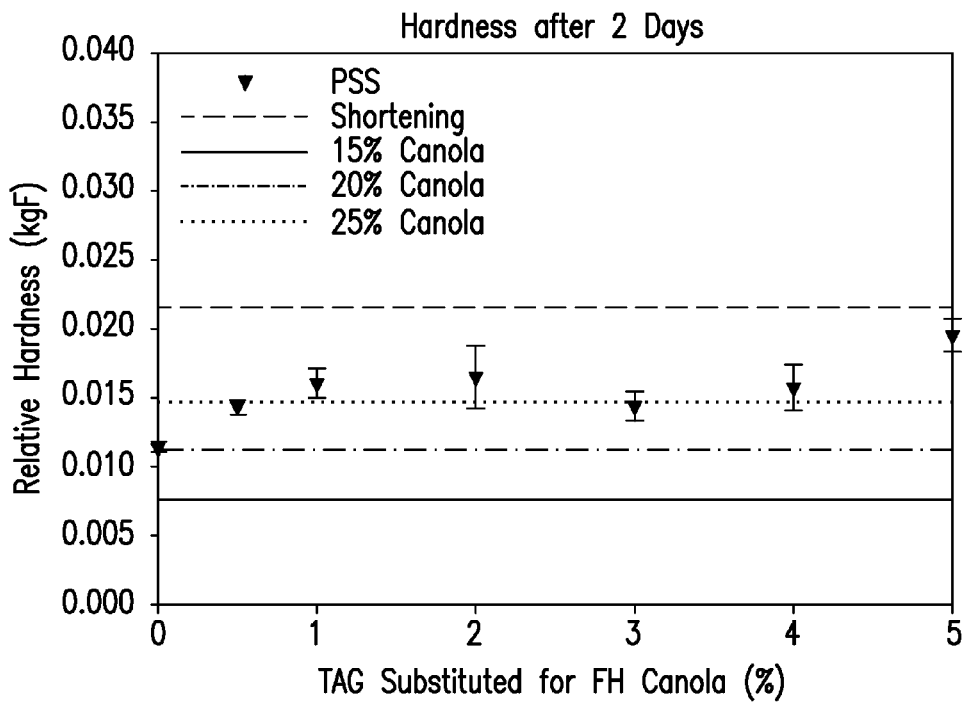
FIG. 12(a) illustrates relative hardness as a function of the amount of structural enhancer PSS substituted for FH canola after 2 days and FIG. 12(b) illustrates relative hardness after 13 days.
Figure 12B:
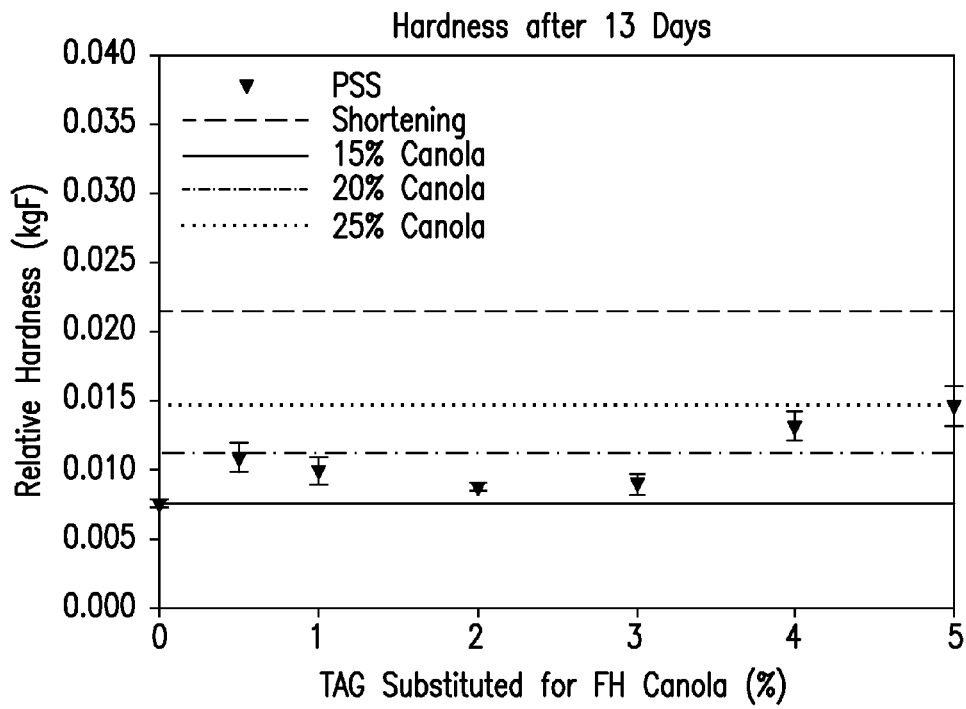

The efficacy of the structural enhancer in increasing hardness of the shortening was further investigated by reducing the amount of structural enhancer (in this case, PSS) used. 7 shortening samples each with a total added saturated fat content of 15% with the ratio of structural enhancer to SSS (x) ranging from 0.20 to 0.83, as listed in Table 10, were produced. The hardness of these samples after 2 and 13 days is shown in FIGS. 12a and 12b.

Figure 13:
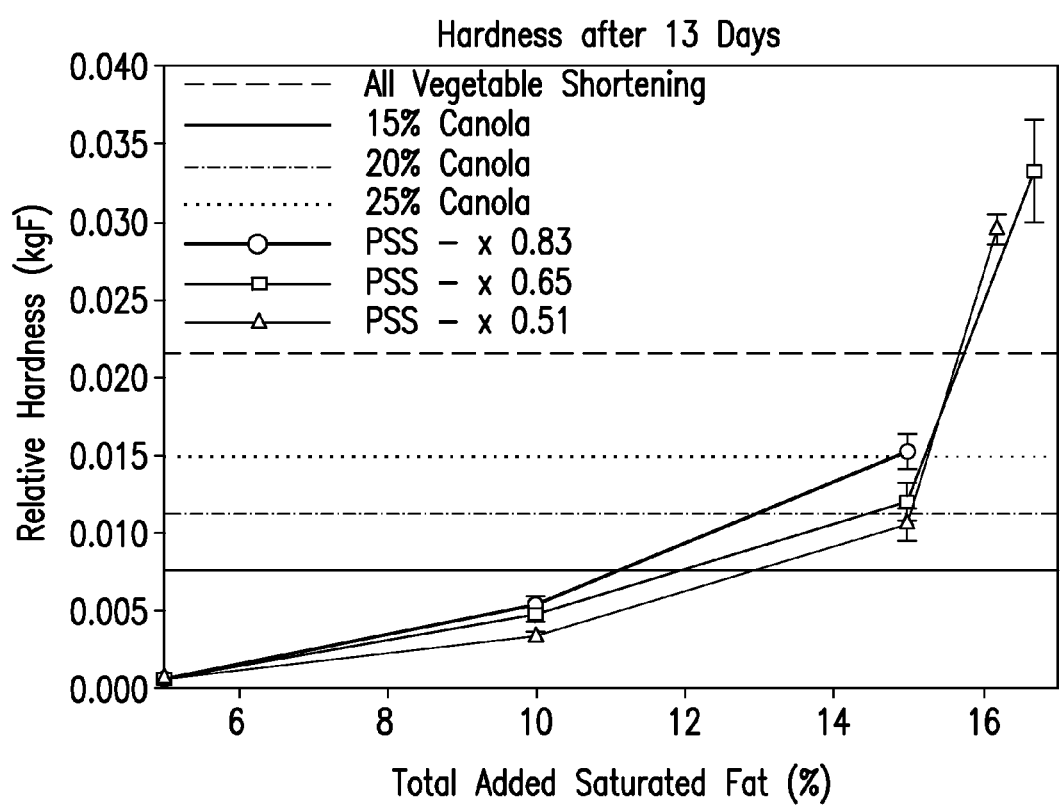
FIG. 13 illustrates relative hardness as a function of the total added saturates after 13 days.

Given the promising hardness results shown for substitutions of 3, 4, and 5% PSS for FH canola, it was decided to produce samples with x identical to these samples using FH cottonseed as a source of PSS. As well, to determine the effect of the x value in addition to the amount of saturated fat in the shortening on the hardness, samples were produced with a given x at levels of 5, 10 and 15% saturates. Table 13 lists the ratios, the FH cottonseed and FH canola amounts required to achieve these ratios at given levels of total added saturates. FIG. 13 shows the relative hardness of the samples as a function of the total added saturated fat. Each x is shown using a different symbol and line. The reference lines indicating the relative hardness of the commercial shortening as well as for the sample shortenings containing 15, 20 and 25% FH canola are also shown.

Section 2: Utilizing PSP as a Structural Enhancer

The efficacy of the structural enhancer in increasing hardness of the shortening by varying the amount of structural enhancer (in this case, PSP) was studied.

Figure 14A:
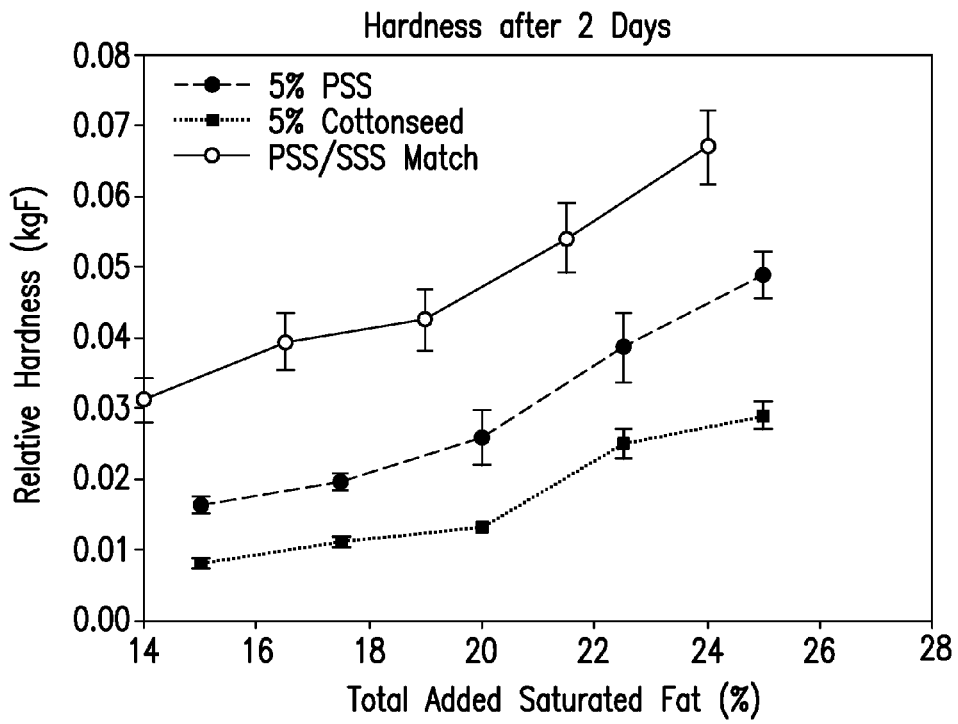
FIG. 14(a) illustrates relative hardness after 2 days versus total added saturated fat for the control and PSP enriched shortenings and FIG. 14(b) illustrates relative hardness after 13 days versus total added saturated fat for the control and PSP enriched shortenings.
Figure 14B:
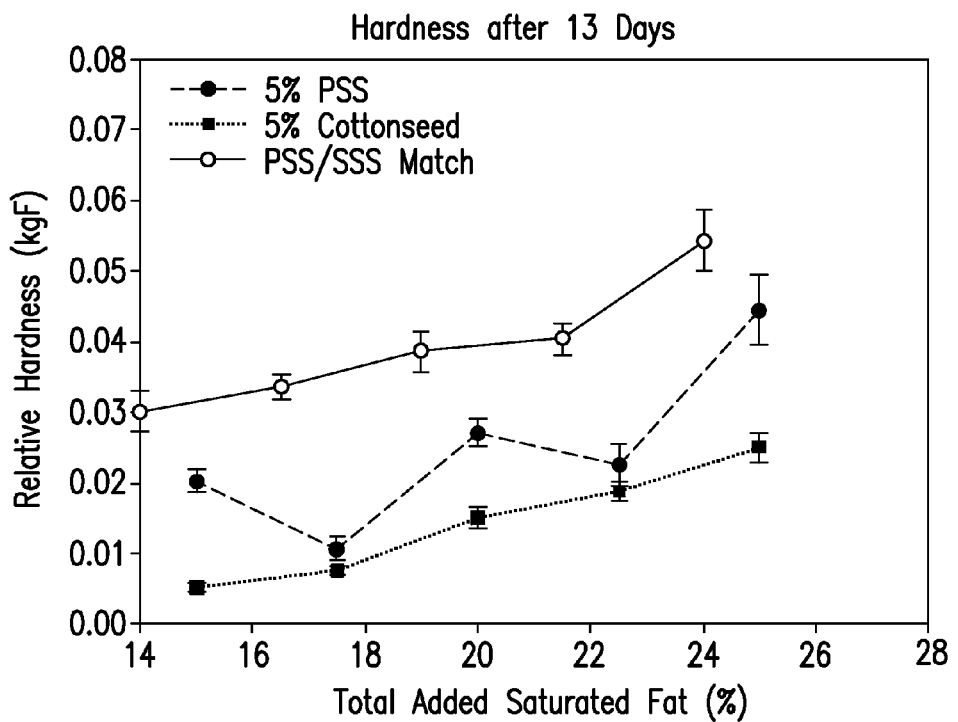

The relative hardness of the samples enriched with 5% pure PSP after 2 days is shown by the black circles in FIG. 14a. The open circles represent the relative hardness of the blended samples (Table 9, PSP/SSS) as a function of total added saturated fat. Also shown in FIG. 14b is the relative hardness of the binary shortening samples (the control), indicated by the black squares. For all three sample sets, increasing the amount of total added saturates increases the relative hardness of the shortening sample. Clearly, pure PSP acts as a structural enhancer as the 5% PSP enriched samples are harder than the control samples. Specifically, the 5% PSP enriched sample with 15% total added saturates, is harder than the control sample with 20% total added saturates, a reduction of 5% saturates. Clearly, blending fully hydrogenated palm and canola oils to replicate the ratio of PSP to SSS found in the 5% PSP enriched samples, also results in the formation of structural enhancers which are even more effective than the incorporation of pure PSP to achieve the same ratio. This increased hardness could also be due to the incorporation of minor TAGs into the shortening due to the prevalence of TAGs within fully hydrogenated palm oil, as seen in Table 11.

Similarly, the hardness after 13 days is shown in FIG. 14b as a function of total added saturated fat for three sample sets: the control (black squares), 5% PSS enriched (black circles), and samples composed of carefully blended fully hydrogenated palm and canola oils (PSP/SSS, open circles). As in FIG. 14a, the palm/canola blended sample (PSP/SSS) is consistently harder than not only the binary shortening but the pure PSP enriched shortening as well. The PSP/SSS sample at 15% total added saturates is 50% harder than the binary sample with 25% saturates. This suggests that the structural enhancer (PSP) works with SSS in such a way that the level of saturates can be greatly reduced while maintaining hardness.

Figure 15A:
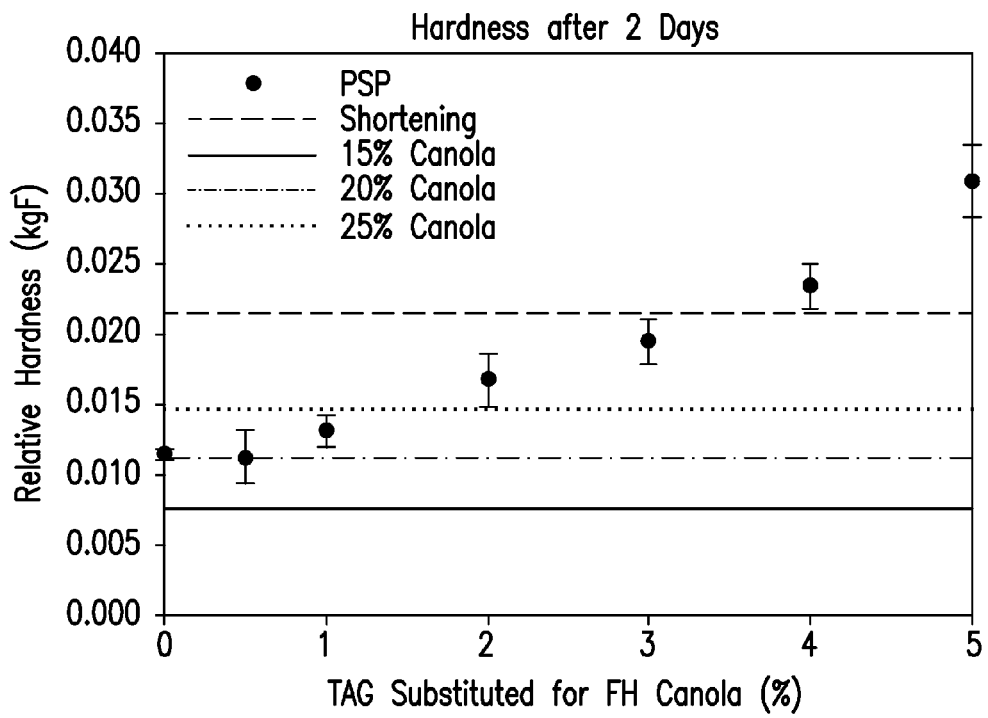
FIG. 15(a) illustrates relative hardness after 2 days as a function of the amount of structural enhancer PSP substituted for FH canola and FIG. 15(b) illustrates relative hardness after 13 days as a function of the amount of structural enhancer PSP substituted for FH canola.
Figure 15B:
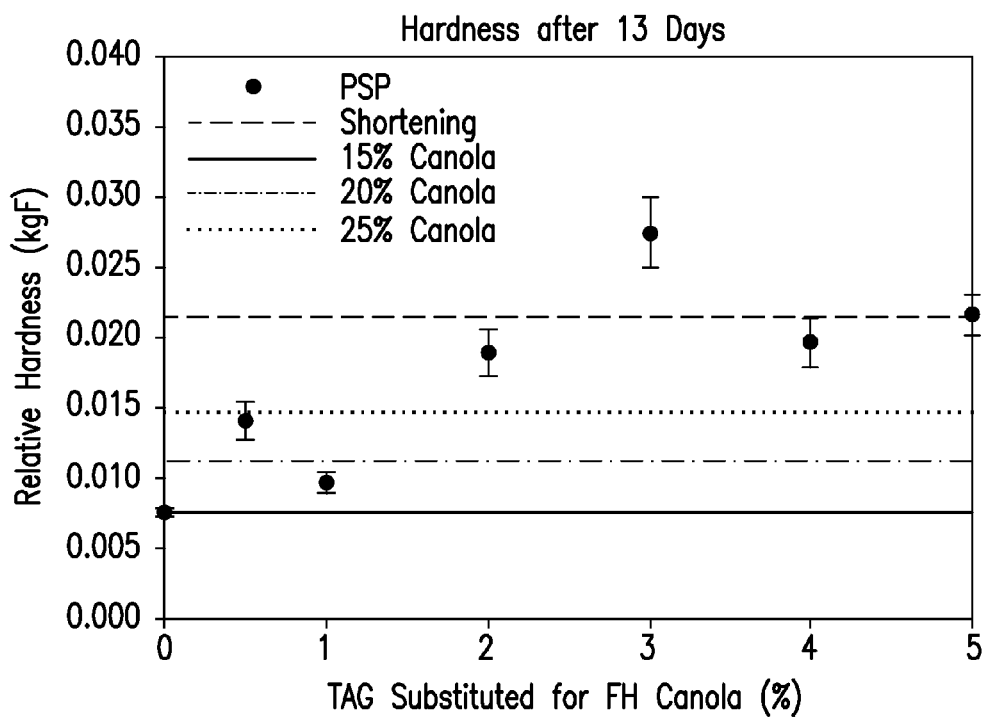

The relative hardness of the standards (commercial shortening, and the 15, 20 and 25% binary FH canola and soybean shortenings) are shown in FIGS. 15a and 15b by the horizontal reference lines. FIG. 15a shows the trends in relative hardness for the samples listed in Table 9 after two days. Clearly the enriched shortening hardness increases as the amount of PSP substituted for fully hydrogenated canola increases. At 2% PSP substitution, the shortening is harder than the binary shortening containing 25% fully hydrogenated canola. Thus the enriched shortening is harder and has 10% less saturates. 4% PSP substituted for fully hydrogenated canola results in a shortening which is much harder than the commercial shortening sample (with 26% saturates), thus a reduction of 11% saturates whilst maintaining hardness.

The relative hardness of the shortening samples after 13 days is illustrated by FIG. 15b. Clearly, after 13 days the hardness does not merely increase with increased substitution of fully hydrogenated canola with pure PSP. The shortening with 1% PSP is softer than the 20% binary shortening, while the shortening with 0.5% PSP substituted for fully hydrogenated canola has hardness comparable to that of the 25% canola binary shortening.

Figure 16:
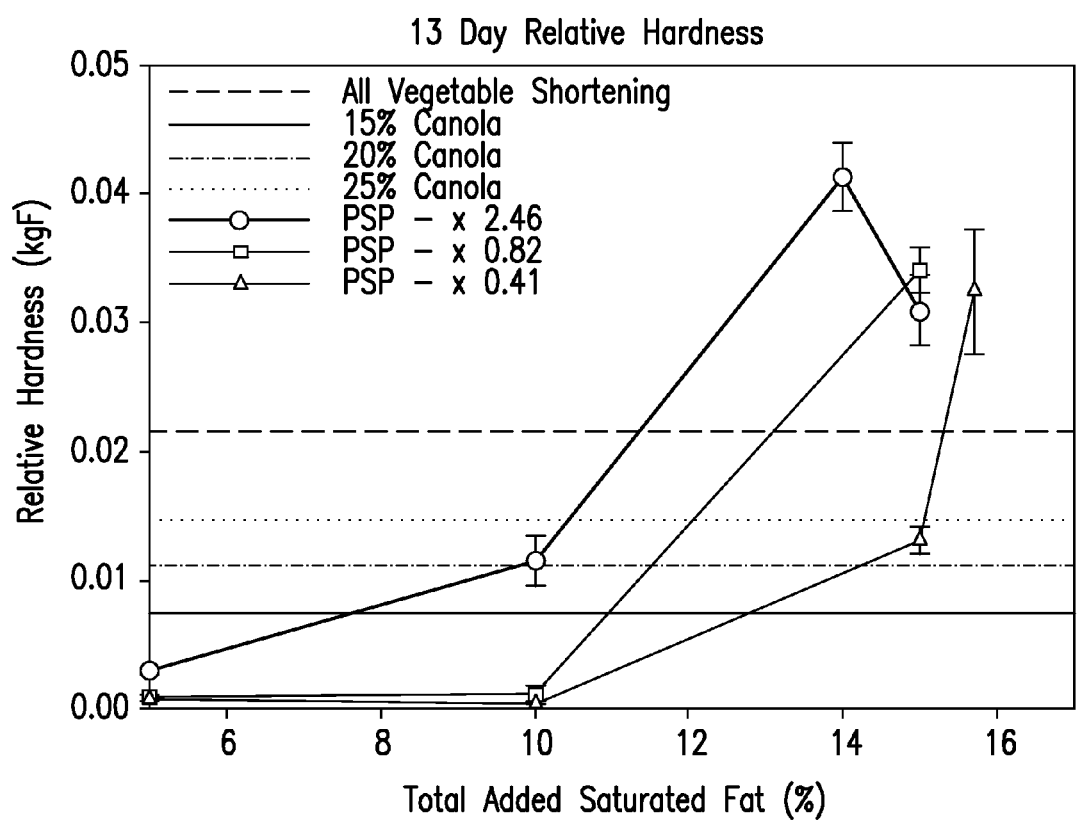
FIG. 16 illustrates relative hardness after 13 days as a function of the total added saturates for the samples containing fully hydrogenated canola and palm oils added to soybean oil.

FIG. 16 shows the relative hardness of the standards as well as the shortening samples produced via careful blending of fully hydrogenated canola and palm oils with soybean oil, as per Table 16. Clearly, increasing the amount of total added saturates increases the relative hardness of the shortening samples. It is also evident that a higher ratio of PSP to SSS produces a relatively harder shortening, with this increase in hardness more substantial when the amount of saturated fat is greater than 5%. For the samples with 15% total added saturates, the blends with ratios of 2.46 and 0.82 have the same relative hardness, which was also greater than that of the commercial shortening. Recall that the commercial sample had 26% total added saturates, therefore, the blended samples at 15% total added saturates, and ratios of 2.46 and 0.82 demonstrate a reduction of 11% total added saturates while producing a harder product. Thus, there is flexibility to further reduce the level of saturates and maintain the desired hardness, as demonstrated by the commercial sample. This is currently underway. Also of note is the shortening sample with 10% added saturates and a ratio of 2.46. This sample is clearly as hard as the 20% canola binary sample (control) with half the saturates. This again clearly demonstrates the structure building capacity of the PSP within fully hydrogenated palm oil.

Figure 17:
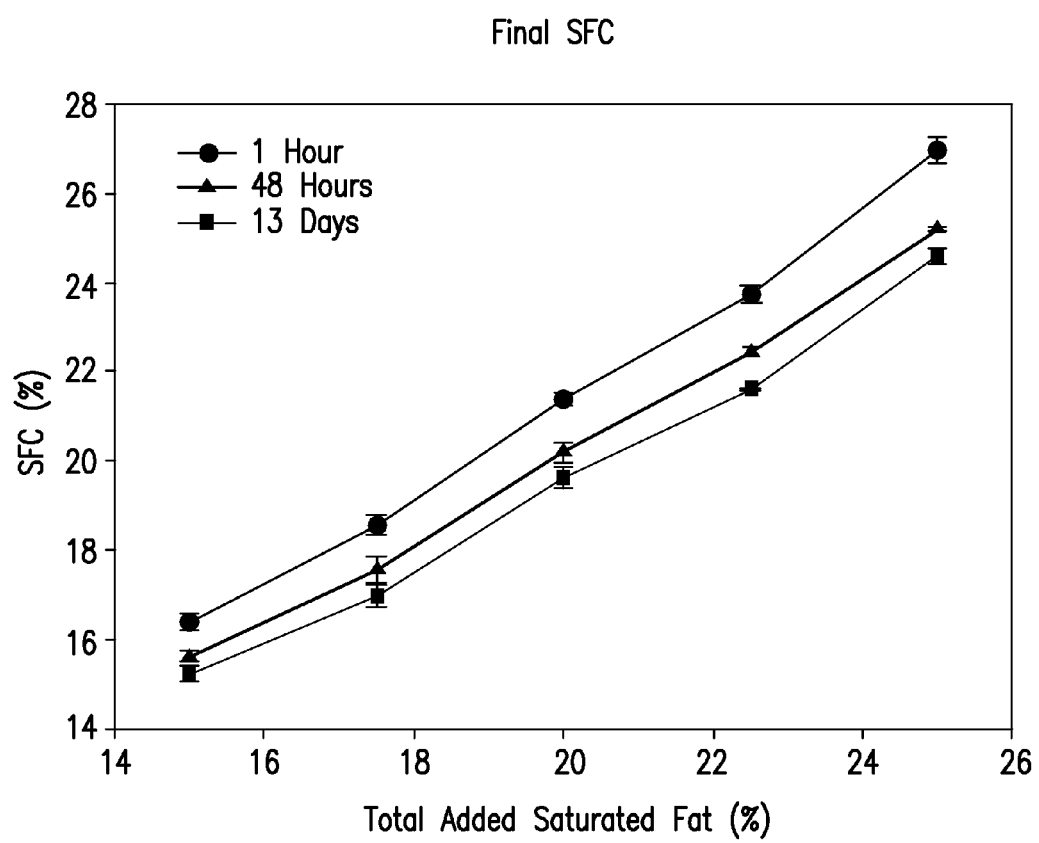
FIG. 17 shows SFC after 1 hour, 48 hours and 13 days versus total added saturates for the shortening enriched with 5% pure PSP as a structural enhancer.

The SFC after 1 hour, 48 hours and 13 days increases as the amount of total added saturated fat in each sample increases as shown in FIG. 17. Clearly, the SFC decreases as the time post crystallization increases, with the greatest decrease occurring between the 1 hour and 48 hour measurements. This suggests that the structural enhancer, which has been shown to take some time to become affective (13 days hardness graphs versus the 2 days hardness graphs) has a lower SFC than the initially crystallized sample.

Figure 18:
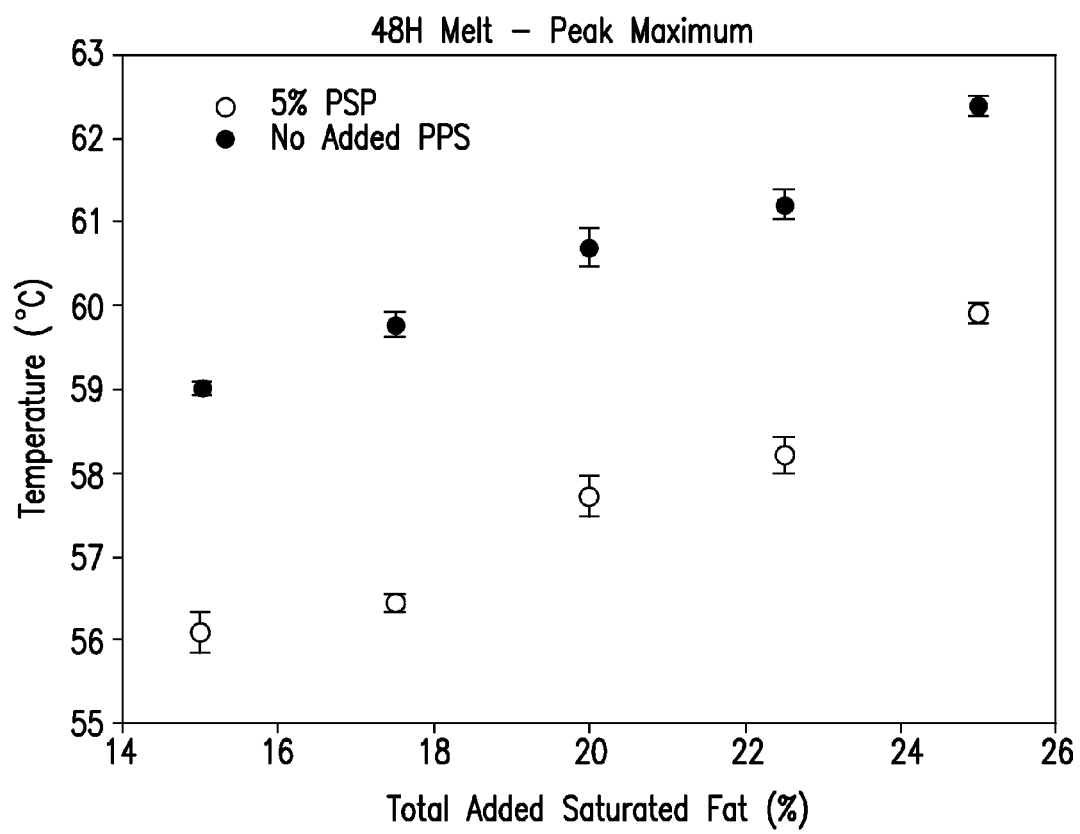
FIG. 18 illustrates melting peak maxima 48 hours after crystallization versus the amount of total added saturates for the shortening samples enriched with 5% pure PSP as a structural enhancer as well as for the control.

The melting peak maxima temperatures for the shortening as well as for the shortening enriched with 5% pure PSP are shown in FIG. 18 as a function of total added saturated fat. The peak maximum melting temperature increases as the amount of saturated fat within the sample increases. As well, the enriched shortening samples have a consistently lower (by approx 3° C.) peak maximum of melting. This is due to the decrease in SSS caused by the PSP supplementation, as SSS is the highest melting TAG.

Section 3: Utilizing PPS as a Structural Enhancer

The efficacy of the structural enhancer in increasing hardness of the shortening by varying the amount of structural enhancer (in this case, PPS) was studied.

Figure 19A:
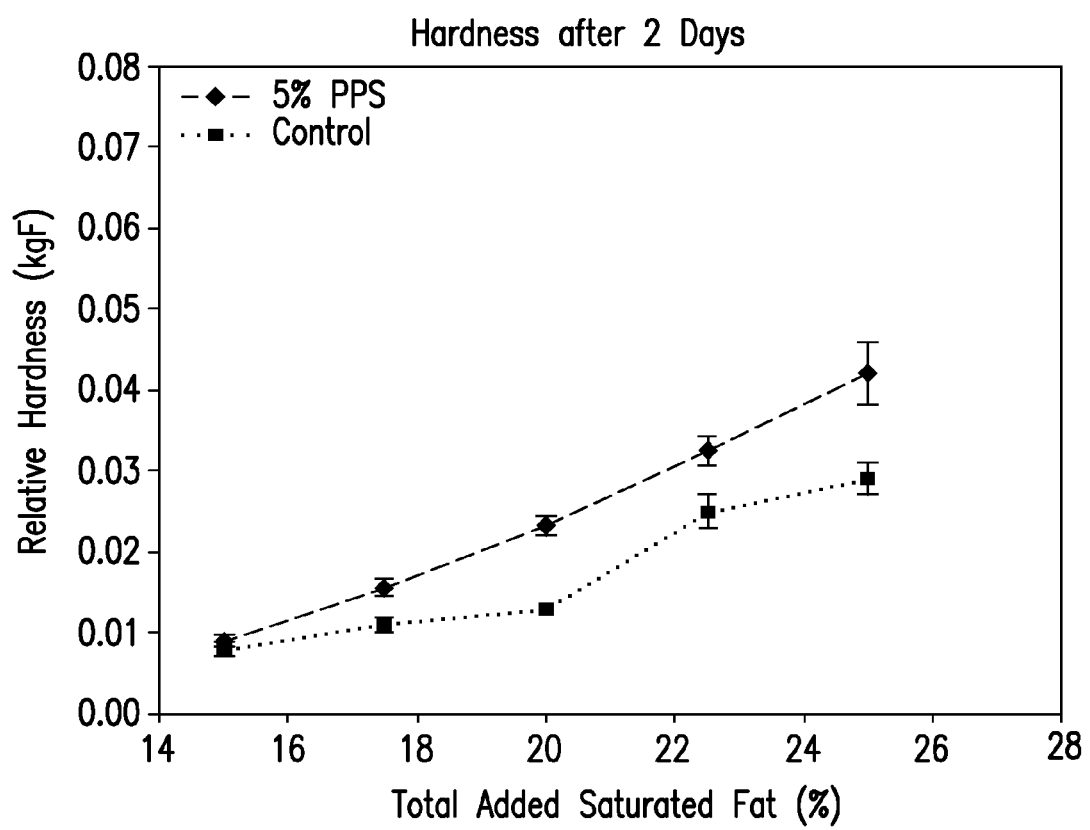
FIG. 19(a) illustrates relative hardness after 2 days versus total added saturated fat for the control and PPS enriched shortenings and FIG. 19(b) illustrates relative hardness after 13 days versus total added saturated fat for the control and PPS enriched shortenings.
Figure 19B:
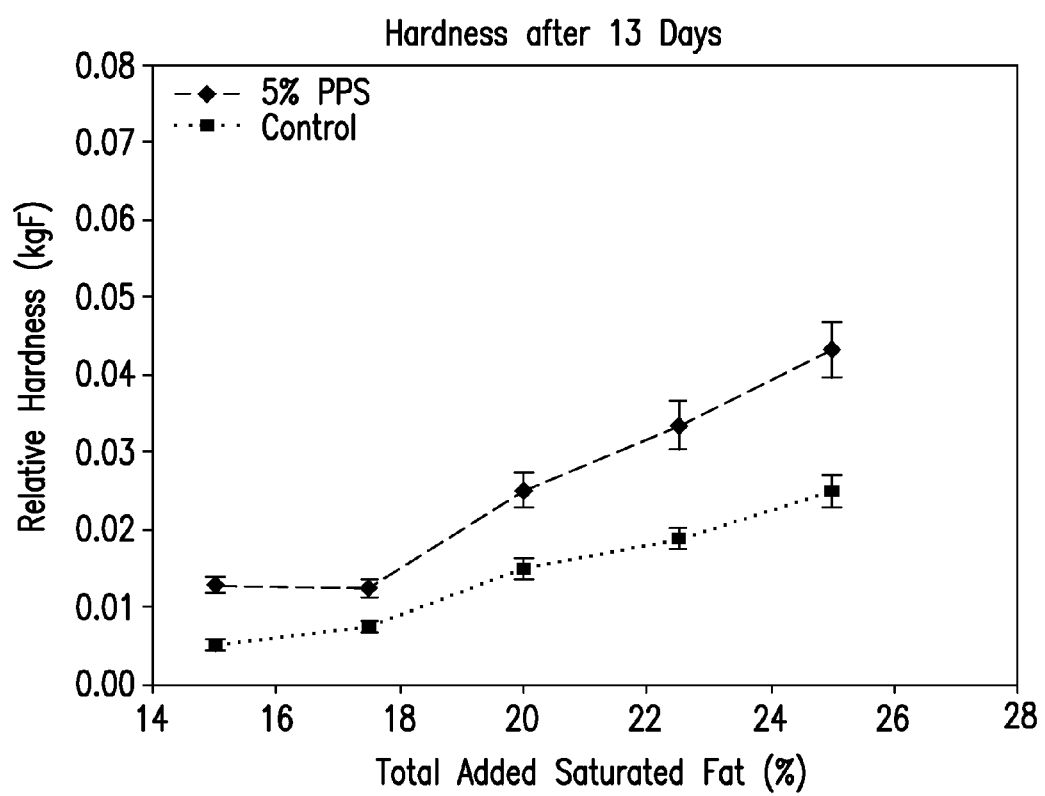

The relative hardness of the samples enriched with 5% PPS after 2 days is shown by the black diamonds in FIG. 19a as a function of total added saturated fat. Also shown in FIG. 19a is the relative hardness of the binary shortening samples (the control), indicated by the black squares. Clearly, enriching the shortening blends with 5% PPS without increasing the amount of total added saturates increases the relative hardness of the shortening sample at levels of total added saturates greater than 15%. The same trend is also evident after 13 days of storage as illustrated by FIG. 19b, with an increase in relative hardness also evident for the 15% total added saturates samples.

Figure 20A:
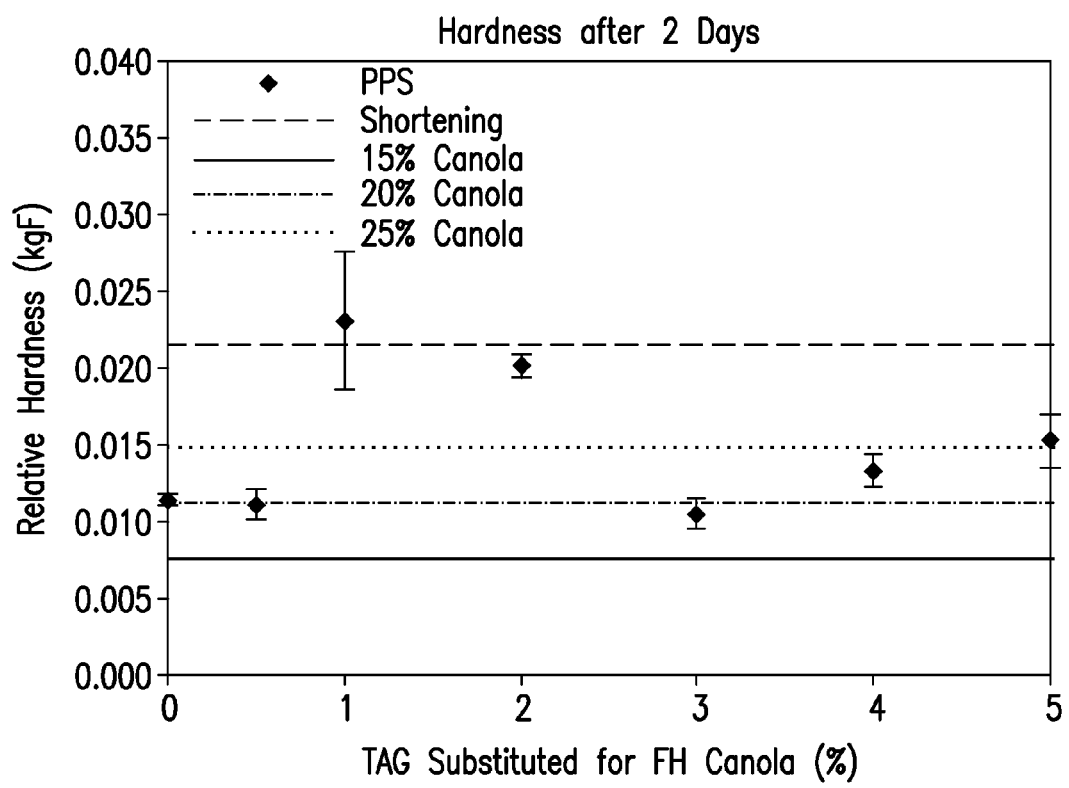
FIG. 20(a) illustrates relative hardness after 2 days as a function of the amount of structural enhancer PPS substituted for FH canola and FIG. 20(b) illustrates relative hardness after 13 days as a function of the amount of structural enhancer PPS substituted for FH canola.
Figure 20B:
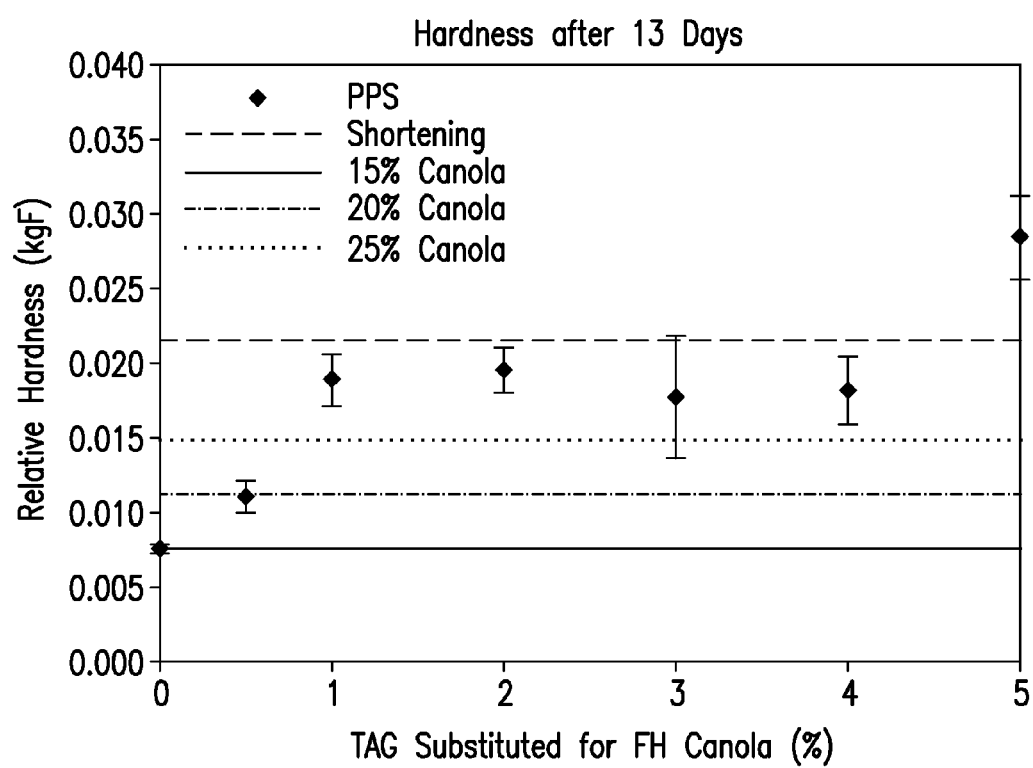

The relative hardness of the standards (commercial shortening, and the 15, 20 and 25% binary FH canola and soybean shortenings) are shown in FIGS. 20a and 20b by the horizontal reference lines. FIG. 20a shows the trends in relative hardness for the samples listed in Table 12 after two days. The shortening samples with 1 and 2% fully hydrogenated canola replaced with PPS demonstrated hardness commensurate with that of the commercial shortening (standard) also tested. The remainder of the enriched samples tested had measured relative hardness of the 20-25% canola shortening samples, demonstrating a decrease in total added saturated fats (while maintaining hardness) of 5-10% added saturates.

The relative hardness of the shortening samples after 13 days is illustrated by FIG. 20b. At levels of replacement of FH Canola of at least 1%, the hardness of the samples are almost as hard as that of the commercial shortening product.

Figure 21:
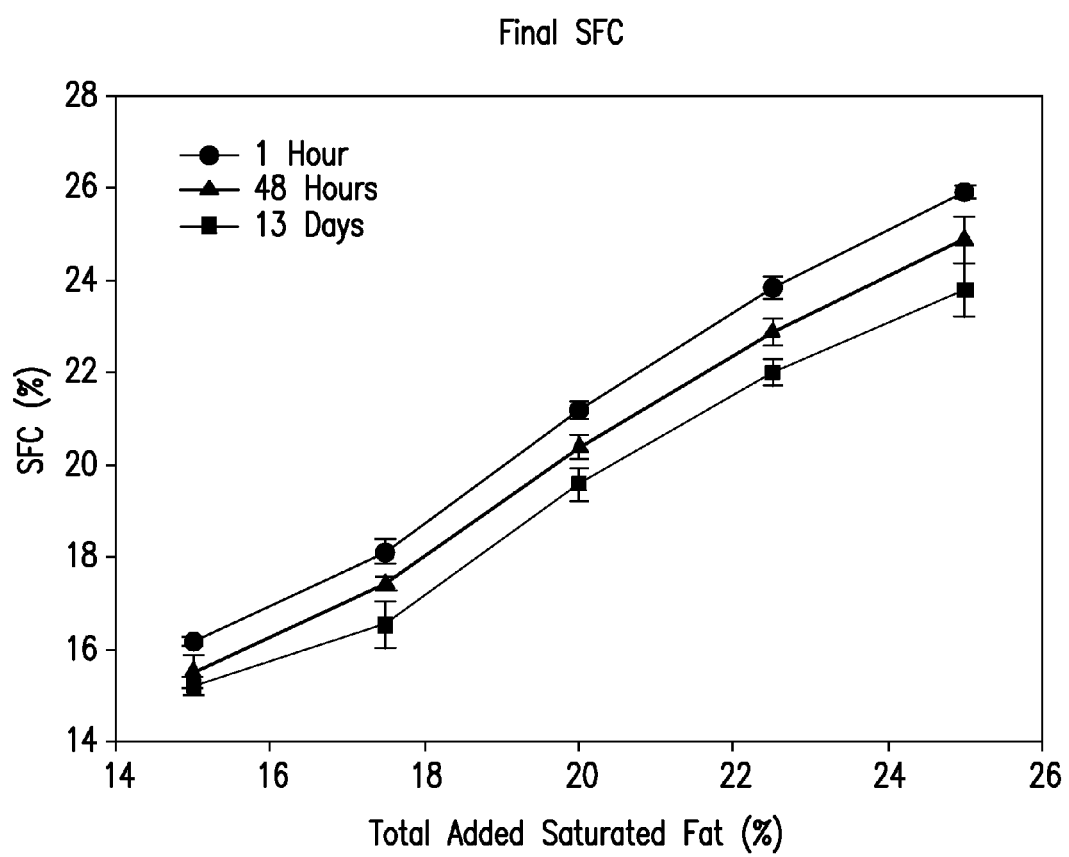
FIG. 21 illustrates SFC after 1 hour, 48 hours and 13 days versus total added saturates for the shortening enriched with 5% pure PPS as a structural enhancer.

The SFC of the shortening samples each enriched with 5% PPS after 1 hour, 2 days and 13 days is shown in FIG. 21 as a function of the total added saturates. Clearly, increasing the level of added saturated fat increases the SFC of the shortening. As well, increasing the storage time of the shortening samples, decreases the measured SFC for all samples shown with the samples with 17.5 to 25% fully added saturates decreasing 2% SFC from the 1 hour to 13 day measurements and the 15% added saturates sample SFC decreasing 1% between the 1 hour and 13 day measurements.

Figure 22:
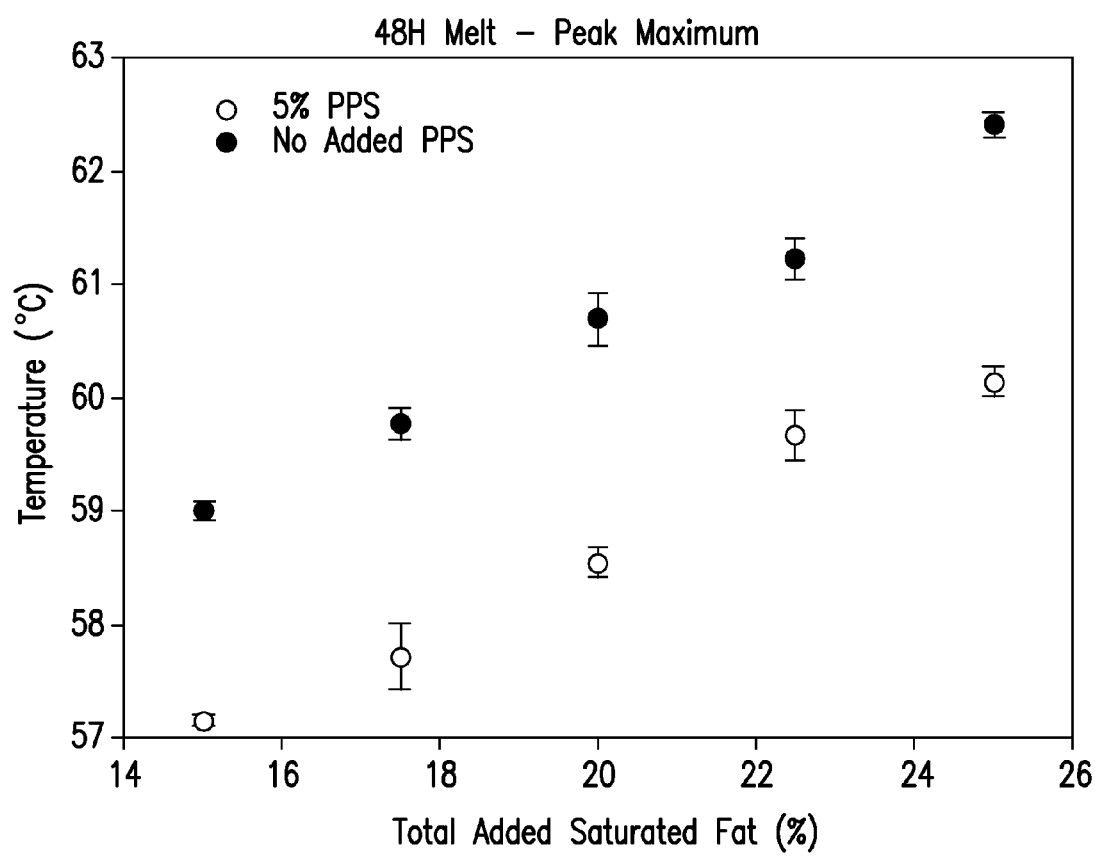
FIG. 22 illustrates melting peak maxima 48 hours after crystallization versus the amount of total added saturates for the shortening samples enriched with 5% pure PPS as a structural enhancer as well as for the control.

FIG. 22 shows the peak maxima of melting for samples stored 48 hours prior to melting as a function of total added saturates. The melting peak maxima for samples containing 5% PPS (open circles) as well as the standard shortening with no enrichment from PPS (black circles) are shown. For each sample set, increasing the amount of total added saturated fat increases the melting peak maxima, as expected. Clearly, enriching a canola based shortening with 5% PPS results in a lower melting peak maxima (approximately 2° C.) from that found in the standard shortening.

It is not possible, using any naturally occurring vegetable oil or its FH counterpart, to augment for this TAG. In certain embodiments, PPS can be enriched by interesterification or biotech efforts.

Section 4: Utilizing SPS as a Structural Enhancer

The efficacy of the structural enhancer in increasing hardness of the shortening by varying the amount of structural enhancer (in this case, SPS) was studied.

Figure 23A:
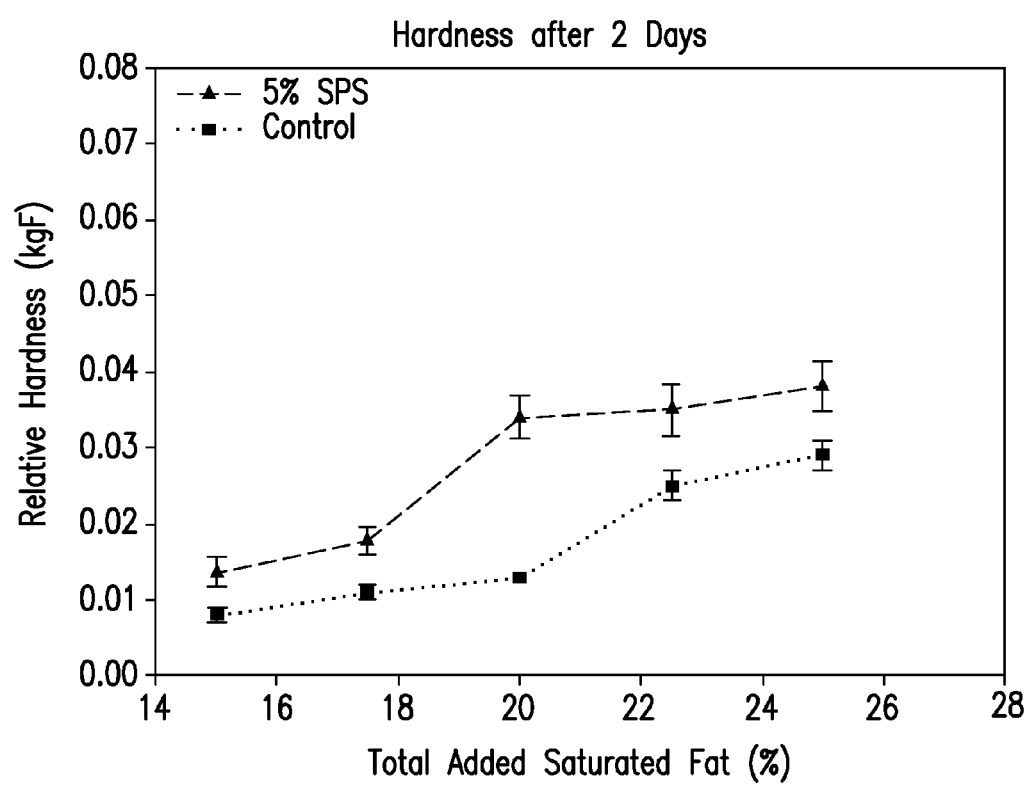
FIG. 23(a) illustrates relative hardness after 2 days versus total added saturated fat for the control and SPS enriched shortenings and FIG. 23(b) illustrates relative hardness after 13 days versus total added saturated fat for the control and SPS enriched shortenings
Figure 23B:
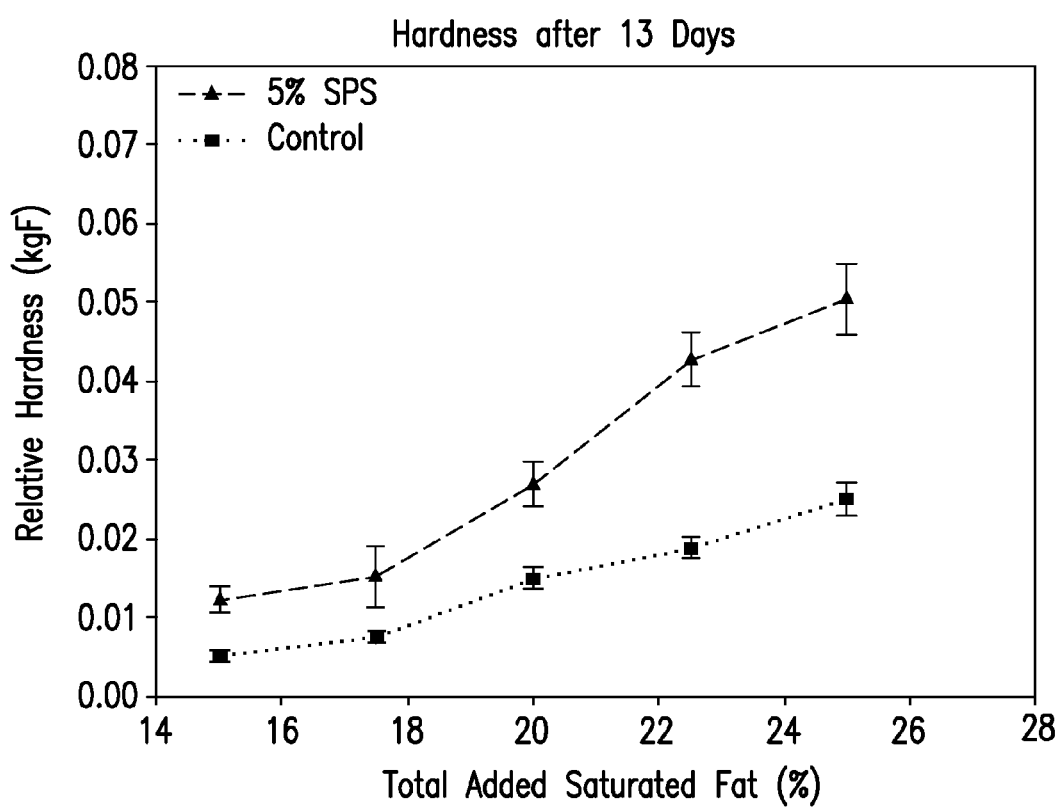

The relative hardness of the samples enriched with 5% SPS after 2 days is shown by the black triangles in FIG. 23a as a function of total added saturated fat. Also shown in FIG. 23a is the relative hardness of the binary shortening samples (the standards), indicated by the black squares. Clearly, enriching the shortening blends with 5% SPS without increasing the amount of total added saturates increases the relative hardness of the shortening sample. The same trend it also evident after 13 days of storage as illustrated by FIG. 23b, with the increase due to the incorporation of structural enhancer becoming more pronounced with increased total added saturates.

Figure 24A:
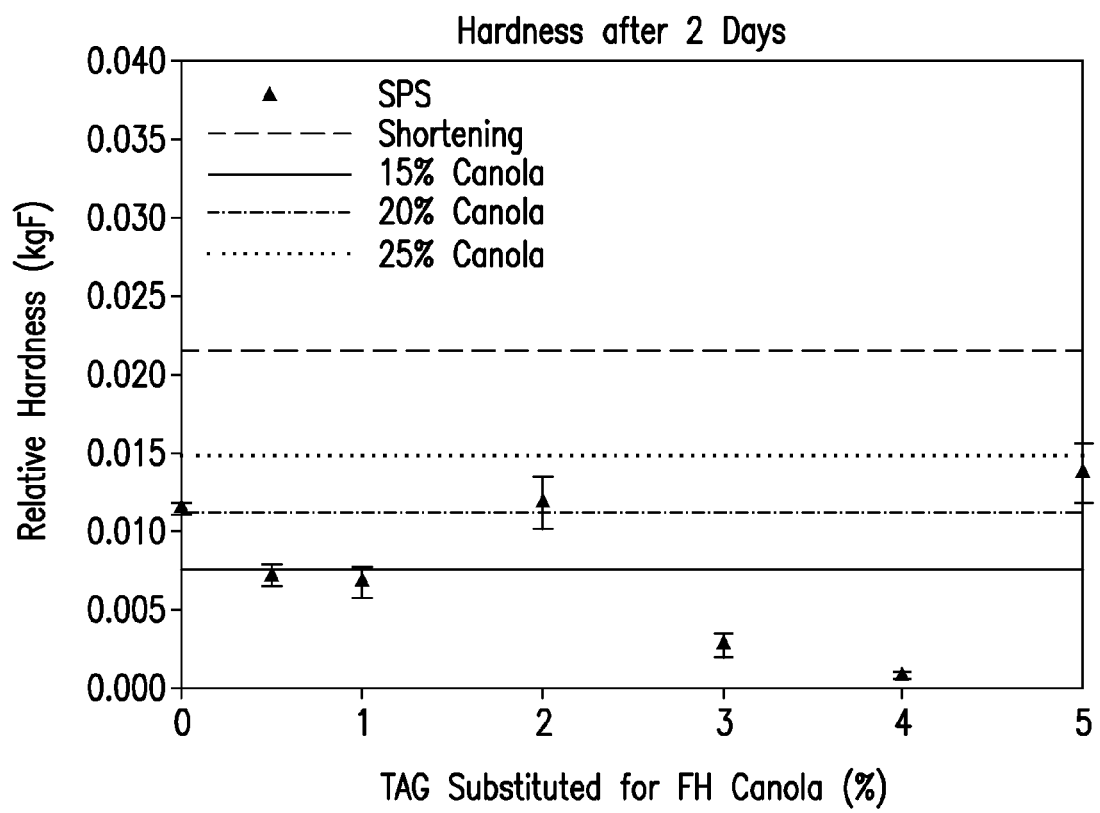
FIG. 24(a) illustrates relative hardness after 2 days as a function of the amount of structural enhancer SPS substituted for FH canola and FIG. 24(b) illustrates relative hardness after 13 days as a function of the amount of structural enhancer SPS substituted for FH canola.
Figure 24B:
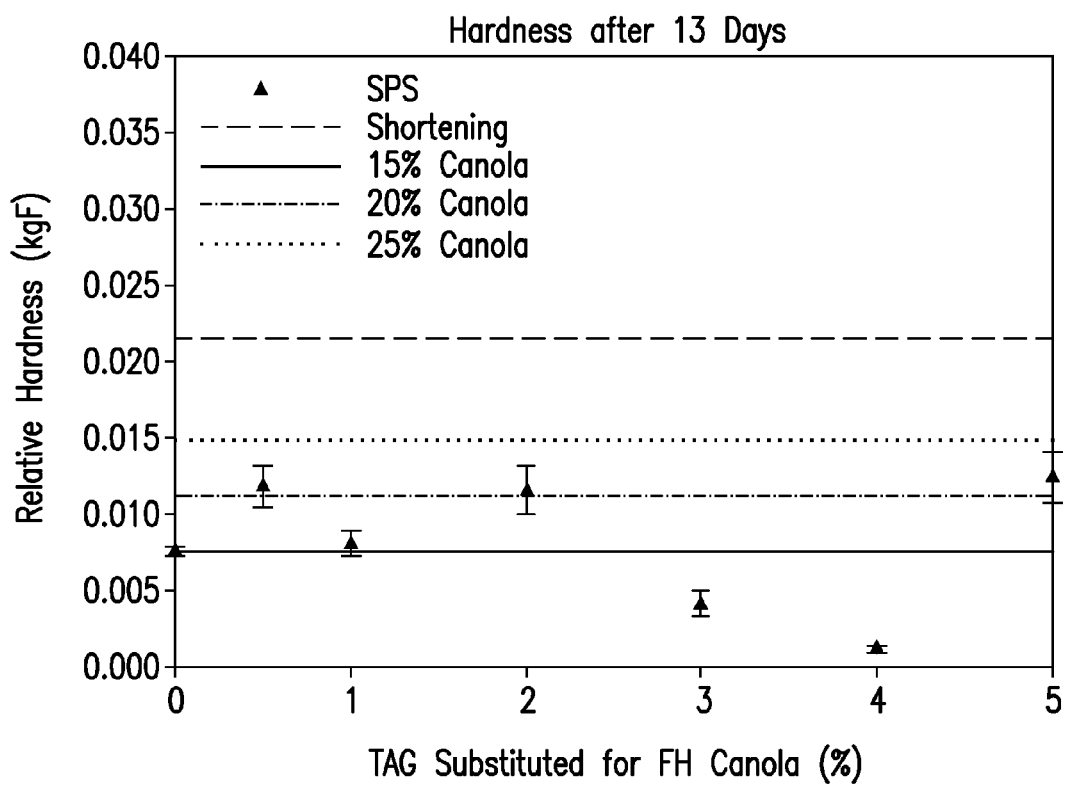

The relative hardness of the standards (commercial shortening, and the 15, 20 and 25% binary FH canola and soybean shortenings) are shown in FIGS. 24a and 24b by the horizontal reference lines. FIG. 24a shows the hardness of the samples 2 days after crystallization. Clearly the enrichment of the shortening system with pure SPS does not significantly increase the hardness of the shortening sample. For the replacement of 0.5, 1, 3 and 4% fully hydrogenated canola with pure SPS; the relative hardness of the shortening is actually decreased below that of the 0% replaced shortening.

Similarly after 13 days of storage, the relative hardness of the shortening samples as illustrated by FIG. 24b, 1%, 2% and 5% replacement of the FH Canola in the shortening sample results in the hardness being increased to at least the corresponding hardness of the sample with 20% FH Canola. Again, substituting 3 and 4% fully hydrogenated canola oil with pure SPS results in a decrease of relative hardness.

Clearly, SPS is a useful structural enhancer at levels of replacement of 5% SPS in order for an increase in relative hardness to result. SPS enhancement of a shortening sample cannot be achieved using commercially available fully hydrogenated vegetable shortenings due to the low concentration of SPS. In certain embodiments, SPS can be enriched by interesterification and/or biotechnological means.

Section 5: Utilizing PPP as a Structural Enhancer

The efficacy of the structural enhancer in increasing hardness of the shortening by varying the amount of structural enhancer (in this case, PPP) was studied.

Figure 25A:
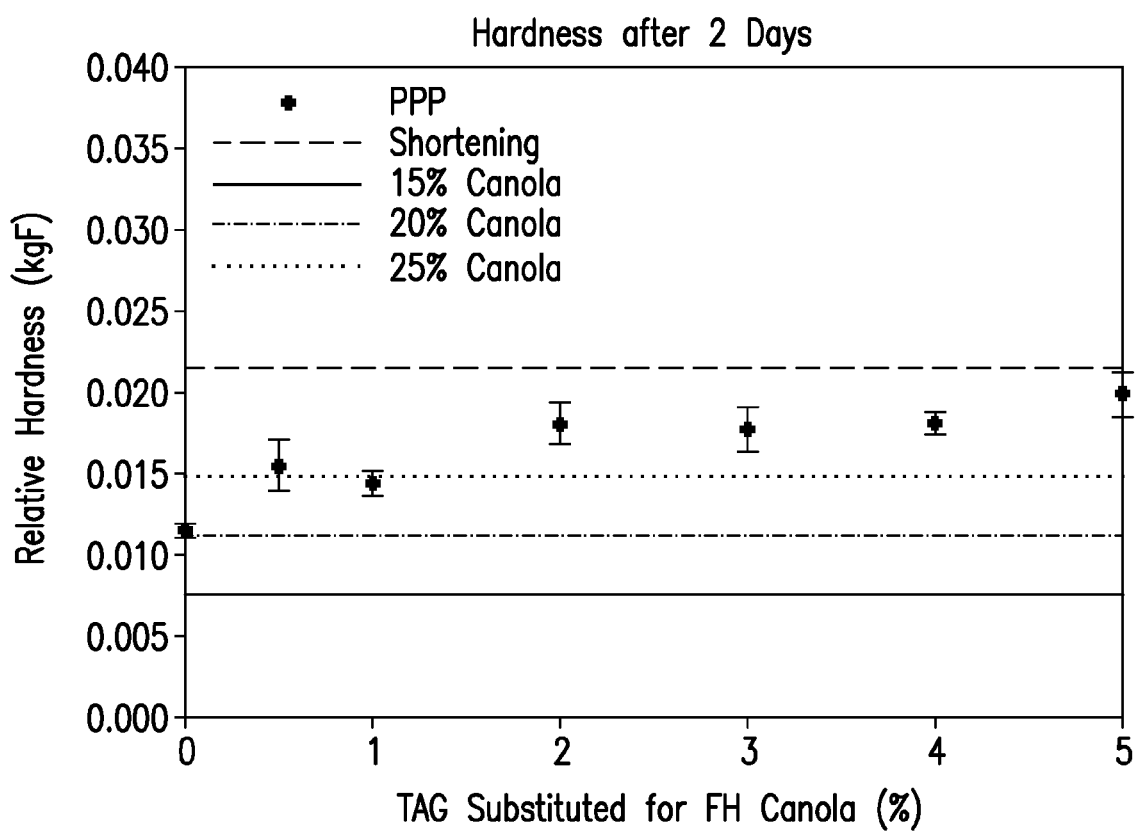
FIG. 25(a) illustrates relative hardness after 2 days as a function of the amount of structural enhancer PPP substituted for FH canola and FIG. 25(b) illustrates relative hardness after 13 days as a function of the amount of structural enhancer PPP substituted for FH canola.
Figure 25B:
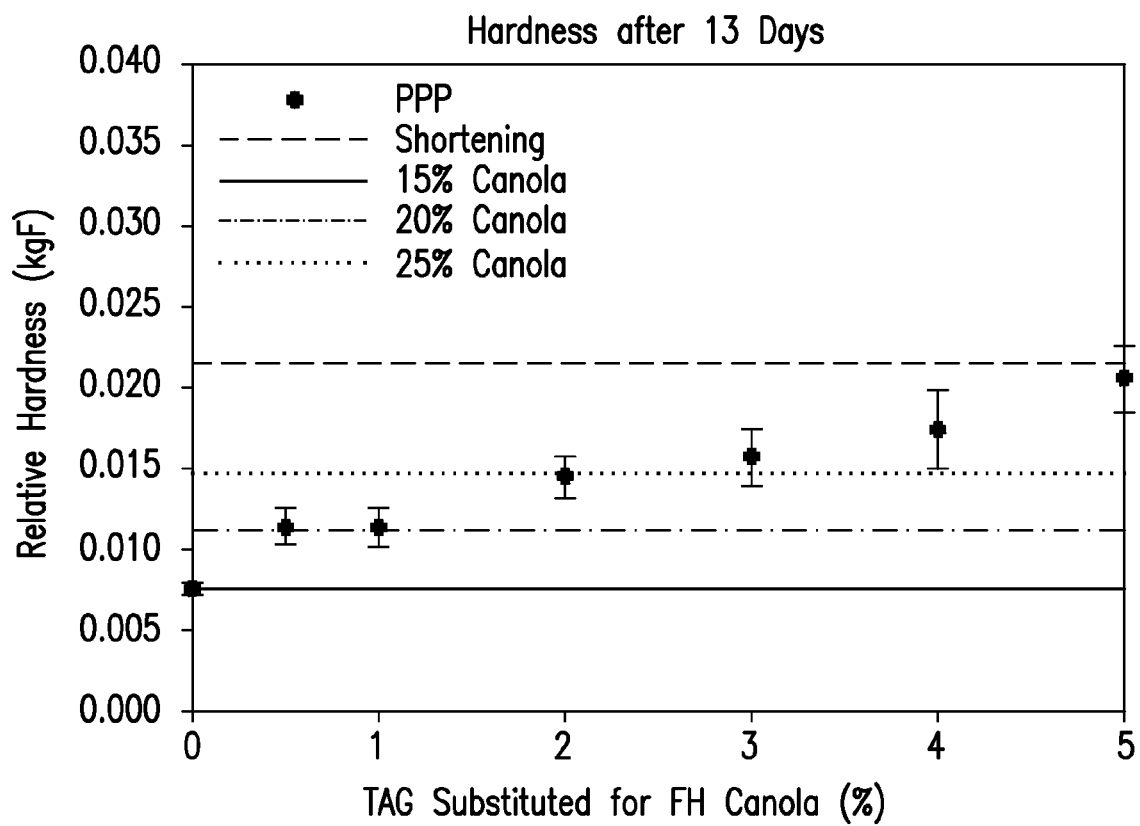

The relative hardness of the standards (commercial shortening, and binary FH canola and soybean shortenings) are shown in FIGS. 25a and 25b by the horizontal reference lines. FIG. 25a shows the hardness of the samples 2 days after crystallization. Clearly increasing the amount of PPP in the shortening causes a slight increase in the relative hardness of the samples. A similar increasing relative hardness trend is also seen after 13 days of storage as illustrated by FIG. 25b. Substituting PPP for FH canola does increase the relative hardness of the samples above that of the 15% binary shortening standard sample. However augmentation of the shortening samples with the structural enhancer PPP does not achieve the same hardness as the commercial shortening until 5% PPP is utilized.

PPP enhancement of a shortening sample cannot be achieved using commercially available fully hydrogenated vegetable shortenings due to the low concentration of PPP. In certain embodiments, PPP can be enriched by interesterification and/or biotechnological means.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A shortening product comprising a solid fraction, a liquid fraction, tristearin and a structural enhancer, said structural enhancer comprising one or more triacylglycerides, each triacylglyceride molecule of said structural enhancer having one or two stearic groups and one or two palmitic groups, wherein ratio of the amount of structural enhancer to the amount of tristearin is from about 0.5 to 1, and the shortening comprises no more than 2% by weight trans fats and a total hard fat fraction of at least about 15%.

2. The shortening product of claim 1, wherein said liquid fraction comprises at least about 70% of said shortening.

3. The shortening product of claim 2, wherein said liquid fraction comprises at least about 80% of said shortening.

4. The shortening product of claim 3, wherein said liquid fraction comprises at least about 85% of said shortening.

5. The shortening of claim 1, wherein the liquid fraction comprises a single vegetable oil, a mixture of two or more vegetable oils, a mixture of one or more vegetable oils comprising stearic acid, palmitic acid, or a combination thereof.

6. The shortening of claim 1, wherein the liquid fraction comprises one or more of corn oil, cottonseed oil, canola oil, olive oil, palm oil, peanut oil, safflower oil, sesame oil, soybean oil, sunflower oil, rapeseed oil, or any combination thereof.

7. The shortening of claim 6, wherein said liquid fraction comprises soybean oil, canola oil, or a mixture thereof.

8. The shortening of claim 1, wherein the structural enhancer comprises purified PSS, PSP, PPS, SPS or any combination thereof.

9. The shortening of claim 1, wherein the structural enhancer comprises PSS, PSP, PPS, SPS or any combination thereof present in a vegetable oil.

10. The shortening of claim 1, wherein the structural enhancer is present in one or more interesterified vegetable oils.

11. The shortening of claim 1, wherein the structural enhancer is present in a hydrogenated vegetable oil, a mixture of hydrogenated or unhydrogenated vegetable oils, or any mixture of hydrogenated, unhydrogenated, or interesterified vegetable oils.

12. The shortening of claim 1, wherein the structural enhancer is present in a hydrogenated vegetable oil, a mixture of hydrogenated or unhydrogenated vegetable oils, interesterified vegetable oil, genetically modified oil, fractionated oil or any mixture thereof.

13. The shortening of claim 12, wherein the ratio of the amount of structural enhancer to the amount of tristearin present in the shortening is about 0.70.

14. The shortening of claim 13, wherein the ratio of the amount of structural enhancer to the amount of tristearin present in the shortening is about 0.80.

15. The shortening of claim 1, wherein the ratio of the amount of structural enhancer to the amount of tristearin present in the shortening is about 0.50.

16. The shortening of claim 1, wherein said solid fraction comprises one or more of a hydrogenated vegetable oil, lard or tallow, or any combination thereof.

17. The shortening of claim 16, wherein said hydrogenated vegetable oil comprises one or more of hydrogenated canola oil, hydrogenated cottonseed oil, or any combination thereof.

18. The shortening of claim 1, wherein the shortening comprises a total saturated fat content of less than about 30%.

19. The shortening of claim 18 comprising a total saturated fat content of less than about 25%.

20. The shortening of claim 19 comprising a total saturated fat content of less than about 20%.

21. A food product comprising the shortening of claim 1.

22. The food product of claim 21, wherein the product comprises a baked good, an icing, a biscuit, a bread, a pie crust, a danish, a croissant, or a pastry puff.

23. A method of preparing a shortening, the method comprising the steps of:
providing a composition comprising a hard fat fraction, a soft fat fraction, tristearin and a structural enhancer, the structural enhancer being either present natively in one of the fractions, added to the composition, or both, wherein ratio of the amount of structural enhancer to the amount of tristearin is from about 0.5 to 1 and
mixing the composition to provide a shortening product, wherein the shortening comprises no more than 2% by weight trans fats and a total hard fat fraction of at least about 15%.

24. The method of claim 23, wherein said composition is heated prior to or during said mixing step.

25. The method of claim 24, wherein said composition is heated prior to or during said mixing step to a temperature of about 55° C. to about 90° C.

26. The method of claim 25, wherein said temperature is maintained for a period of about 10-30 minutes.

27. The method of claim 24 comprising a further step of cooling the mixed composition with agitation.

28. The method of claim 27, wherein said step of cooling with agitation is performed in a heat exchanger.

29. The method of claim 28, wherein said heat exchanger is a scraped surface heat exchanger.

30. The method of claim 27, wherein said cooling takes place at a rate of about 10° C./min.

31. The method of claim 23 comprising a further step of tempering the mixture.

32. The method of claim 31, wherein said mixture is tempered at a temperature of at least about 70° F.

33. The method of claim 32, wherein said mixture is tempered at a temperature of about 85° F.

34. The method of claim 33, wherein said tempering is for a duration of at least about two days.

35. The method of claim 23, wherein said structural enhancer comprises one or more triacylglycerides, each triacylglyceride molecule of said structural enhancer having one or more stearic groups and one or more palmitic groups.

36. A method for producing a shortening comprising:
admixing a lipid composition comprising one or more vegetable oils, tristearin and at least one structural enhancer, wherein the structural enhancer comprises PSS, PSP, PPS, SPS or any combination thereof, wherein the ratio of the amount of structural enhancer to the amount of tristearin is from about 0.5 to 1;
pre-heating the admixture;
processing the admixture in a scraped-surface heat exchanger, and
tempering the admixture, wherein the shortening comprises no more than 2% by weight trans fats and a total hard fat fraction of at least about 15%.

37. A method for producing a shortening comprising
admixing a lipid composition comprising one or more vegetable oils, tristearin and at least one structural enhancer, wherein the structural enhancer comprises PSS, PSP, PPS, SPS, or any combination thereof, wherein ratio of the amount of structural enhancer to the amount of tristearin is from about 0.5 to 1;
pre-heating the admixture;
processing the admixture in a scraped-surface heat exchanger, and tempering the admixture, wherein the shortening comprises no more than 2% by weight trans fats and a total hard fat fraction of at least about 15%.

38. A shortening product comprising a solid fraction, a liquid fraction and a portion of structural enhancer, said structural enhancer comprising one or more triacylglycerides, each triacylglyceride molecule of said structural enhancer having one or two stearic groups and one or two palmitic groups, wherein the structural enhancer is about 50% by weight of the total amount of saturated fat present, wherein the shortening comprises no more than 2% by weight trans fats and a total hard fat fraction of at least about 15%.

39. A method of preparing a shortening, the method comprising the steps of:
providing a composition comprising a hard fat fraction, a soft fat fraction, and a structural enhancer, the structural enhancer being either present natively in one of the fractions,
added to the composition, or both, wherein the structural enhancer is about 50% by weight of the total amount of saturated fat present, and
mixing the composition to provide a shortening product, wherein the shortening comprises no more than 2% by weight trans fats and a total hard fat fraction of at least about 15%.

40. A shortening product comprising a solid fraction, a liquid fraction and a portion of structural enhancer, said structural enhancer comprising one or more triacylglycerides, each triacylglyceride molecule of said structural enhancer having one or two stearic groups and one or two palmitic groups, wherein the structural enhancer is about 45% by weight of the total amount of saturated fat present, wherein the shortening comprises no more than 2% by weight trans fats and a total hard fat fraction of at least about 15%.

41. A method of preparing a shortening, the method comprising the steps of:
providing a composition comprising a hard fat fraction, a soft fat fraction, and a structural enhancer, the structural enhancer being either present natively in one of the fractions, added to the composition, or both, wherein the structural enhancer is about 45% by weight of the total amount of saturated fat present, and
mixing the composition to provide a shortening product, wherein the shortening comprises no more than 2% by weight trans fats and a total hard fat fraction of at least about 15%.

* * * * *